United States Patent
Tanaka et al.

(10) Patent No.: US 9,902,847 B2
(45) Date of Patent: Feb. 27, 2018

(54) 4-METHYL-1-PENTENE (CO)POLYMER COMPOSITION, AND FILM AND HOLLOW MOLDED PRODUCT COMPOSED OF THE COMPOSITION

(71) Applicant: MITSUI CHEMICALS, INC., Minato-ku (JP)

(72) Inventors: Hirokazu Tanaka, New Bridge Road (SG); Takayuki Uekusa, Ichihara (JP); Masahiko Okamoto, Chiba (JP); Yoshisada Tamo, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 931 days.

(21) Appl. No.: 14/364,211

(22) PCT Filed: Dec. 25, 2012

(86) PCT No.: PCT/JP2012/083499
§ 371 (c)(1),
(2) Date: Jun. 10, 2014

(87) PCT Pub. No.: WO2013/099876
PCT Pub. Date: Jul. 4, 2013

(65) Prior Publication Data
US 2014/0342111 A1 Nov. 20, 2014

(30) Foreign Application Priority Data

Dec. 27, 2011 (JP) ................................ 2011-285679
Jan. 31, 2012 (JP) ................................ 2012-017761
Mar. 1, 2012 (JP) ................................ 2012-044990
Mar. 23, 2012 (JP) ................................ 2012-066877
Oct. 19, 2012 (JP) ................................ 2012-231666

(51) Int. Cl.
C08L 23/20 (2006.01)
C08F 210/14 (2006.01)

(52) U.S. Cl.
CPC ............ *C08L 23/20* (2013.01); *C08F 210/14* (2013.01); *C08L 2203/16* (2013.01); *C08L 2205/025* (2013.01); *Y10T 428/1397* (2015.01)

(58) Field of Classification Search
CPC .............. C08L 23/20; C08L 2205/025; C08L 2203/16; C08F 210/14; Y10T 428/1397
USPC ....................................................... 428/36.92
See application file for complete search history.

(56) References Cited

U.S. PATENT DOCUMENTS

| | | |
|---|---|---|
| 4,892,851 A | 1/1990 | Ewen et al. |
| 4,990,640 A | 2/1991 | Tsutsui et al. |
| 5,036,034 A | 7/1991 | Ewen |
| 5,077,123 A | 12/1991 | Shigemoto |
| 5,155,080 A | 10/1992 | Elder et al. |
| 5,162,278 A | 11/1992 | Razavi |
| 5,321,106 A | 6/1994 | LaPointe |
| 5,334,677 A | 8/1994 | Razavi et al. |
| 5,387,568 A | 2/1995 | Ewen et al. |
| 5,519,100 A | 5/1996 | Ewen |
| 5,614,457 A | 3/1997 | Ewen et al. |
| 5,663,249 A | 9/1997 | Ewen et al. |
| 6,369,175 B1 | 4/2002 | Ewen |
| 6,939,928 B1 | 9/2005 | Kawai et al. |
| 7,160,949 B2 | 1/2007 | Ota et al. |
| 7,789,960 B2 | 9/2010 | Elsaesser |
| 7,879,960 B2 | 2/2011 | Funaya et al. |
| 2003/0008163 A1 | 1/2003 | Nakahara et al. |
| 2003/0055179 A1 | 3/2003 | Ota et al. |
| 2008/0004412 A1 | 1/2008 | Matsumoto et al. |
| 2008/0097055 A1 | 4/2008 | Funaya et al. |
| 2008/0220193 A1 | 9/2008 | Tohi et al. |
| 2011/0144224 A1* | 6/2011 | Tanaka ........................ C08J 5/18 521/142 |

FOREIGN PATENT DOCUMENTS

| | | |
|---|---|---|
| CN | 88103178 A | 12/1988 |
| CN | 1392835 A | 1/2003 |
| EP | 1308466 | 5/2003 |

(Continued)

OTHER PUBLICATIONS

Poly(4-methyl-1-pentene)—high, medium, low molecular weight—Sigma-Aldrich www.sigmaaldrich.com/catalog/product/aldrich/191000—Downloaded Jun. 16, 2017.*
Office Action issued by the Chinese Patent Office in corresponding Chinese Patent Application No. 201280061026.6 dated Aug. 5, 2015 (5 pages).
Extended European Search Report dated Feb. 26, 2015, by the European Patent Office in corresponding European Patent Application No. 12862805.4-1302. (5 pages).
International Search Report (PCT/ISA/210) dated Feb. 26, 2013, by the Japanese Patent Office as the International Searching Authority for International Application No. PCT/JP2012/083499.

*Primary Examiner* — Ling Siu Choi
*Assistant Examiner* — Ronald Grinsted
(74) *Attorney, Agent, or Firm* — Buchanan, Ingersoll & Rooney PC

(57) ABSTRACT

To provide a 4-methyl-1-pentene/olefin (co)polymer composition which is excellent in transparency and heat resistance and is excellent also in elongation and toughness and to provide a molded product composed of the composition, a film composed of the composition, which is excellent in transparency, heat resistance and dimensional stability and has been uniformly stretched, and a hollow molded product composed of the composition, which is excellent in transparency, heat resistance and toughness and is excellent also in dimensional stability. The 4-methyl-1-pentene (co)polymer composition of the present invention comprises a specific 4-methyl-1-pentene (co)polymer (A) and a specific 4-methyl-1-pentene/α-olefin copolymer (B) in a specific ratio.

16 Claims, No Drawings

(56) References Cited

FOREIGN PATENT DOCUMENTS

| | | |
|---|---|---|
| EP | 2 311 914 A1 | 4/2011 |
| JP | 58-191734 A | 11/1983 |
| JP | 1-501950 | 7/1989 |
| JP | 1-502036 | 7/1989 |
| JP | 2-41303 A | 2/1990 |
| JP | 2-78687 | 3/1990 |
| JP | 3-179005 | 8/1991 |
| JP | 3-179006 | 8/1991 |
| JP | 3-193796 A | 8/1991 |
| JP | 3-207703 | 9/1991 |
| JP | 3-207704 | 9/1991 |
| JP | 5-031792 A | 2/1993 |
| JP | 5-070659 A | 3/1993 |
| JP | 5-245911 A | 9/1993 |
| JP | 7-053804 A | 2/1995 |
| JP | 11-255982 A | 9/1999 |
| JP | 2001-172408 A | 6/2001 |
| JP | 2002-192673 A | 7/2002 |
| JP | 2003-268044 A | 9/2003 |
| JP | 2003-292704 A | 10/2003 |
| JP | 2004-027071 A | 1/2004 |
| JP | 2004-035625 A | 2/2004 |
| JP | 2006-70252 A | 3/2006 |
| JP | 3779471 B2 | 5/2006 |
| JP | 3894822 B2 | 3/2007 |
| JP | 2007-224311 | 9/2007 |
| JP | 2007-321102 A | 12/2007 |
| JP | 2008-94909 | 4/2008 |
| JP | 2008-144155 A | 6/2008 |
| JP | 2009-298139 A | 12/2009 |
| JP | 4489699 B2 | 6/2010 |
| JP | 2011-88352 | 5/2011 |
| JP | 2011-140593 A | 7/2011 |
| JP | 2011-140595 A | 7/2011 |
| WO | WO 88/05792 | 8/1988 |
| WO | WO 88/05793 | 8/1988 |
| WO | WO 01/27124 | 4/2001 |
| WO | WO 01/53369 | 7/2001 |
| WO | WO 2002/002659 | 1/2002 |
| WO | WO 02/081958 A1 | 10/2002 |
| WO | WO 2006/025540 | 3/2006 |
| WO | WO 2006/054613 | 5/2006 |
| WO | WO 2010013467 A1 * | 2/2010 ................ C08J 5/18 |
| WO | WO 2011/055803 A1 | 5/2011 |

* cited by examiner

4-METHYL-1-PENTENE (CO)POLYMER COMPOSITION, AND FILM AND HOLLOW MOLDED PRODUCT COMPOSED OF THE COMPOSITION

TECHNICAL FIELD

The present invention relates to a 4-methyl-1-pentene (co)polymer composition which is excellent in transparency and heat resistance and provides a molded product having excellent elongation/toughness, and a molded product obtained from the composition, specifically, a uniformly stretched film or a hollow molded product having excellent dimensional stability.

BACKGROUND ART

As a resin having excellent characteristics such as heat resistance, transparency, lightweight property, steam resistance, releasability, gas permeability and electrical property as compared with polyethylene or polypropylene, a 4-methyl-1-pentene (co)polymer is utilized in various fields of food containers, subsidiary materials for electronic information members, experimental instruments, stationeries, process members for bridging, release films, films for electronic information members, food packaging materials, synthetic papers, etc.

The (co)polymer, however, is generally poor in elongation, toughness and stretchability, and in the actual circumstances, therefore, its applicable uses are limited as compared with, for example, polyethylene or polypropylene that is the same polyolefin. Further, the (co)polymer is generally poor in stretchability, and therefore, production of a stretched film from the (co)polymer or blow molding or vacuum forming of the (co)polymer is difficult as compared with polyethylene or polypropylene that is the same polyolefin, so that the region wherein the (co)polymer can be used is limited.

To cope with them, various researches have been attempted for the purpose of improving toughness and elongation of the 4-methyl-1-pentene (co)polymer.

For example, a wrapping film composed of a polymer obtained by copolymerizing 4-methyl-1-pentene and 1-hexene in a specific ratio has been studied in a patent literature 1. In this case, transparency and elongation of the film have been improved, but heat resistance that is a characteristic of a 4-methyl-1-pentene polymer tends to be lowered.

In a patent literature 2, a hose composed of a thermoplastic elastomer containing a 4-methyl-1-pentene-based polymer having excellent elongation and flexibility has been disclosed. This hose tends to be deteriorated in transparency because a crosslinked rubber is present in the composition.

In a patent literature 3 and a patent literature 4, elongation is imparted to a film by laminating polyester or polyamide that is rich in toughness and elongation and a composition containing a 4-methyl-1-pentene polymer to each other. Since multi-ply lamination of non-polar polyolefin and polyester or polyamide that is a polar resin is carried out, occurrence of ply separation is expected. If an adhesive resin is used in combination in order to inhibit it, the molding method and the molding apparatus become complicated, so that increase in production cost is thought to be induced, and there is a fear of lowering of transparency.

In the prior art described above, a copolymer having been controlled in the type of an olefin or the ratio between an olefin and 4-methyl-1-pentene in the copolymerization of 4-methyl-1-pentene and an olefin or a composition of the copolymer and various modifiers is obtained, or toughness and elongation are imparted by laminating the copolymer or the composition to another sheet or film, and therefore, a balance between heat resistance, transparency and mechanical properties which are characteristics of a 4-methyl-1-pentene copolymer cannot be maintained in some cases.

Further, various researches have been attempted in the past for the purpose of improving stretchability of a 4-methyl-1-pentene (co)polymer.

For example, in a patent literature 5, a liquid hydrocarbon compound is added to a 4-methyl-1-pentene-based polymer resin. In this case, a sheet produced sometimes undergoes blocking, or bleed out of the hydrocarbon compound sometimes occurs when the sheet is heated.

In a patent literature 6, a 4-methyl-1-petene-based polymer resin of high fluidity and a 4-methyl-1-pentene-based polymer resin of low fluidity are mixed under the specific conditions. In this case, bad dispersing of the polymer resin of low fluidity takes place, or because fluidity of the mixture is lowered, bad flow such as melt fracture or surging takes place during molding. Moreover, the molding method used is limited because of fluidity.

In a patent literature 7, uniaxial stretchability is imparted to a 4-methyl-1-pentene (co)polymer film by multi-play lamination of the (co)polymer and polyethylene or polypropylene that is easily stretched. In this case, peeling is required after stretching, and it is difficult to obtain a thin and uniform film.

In the prior art described above, in order to impart stretchability to a 4-methyl-1-pentene (co)polymer, a low-molecular weight compound or a high-fluidity resin is added to the (co)polymer in a maximum amount of 30% by weight, as a modifier for improving fluidity of the (co)polymer, or a molding processing method is devised by using multi-ply lamination or the like, but such a means is not intended to improve the effects restricted by the amount added or the molding conditions or to improve stretchability of the resin itself.

As raw materials of resin containers, polyolefins such as polyethylene and polypropylene and polyesters such as polyethylene terephthalate have been mainly used.

For example, polyolefins such as polyethylene and polypropylene are widely used for containers/bottles for liquids, fuel tanks, etc., and such containers, etc. are generally produced by injection molding or blow molding. The molded products, however, are sometimes inferior in transparency (patent literature 8).

On the other hand, polyesters such as polyethylene terephthalate are widely used mainly for beverage containers, and such containers are produced by injection blow molding (sometimes referred to as "injection blowing" hereinafter). In this molding method, a molded product called a preform is prepared by injection molding, and thereafter, the preform is reheated and then subjected to blow molding to prepare a molded product. The molded product, however, has a problem of heat resistance though it is excellent in transparency (patent literature 9).

Here, in order to impart heat resistance to polyethylene terephthalate, an attempt to produce a molded product in a system wherein engineering plastic such as polycarbonate or polyether sulfide is added has been also made, but from the viewpoints of hygienic property due to residual monomers and cost, use of it is limited to only a part of applications (patent literature 10).

In recent years, in order to obtain molded products improved in heat resistance that is a defect of polyethylene terephthalate, various researches regarding injection blow molded products using polypropylene have been made (patent literatures 11 to 13). In the case of polypropylene, however, handling during molding is frequently difficult because the molding temperature range is narrow. In addition, there resides a disadvantage that available polypropylenes (type, properties, etc.) are few. For example, when homopolypropylene is used, transparency is rarely exhibited, or when random polypropylene is used, heat resistance is low.

In order to solve such problems of transparency and heat resistance as above, researches of molded products using 4-methyl-1-pentene-based polymers have been made. However, hitherto known 4-methyl-1-pentene-based polymers that are usually on the market cannot be necessarily said to have good moldability. For example, when a molded product is obtained by blow molding, there is a problem that it is difficult to produce the molded product by the use of a 4-methyl-1-pentene-based polymer because the polymer has low mechanical strength and low melt tension as compared with polyethylene or polypropylene that is the same polyolefin.

CITATION LIST

Patent Literature

Patent literature 1: Japanese Patent Laid-Open Publication No. 2001-172408
Patent literature 2: WO 2002/081958
Patent literature 3: Japanese Patent Laid-Open Publication No. 2002-192673
Patent literature 4: Japanese Patent No. 3779471
Patent literature 5: Japanese Patent Laid-Open Publication No. 1983-191734
Patent literature 6: Japanese Patent No. 3894822
Patent literature 7: Japanese Patent No. 4489699
Patent literature 8: Japanese Patent Laid-Open Publication No. 1993-245911
Patent literature 9: Japanese Patent Laid-Open Publication No. 1993-031792
Patent literature 10: Japanese Patent Laid-Open Publication No. 1993-070659
Patent literature 11: Japanese Patent Laid-Open Publication No. 1999-255982
Patent literature 12: Japanese Patent Laid-Open Publication No. 2003-268044
Patent literature 13: Japanese Patent Laid-Open Publication No. 2009-298139

SUMMARY OF INVENTION

Technical Problem

In the light of the prior art described above, it is an object of the present invention to solve the above problems and to provide a 4-methyl-1-pentene (co)polymer composition which is excellent in transparency and heat resistance and is excellent also in elongation and toughness. Further, it is an object of the present invention to provide molded products composed of the composition, specifically, a film composed of the composition, which is excellent in transparency, heat resistance and dimensional stability and has been uniformly stretched, and a hollow molded product composed of the composition, which is excellent in transparency, heat resistance and toughness and is excellent also in dimensional stability.

Solution to Problem

The present inventors have earnestly studied in order to solve the above problems. As a result, they have found that a 4-methyl-1-pentene (co)polymer composition obtained by blending a 4-methyl-1-pentene (co)polymer and a 4-methyl-1-pentene/α-olefin copolymer in a specific ratio is excellent in elongation and toughness, a film composed of the composition is excellent in transparency, heat resistance, electrical properties, mechanical properties, uniform stretchability and dimensional stability, and a hollow molded product composed of the composition is excellent in transparency, heat resistance, electrical properties, mechanical properties, uniform stretchability and dimensional stability, and they have accomplished the present invention.

The 4-methyl-1-pentene (co)polymer composition (X1) of the present invention comprises a specific 4-methyl-1-pentene (co)polymer (A) in an amount of 10 to 90 parts by weight and a specific 4-methyl-1-opentene copolymer (B1) in an amount of 90 to 10 parts by weight (with the proviso that the total amount of (A) and (B1) is 100 parts by weight).

The 4-methyl-1-pentene (co)polymer composition (X3) of the present invention comprises a specific 4-methyl-1-pentene (co)polymer (A) in an amount of 10 to 90 parts by weight, and a specific 4-methyl-1-pentene copolymer (B1) and a specific 4-methyl-1-pentene copolymer (B2) in the total amount of 90 to 10 parts by weight (with the proviso that the total amount of (A), (B1) and (B2) is 100 parts by weight, and the mixing ratio ((B1)/(B2)) of (B1) to (B2) is 99/1 to 1/99).

The 4-methyl-1-pentene (co)polymer composition (X4) of the present invention comprises a specific 4-methyl-1-(co)polymer (A) in an amount of 10 to 85 parts by weight, a specific 4-methyl-1-pentene copolymer (B1) and a specific 4-methyl-1-pentene copolymer (B2) in the total amount of 85 to 10 parts by weight (with the proviso that the mixing ratio ((B1)/(B2)) of (B1) to (B2) is 99/1 to 1/99), and an α-olefin polymer (C) (said polymer (C) being different from the (co)polymer (A), the copolymer (B1) and the copolymer (B2)) in an amount of 3 to 30 parts by weight (with the proviso that the total amount of (A), (B1), (B2) and (C) is 100 parts by weight).

The 4-methyl-1-pentene (co)polymer composition (X5) of the present invention comprises a specific 4-methyl-1-pentene (co)polymer (A) in an amount of 7 to 90 parts by weight, a specific 4-methyl-1-pentene copolymer (B1) in an amount of 90 to 7 parts by weight, and an α-olefin polymer (C) (said polymer (C) being different from the (co)polymer (A), the copolymer (B1) and the copolymer (B2)) in an amount of 0.9 to 30 parts by weight (with the proviso that the total amount of (A), (B1) and (C) is 100 parts by weight).

The 4-methyl-1-pentene (co)polymer composition (X6) of the present invention comprises a specific 4-methyl-1-pentene (co)polymer (A) in an amount of 7 to 90 parts by weight, a specific 4-methyl-1-pentene copolymer (B2) in an amount of 90 to 7 parts by weight, and an α-olefin polymer (C) (said polymer (C) being different from the (co)polymer (A), the copolymer (B1) and the copolymer (B2)) in an amount of 0.9 to 30 parts by weight (with the proviso that the total amount of (A), (B2) and (C) is 100 parts by weight).

The film of the present invention comprises the 4-methyl-1-pentene (co)polymer composition of the present invention. The film is preferable as a release film.

The hollow molded product of the present invention comprises the 4-methyl-1-pentene (co)polymer composition of the present invention. The molded product is preferably obtained by an injection blow molding method.

Advantageous Effects of Invention

The 4-methyl-1-pentene (co)polymer composition of the present invention exerts remarkable effects that it is excellent in transparency, heat resistance and electrical properties and it has elongation and toughness that are difficult to obtain by the use of commercially available conventional 4-methyl-1-pentene-based polymers. On that account, the composition can be preferably used for various molded products.

The film composed of the composition exerts remarkable effects that it is excellent in transparency, heat resistance, electrical properties and dimensional stability and it has been uniformly stretched though such uniform stretching is difficult in the case of films composed of commercially available conventional 4-methyl-1-pentene-based polymers. On that account, the film composed of the composition can be preferably used in the technical fields of industrial materials and electronics. Further, the film of the present invention can be preferably used in release film applications because it is excellent in releasability, heat resistance, low out gassing property and low staining property against copper foils. Furthermore, the film can be preferably used in surface protective film applications because it is excellent also in releasability, heat resistance and dimensional stability.

The hollow molded product composed of the composition exerts remarkable effects that it is excellent in transparency, heat resistance and toughness and is excellent also in dimensional stability. On that account, the hollow molded product composed of the composition can be preferably used in the technical field of industrial materials.

DESCRIPTION OF EMBODIMENTS

The 4-methyl-1-pentene (co)polymer composition of the present invention and molded products comprising the composition, particularly, a film and a hollow molded product, are described in detail.

In the present application, "copolymerization" is sometimes referred to as "polymerization", and "copolymer" is sometimes referred to as "polymer".

[4-Methyl-1-Pentene (Co)Polymer Composition]

The 4-methyl-1-pentene (co)polymer composition of the present invention contains two different 4-methyl-1-pentene (co)polymers (A) and (B), and contains an α-olefin polymer (C) when needed. The composition preferably satisfies the following requirement (a), and more preferably satisfies one or more of the following requirements (b) to (h) according to the conditions.

(a) The total amount (UX-1) of constituent units derived from 4-methyl-1-pentene derived from all the (co)polymers contained in the composition is 99% by mol to 65% by mol, and the total amount (UX-2) of constituent units derived from α-olefins of 2 to 20 carbon atoms (except 4-methyl-1-pentene) derived from all the (co)polymers contained in the composition is 1% by mol to 35% by mol (with the proviso that the total amount of UX-1 and UX-2 is 100% by mol).

(b) The internal haze of an injection-molded square plate having a thickness of 2 mm is usually not more than 20.0.

(c) The internal haze of a test film having a thickness of 50 μm is usually not more than 1.0.

(d) The temperature at which the storage elastic modulus (G') of a specimen having a thickness of 2 mm, as measured in a torsion mode in a dynamic viscoelasticity measurement, becomes $1.0 \times 10^6$ (Pa) is usually in the range of 160° C. to 250° C.

(e) The temperature at which the storage elastic modulus (E') of a film having a thickness of 50 μm, as measured in a tensile mode in a dynamic viscoelasticity measurement, becomes $1.0 \times 10^6$ (Pa) is usually in the range of 160° C. to 250° C.

(f) The Young's modulus (tensile modulus) is usually in the range of 200 to 2000 MPa.

(g) The gloss is usually in the range of 5 to 150.

(h) The standard deviation of elongation between gages at 200% tensile elongation is usually not more than 50%.

The requirements (a) to (h) are described below.

<Requirement (a)>

In the 4-methyl-1-pentene (co)polymer composition of the present invention, UX-1 is in the range of 99% by mol to 65% by mol, and UX-2 is in the range of 1% by mol to 35% by mol. The α-olefin of 2 to 20 carbon atoms is not limited to one kind, and two or more kinds of α-olefins may be selected. When plural kinds of α-olefins are selected, the total amount of their constituent units has only to satisfy the above range.

From the viewpoints of transparency and heat resistance, the upper limit of UX-1 is preferably 97% by mol, more preferably 95% by mol, still more preferably 93% by mol, particularly preferably 91% by mol, more particularly preferably 87% by mol. The lower limit of UX-1 is preferably 70% by mol, more preferably 72% by mol, still more preferably 75% by mol, particularly preferably 80% by mol, more particularly preferably 82% by mol, most preferably 85% by mol.

On the other hand, the upper limit of UX-2 is preferably 30% by mol, more preferably 28% by mol, still more preferably 25% by mol, particularly preferably 20% by mol, more particularly preferably 18% by mol, most preferably 15% by mol. The lower limit of UX-2 is preferably 3% by mol, more preferably 5% by mol, still more preferably 7% by mol, particularly preferably 9% by mol, more particularly preferably 13% by mol.

The total amount of UX-1 and UX-2 is 100% by mol.

The (co)polymer composition may be a composition containing a random copolymer containing constituent units derived from 4-methyl-1-pentene and α-olefins of 2 to 20 carbon atoms (except 4-methyl-1-pentene), or may be a composition containing a block copolymer containing a 4-methyl-1-penene constituent unit chain and a chain of constituent units derived from α-olefins of 2 to 20 carbon atoms (except 4-methyl-1-pentene). From the viewpoints of transparency and heat resistance, the (co)polymer composition is preferably a composition containing a random copolymer of 4-methyl-1-pentene and an α-olefin of 2 to 20 carbon atoms.

Preferred examples of the α-olefins of 2 to 20 carbon atoms other than 4-methyl-1-pentene include ethylene, propylene, 1-butene, 1-pentene, 1-hexene, 3-methyl-1-butene, 3-methyl-1-pentene, 1-octene, 1-decene, 1-dodecene, 1-tetradecene, 1-hexadecene, 1-heptadecene, 1-octadecene and 1-eicosene.

Of these, α-olefins, such as ethylene, propylene, 1-butene, 1-hexene, 3-methyl-1-butene, 3-methyl-1-pentene, 1-octene, 1-decene, 1-hexadecene, 1-heptadecene and 1-octadecene, are preferable from the viewpoint of copolymerizability. More preferable are ethylene, propylene, 1-butene, 1-hexene, 1-decene, 1-hexadecene, 1-heptadecene and 1-octadecene.

These α-olefins of 2 to 20 carbon atoms can be used singly or in combination of two or more kinds.

The (co)polymer composition may contain, in addition to the above units, units derived from other polymerizable compounds within limits not detrimental to the object of the present invention.

Examples of such other compounds include vinyl compounds having a cyclic structure, such as styrene, vinylcyclopentene, vinylcyclohexane and vinylnorbornane; vinyl esters, such as vinyl acetate; unsaturated organic acids or derivatives thereof, such as maleic anhydride; conjugated dienes, such as butadiene, isoprene, pentadiene and 2,3-dimethylbutadiene; and non-conjugated polyenes, such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene and 2-propenyl-2,2-norbornadiene.

When the total amount of UX-1 and UX-2 is 100% by mol, the amount of units derived from such other polymerizable compounds is preferably not more than 10% by mol, more preferably not more than 5% by mol, still more preferably not more than 3% by mol.

<Requirement (b)>

The internal haze of an injection-molded square plate having a thickness of 2 mm obtained from the 4-methyl-1-pentene (co)polymer composition of the present invention is desired to be usually not more than 20.0. Here, the embodiments of the upper limit of the internal haze are 19.0, 18.0, 15.0, 12.5, 10.0, 7.0, 5.0 and 3.0, which become more preferable in this order. Since it has been found that an excellent effect of the (co)polymer composition is high transparency, the lower limit of the internal haze does not need to be defined, and the most preferred embodiment of the lower limit is specifically 0. However, the realistic lower limit value is 0.1. The internal haze can be controlled by the components of the composition to be blended. In the (co)polymer composition having an internal haze of the above range, the components are well compatibilized with one another, and the composition has excellent transparency.

<Requirement (c)>

The internal haze of a test film having a thickness of 50 μm obtained from the 4-methyl-1-pentene (co)polymer composition of the present invention is usually not more than 1.0. The internal haze is preferably 0.01 to 1.0, more preferably 0.01 to 0.8. This internal haze can be controlled by the components of the composition to be blended. In the (co)polymer composition having an internal haze of the above range, the components are well compatibilized with one another, and the composition has excellent transparency.

<Requirement (d)>

The temperature at which the storage elastic modulus (G') of a specimen having a thickness of 2 mm obtained from the 4-methyl-1-pentene (co)polymer composition of the present invention, as measured in a torsion mode in a dynamic viscoelasticity measurement, becomes $1.0 \times 10^6$ (Pa) is usually in the range of 160° C. to 250° C., preferably 160° C. to 240° C., more preferably 160° C. to 230° C., still more preferably 165° C. to 225° C.

The value in the above temperature range is a value that varies depending upon the ratio or the type of the composition, and is thought to be an indication of a balance between heat resistance, elongation and toughness. The (co)polymer composition having a temperature value of the above range is preferable from the viewpoints of heat resistance, elongation and toughness.

<Requirement (e)>

The temperature at which the storage elastic modulus (E') of a test film having a thickness of 50 μm obtained from the 4-methyl-1-pentene (co)polymer composition of the present invention, as measured in a tensile mode in a dynamic viscoelasticity measurement, becomes $1.0 \times 10^6$ (Pa) is usually in the range of 160° C. to 250° C., preferably 160° C. to 240° C., more preferably 160° C. to 230° C., still more preferably 165° C. to 225° C. The value in the above temperature range is a value that varies depending upon the ratio or the type of the composition, and a molded product composed of the (co)polymer composition having a temperature value of the above range is preferable from the viewpoints of heat resistance, elongation and toughness.

<Requirement (f)>

The Young's modulus (tensile modulus) of a test film having a thickness of 50 μm obtained from the 4-methyl-1-pentene (co)polymer composition of the present invention, as measured at a tensile rate of 200 mm/min in accordance with JIS K6781, is usually 200 to 2000 MPa, preferably 200 to 1800 MPa, more preferably 200 to 1600 MPa.

The value in the above range is a value that varies depending upon the ratio or the type of the composition, and is an indication of stretchability. The (co)polymer composition having a Young's modulus of the above range is preferable because a molded product having excellent uniform stretchability can be obtained.

<Requirement (g)>

The gloss of a test film having a thickness of 50 μm obtained from the 4-methyl-1-pentene (co)polymer composition of the present invention, as measured in accordance with JIS K7105, is usually 5 to 150, preferably 60 to 150, more preferably 60 to 140, still more preferably 60 to 130.

The value in the above range is a value that varies depending upon the ratio or the type of the composition, and is an indication of surface gloss of a molded product. The (co)polymer composition having a value of the above range is preferable because a molded product that has good surface gloss and is abundant in design property can be obtained.

<Requirement (h)>

When a specimen (ASTM D638-IV type specimen) obtained from the 4-methyl-1-pentene (co)polymer composition of the present invention is subjected to 200% tensile elongation at a tensile rate of 200 mm/min, the standard deviation of elongation between gages is usually not more than 50%, preferably 1 to 45%, more preferably 1 to 40%, still more preferably 1 to 35%. The value in the above range is a value that varies depending upon the ratio or the type of the composition, and becomes an indication of moldability. Use of the (co)polymer composition having a value of the above range is preferable because a molded product having excellent dimensional stability can be formed.

Further, the tensile elongation at break (EL) given when an ASTM D638-IV type specimen prepared by the use of the (co)polymer composition under the later-described injection conditions is subjected to a tensile test at a tensile rate of 30 mm/min is preferably not less than 50%, more preferably not less than 70%, still more preferably not less than 80%. In this case, the (co)polymer composition has excellent heat resistance and transparency and is excellent also in elongation. This presumably indicates that two or more different 4-methyl-1-pentene polymers are extremely well dispersible in each other but are not completely compatible with each other.

The 4-methyl-1-pentene (co)polymer composition of the present invention preferably contains a 4-methyl-1-pentene (co)polymer (A) having the following characteristics in an amount of 1 to 99 parts by weight and a 4-methyl-1-pentene copolymer (B) in an amount of 99 to 1 part by weight (with the proviso that the total amount of the (co)polymer (A) and the copolymer (B) is 100 parts by weight).

In the (co)polymer composition, the upper limit of the content of the (co)polymer (A) is preferably 95 parts by weight, more preferably 90 parts by weight, still more preferably 85 parts by weight, particularly preferably 80 parts by weight. The lower limit of the content of the (co)polymer (A) is preferably 5 parts by weight, more preferably 10 parts by weight, still more preferably 15 parts by weight, particularly preferably 20 parts by weight. The upper limit of the content of the copolymer (B) is preferably 95 parts by weight, more preferably 90 parts by weight, still more preferably 85 parts by weight, particularly preferably 80 parts by weight. The lower limit of the content of the (co)polymer (B) is preferably 5 parts by weight, more preferably 10 parts by weight, still more preferably 15 parts by weight, particularly preferably 20 parts by weight. The (co)polymer composition containing the (co)polymer A and the copolymer (B) in such amounts is preferable from the viewpoints of heat resistance, moldability, mechanical properties, transparency and a balance between elongation and toughness. A hollow molded product composed of the composition inherits such excellent effects, is excellent in heat resistance and transparency and is excellent also in dimensional stability, so that such a hollow molded product is preferable. A film composed of the composition inherits such excellent effects, is excellent in heat resistance and transparency and is uniformly stretched, so that such a film is preferable.

<4-Methyl-1-Pentene (Co)Polymer (A)>

In the present invention, the 4-methyl-1-pentene (co)polymer (A) satisfies the following requirements (A-a) to (A-e).

(A-a) The amount (U1) of constituent units derived from 4-methyl-1-pentene is 100 to 90% by mol, and the total amount (U2) of constituent units derived from α-olefins of 2 to 20 carbon atoms (except 4-methyl-1-pentene) is 0 to 10% by mol (with the proviso that the total amount of the amount (U1) of the constituent units derived from 4-methyl-1-pentene and the amount (U2) of the constituent units derived from the α-olefins of 2 to 20 carbon atoms is 100% by mol).

(A-b) The intrinsic viscosity [η], as measured in decalin at 135° C., is usually 0.5 to 5.0 dl/g.

(A-c) The melting point ($T_m$), as measured by DSC, is usually in the range of 200 to 250° C.

(A-d) The crystallization temperature ($T_c$), as measured by DSC, is in the range of 150 to 225° C.

(A-e) The density is usually 820 to 850 kg/m³.

The requirements (A-a) to (A-e) are described below.

Requirement (A-a)

In the present invention, the constitution of the 4-methyl-1-pentene (co)polymer (A) is as follows: the amount (U1) of constituent units derived from 4-methyl-1-pentene is 100 to 90% by mol, and the total amount (U2) of constituent units derived from α-olefins of 2 to 20 carbon atoms (except 4-methyl-1-pentene) is 0 to 10% by mol.

Here, the upper limit of U1 is preferably 99% by mol, more preferably 98% by mol, and the lower limit is preferably 91% by mol, more preferably 93% by mol, still more preferably 94% by mol. The upper limit of U2 is preferably 9% by mol, more preferably 7% by mol, still more preferably 6% by mol, and the lower limit is preferably 1% by mol, more preferably 2% by mol (with the proviso that the total amount of U1 and U2 is 100% by mol). Here, U1 of 100% by mol (U2 of 0% by mol) indicates that the (co)polymer (A) is a homopolymer of 4-methyl-1-pentene.

When the amounts of the constituent units are in the above ranges, a polymer composition containing the (co)polymer (A) is excellent in heat resistance and transparency and is excellent also from the viewpoints of elongation and toughness, so that such ranges are preferable. A hollow molded product obtained from the composition is preferable because it is excellent in heat resistance and transparency and is excellent also in dimensional stability. A film obtained from the composition is also preferable because it is excellent in heat resistance and transparency and is excellent also in molding property.

When the (co)polymer (A) contains an α-olefin of 2 to 20 carbon atoms (other than 4-methyl-1-pentene), preferred examples of the α-olefins of 2 to 20 carbon atoms include ethylene, propylene, 1-butene, 1-pentene, 1-hexene, 3-methyl-1-butene, 3-methyl-1-pentene, 1-octene, 1-decene, 1-dodecene, 1-tetradecene, 1-hexadecene, 1-heptadecene, 1-octadecene and 1-eicosene.

Of these, preferable are ethylene, propylene, 1-butene, 1-hexene, 3-methyl-1-butene, 3-methyl-1-pentene, 1-octene, 1-decene, 1-hexadecene, 1-heptadecene and 1-octadecene, more preferable are ethylene, propylene, 1-butene, 1-hexene, 1-octene, 1-decene, 1-hexadecene, 1-heptadecene and 1-octadecene, and still more preferable are 1-octene, 1-decene, 1-hexadecene, 1-heptadecene and 1-octadecene, from the viewpoints of copolymerizability and properties of the resulting copolymer.

These α-olefins of 2 to 20 carbon atoms can be used singly or in combination of two or more kinds.

The (co)polymer (A) may contain structural units derived from other polymerizable compounds within limits not detrimental to the object of the present invention.

Examples of such other polymerizable compounds include vinyl compounds having a cyclic structure, such as styrene, vinylcyclopentene, vinylcyclohexane and vinylnorbornane; vinyl esters, such as vinyl acetate; unsaturated organic acids or derivatives thereof, such as maleic anhydride; conjugated dienes, such as butadiene, isoprene, pentadiene and 2,3-dimethylbutadiene; and non-conjugated polyenes, such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene and 2-propenyl-2,2-norbornadiene.

The (co)polymer (A) may contain units derived from such other polymerizable compounds in an amount of not more than 10% by mol, preferably not more than 5% by mol, more preferably not more than 3% by mol, based on 100% by mol of the structural units derived from all the polymerizable compounds contained in the (co)polymer (A).

Requirement (A-b)

The intrinsic viscosity [η] of the 4-methyl-1-pentene (co)polymer (A) in the present invention, as measured in decalin at 135° C., is usually 0.5 to 5.0 dl/g, preferably 1.0 to 4.0 dl/g, more preferably 1.2 to 3.5 dl/g.

The value of the intrinsic viscosity [η] can be controlled by the amount of hydrogen added during polymerization in the production of the (co)polymer (A).

It is thought that the (co)polymer (A) having an intrinsic viscosity [η] value of the above range exhibits good fluidity during mixing of the resin composition or in various molding processes, and contributes particularly to toughness when the (co)polymer (A) is combined with the later-described 4-methyl-1-pentene copolymer (B). Further, the (co)polymer (A), and a hollow molded product and a film obtained from the composition are excellent in transparency.

Requirement (A-c)

The melting point ($T_m$) of the 4-methyl-1-pentene (co) polymer (A) in the present invention, as measured by DSC (differential scanning colorimeter), is usually 200° C. to 250° C., preferably 210° C. to 240° C., more preferably 215° C. to 240° C.

The value of the melting point ($T_m$) tends to depend upon stereoregularity of the polymer and a content of the structural units of an α-olefin of 2 to 20 carbon atoms, and can be obtained by using the later-described stereospecific catalyst for olefin polymerization and further by controlling the content of the structural units of an α-olefin of 2 to 20 carbon atoms.

The polymer (A) having a melting point ($T_m$) of the above range is preferable from the viewpoints of heat resistance and moldability. A hollow molded product and a film are also preferable because they are excellent in heat resistance and they have uniform and excellent properties.

Requirement (A-d)

The crystallization temperature ($T_c$) of the 4-methyl-1-pentene (co)polymer (A) in the present invention, as measured by DSC, is usually 150 to 225° C., preferably 160 to 223° C., more preferably 170 to 221° C.

The value of the crystallization temperature ($T_c$) tends to depend upon stereoregularity of the polymer and a content of the structural units of an α-olefin of 2 to 20 carbon atoms, and can be obtained by using the later-described olefin polymerization catalyst and further by controlling the content of the structural units of an α-olefin of 2 to 20 carbon atoms.

The polymer (A) having a crystallization temperature ($T_c$) of the above range, a hollow molded product and a film are preferable from the viewpoint of molding property.

Requirement (A-e)

The density of the 4-methyl-1-pentene (co)polymer (A) in the present invention is usually 820 to 850 kg/m³, preferably 825 to 850 kg/m³, more preferably 825 to 845 kg/m³, still more preferably 825 to 840 kg/m³.

The density value can be controlled by selecting the type or the content of another α-olefin to be polymerized with 4-methyl-1-pentene.

The polymer (A) having a density of the above range, a hollow molded product and a film are preferable from the viewpoint of heat resistance.

<Production Process for 4-Methyl-1-Pentene (Co)Polymer (A)>

The 4-methyl-1-pentene (co)polymer (A) in the present invention can be obtained by polymerizing 4-methyl-1-pentene, and if necessary, the aforesaid α-olefins of 2 to 20 carbon atoms (except 4-methyl-1-enten) and the aforesaid other polymerizable compounds, using a hitherto publicly known olefin polymerization catalyst, such as vanadium-based catalyst, titanium-based catalyst, magnesium-supported titanium catalyst, a metallocene catalyst described in WO 01/53369, WO 01/27124, Japanese Patent Laid-Open Publication No. 1991-193796 or Japanese Patent Laid-Open Publication No. 1990-41303.

As the (co)polymer (A), a commercially available general 4-methyl-1-pentene-based polymer can be used, and for example, TPX (registered trademark) available from Mitsui Chemicals, Inc. can be used.

<4-Methyl-1-Pentene Copolymer (B)>

In the present invention, the 4-methyl-1-pentene copolymer (B) is characterized by comprising at least one polymer selected from the following 4-methyl-1-pentene copolymer (B1) and 4-methyl-1-pentene copolymer (B2). The copolymer (B) preferably contains both of the copolymer (B1) and the copolymer (B2).

The copolymers (B1) and (B2) are described.

[4-Methyl-1-Pentene Copolymer (B1)]

In the present invention, the 4-methyl-1-pentene copolymer (B1) satisfies the following requirements (B1-a) to (B1-e), and preferably further satisfies the requirement (B1-f).

(B1-a) The amount (U3) of constituent units derived from 4-methyl-1-pentene is 99 to 80% by mol, and the total amount (U4) of constituent units derived from α-olefins of 2 to 20 carbon atoms is 1 to 20% by mol (with the proviso that the total amount of the amount (U3) the constituent units derived from 4-methyl-1-pentene and the amount (U4) of the constituent units derived from the α-olefins of 2 to 20 carbon atoms (except 4-methyl-1-pentene) is 100% by mol).

(B1-b) The intrinsic viscosity [η], as measured in decalin at 135° C., is usually 0.5 to 5.0 dl/g.

(B1-c) The molecular weight distribution (Mw/Mn) that is a ratio of the weight-average molecular weight (Mw), as measured by gel permeation chromatography (GPC), to the number-average molecular weight (Mn), as measured by the same, is usually 1.0 to 3.5.

(B1-d) The density is usually 825 to 860 kg/m³.

(B1-e) The melting point ($T_m$), as measured by DSC, is usually not less than 110° C. but less than 200° C.

(B1-f) The tensile modulus (YM) is usually 200 to 2,000 (MPa).

The requirements (B1-a) to (B1-f) are described below.

Requirement (B1-a)

In the present invention, the constitution of the 4-methyl-1-pentene copolymer (B1) is as follows: the amount (U3) of constituent units derived from 4-methyl-1-pentene is 99 to 80% by mol, and the total amount (U4) of constituent units derived from α-olefins of 2 to 20 carbon atoms (except 4-methyl-1-pentene) is 1 to 20% by mol.

Here, the upper limit of U3 is preferably 98% by mol, more preferably 97% by mol, still more preferably 96% by mol, much more preferably 95% by mol, and the lower limit is preferably 82% by mol, more preferably 83% by mol. The upper limit of U4 is preferably 18% by mol, more preferably 17% by mol, and the lower limit is preferably 2% by mol, more preferably 3% by mol, still more preferably 4% by mol, much more preferably 5% by mol (with the proviso that the total amount of U3 and U4 is 100% by mol).

When the amounts of the constituent units are in the above ranges, a polymer composition containing the copolymer (B1) is preferable from the viewpoints of transparency, toughness and heat resistance. A hollow molded product and a film obtained from the composition are preferable because they are excellent in transparency and molding property. When the amounts of the constituent units are in the above more preferred ranges, a composition containing the copolymer (B1) is preferable because it is more excellent in transparency, elongation and toughness and it is particularly excellent in heat resistance.

As the α-olefins of 2 to 20 carbon atoms contained in the copolymer (B1), the same α-olefins as mentioned in the description of the aforesaid (co)polymer (A) are included. Of these, α-olefins of 2 to 4 carbon atoms are preferable, and specifically, ethylene, propylene and 1-butene can be given as preferred examples.

These α-olefins of 2 to 20 carbon atoms can be used singly or in combination of two or more kinds.

Of these, propylene is preferably used from the viewpoint of copolymerizability.

The copolymer (B1) may contain structural units derived from other polymerizable compounds within limits not detrimental to the object of the present invention. As such other polymerizable compounds, the same compounds as mentioned in the description of the aforesaid (co)polymer (A) may be included, and the proportion of the structural units is in the same range.

Requirement (B1-b)

The intrinsic viscosity [η] of the 4-methyl-1-pentene copolymer (B1) in the present invention, as measured in decalin at 135° C., is usually 0.5 to 5.0 dl/g, preferably 1.0 to 4.0 dl/g, more preferably 1.2 to 3.5 dl/g.

The value of the intrinsic viscosity [η] can be controlled by the amount of hydrogen added during polymerization in the production of the copolymer (B1).

The copolymer (B1) having an intrinsic viscosity [η] value of the above range exhibits good fluidity in the production of a resin composition or in various molding processes, and a polymer composition obtained by combining it with the aforesaid (co)polymer (A) exhibits excellent elongation and toughness, and from the composition, a molded product having excellent transparency tends to be obtained.

Requirement (B1-c)

In the present invention, the molecular weight distribution (Mw/Mn) that is a ratio of the weight-average molecular weight (Mw) of the 4-methyl-1-pentene copolymer (B1), as measured by gel permeation chromatography (GPC), to the number-average molecular weight (Mn) thereof, as measured by the same, is usually 1.0 to 3.5, preferably 1.0 to 3.0, more preferably 1.5 to 2.5.

The value of the molecular weight distribution (Mw/Mn) can be controlled by the type of the later-described olefin polymerization catalyst.

A polymer composition containing the copolymer (B1) having a molecular weight distribution (Mw/Mn) of the above range tends to have a relatively low content of a low-molecular weight component, and it is thought that the possibility of lowering of transparency due to bleedout of the low-molecular weight component or weakening of a crystal structure by the low-molecular weight component is reduced and preferred influence is exerted on mechanical properties, so that such a composition is preferable. Further, a molded product having excellent transparency tends to be obtained, so that such a composition is preferable.

Requirement (B1-d)

The density of the 4-methyl-1-pentene copolymer (B1) in the present invention is usually 825 to 860 kg/m$^3$, preferably 830 to 855 kg/m$^3$, more preferably 830 to 850 kg/m$^3$, still more preferably 830 to 845 kg/m$^3$.

The density value can be controlled by selecting the type or the amount of another α-olefin to be polymerized with 4-methyl-1-pentene.

A polymer composition containing the copolymer (B1) having a density of the above range, and a hollow molded product and a film obtained from the composition are preferable because they are excellent in transparency and heat resistance.

Requirement (B1-e)

The melting point ($T_m$) of the 4-methyl-1-pentene copolymer (B1) in the present invention, as measured by DSC, is usually not less than 110° C. but less than 200° C., preferably 115° C. to 199° C., more preferably 115° C. to 197° C., still more preferably 120° C. to 195° C., and from the viewpoint of compatibility of heat resistance with moldability, the melting point is particularly preferably 125 to 190° C.

The value of the melting point ($T_m$) is a value that varies depending upon stereoregularity of the polymer and an amount of the α-olefin copolymerized, and the melting point can be controlled by the use of the later-described olefin polymerization catalyst according to the desired composition.

A polymer composition containing the copolymer (B1) having a melting point ($T_m$) of the above range is preferable from the viewpoints of transparency, moldability and heat resistance. A hollow molded product and a film are preferable because they are excellent in heat resistance and they have uniform and excellent properties.

A difference in the melting point between the (co)polymer (A) and the copolymer (B1) is preferably not less than 5° C., more preferably not less than 10° C., still more preferably not less than 20° C., particularly preferably not less than 30° C., more particularly preferably not less than 35° C., because improvements in moldability, mechanical strength and impact strength are obtained by virtue of enhancement of compatibility between (A) and (B1). The upper limit of a difference in the melting point is not specifically restricted as far as the (co)polymer (A) and the copolymer (B1) satisfy the desired melting points, but it is preferably 120° C., more preferably 110° C. It is thought that such 4-methyl-1-pentene polymers having different melting points have proper compatibility with each other differently from propylene-based polymers.

Requirement (B1-f)

The tensile modulus (YM) of the 4-methyl-1-pentene copolymer (B) in the present invention is usually 200 to 2,000 (MPa), preferably 200 MPa to 1900 MPa, more preferably 300 MPa to 1900 MPa, still more preferably 300 MPa to 1800 MPa.

The value of the tensile modulus (YM) is a value that varies depending upon the amount of an olefin copolymerized, and can be controlled by the use of the later-described polymerization catalyst.

A polymer composition containing the copolymer (B) having a tensile modulus (YM) of the above range is preferable from the viewpoints of moldability and mechanical properties. It is thought that satisfying the melting point of the above range and the tensile modulus of the above range at the same time suggests that the polymer tends to have a structure in which an olefin is introduced relatively at random.

With regard to a measuring method for YM, etc., the working examples can be referred to.

[4-Methyl-1-Pentene Copolymer (B2)]

In the present invention, the 4-methyl-1-pentene copolymer (B2) satisfies the following requirements (B2-a) to (B2-e).

(B2-a) The amount (U5) of constituent units derived from 4-methyl-1-pentene is less than 80% by mol but not less than 60% by mol, and the total amount (U6) of constituent units derived from α-olefins of 2 to 4 carbon atoms (except 4-methyl-1-pentene) is more than 20% by mol but not more than 40% by mol (with the proviso that the total amount of the amount (U5) of the constituent units derived from 4-methyl-1-pentene and the amount (U6) of the constituent units derived from the α-olefins of 2 to 4 carbon atoms is 100% by mol).

(B2-b) The intrinsic viscosity [η], as measured in decalin at 135° C., is usually 0.5 to 5.0 dl/g.

(B2-c) The melting point ($T_m$), as measured by DSC, is usually less than 110° C., or the melting point is not observed.

(B2-d) The molecular weight distribution (Mw/Mn) that is a ratio of the weight-average molecular weight (Mw), as measured by gel permeation chromatography (GPC), to the number-average molecular weight (Mn), as measured by the same, is usually 1.0 to 3.5.

(B2-e) The density is 830 to 860 kg/m$^3$.

The requirements (B2-a) to (B2-e) are described below.

Requirement (B2-a)

In the present invention, the constitution of the 4-methyl-1-pentene copolymer (B2) is as follows: the amount (U5) of constituent units derived from 4-methyl-1-pentene is less than 80% by mol but not less than 60% by mol, and the total amount (U6) of constituent units derived from α-olefins of 2 to 4 carbon atoms (except 4-methyl-1-pentene) is more than 20% by mol but not more than 40% by mol.

Here, the upper limit of U5 is preferably 79% by mol, more preferably 78% by mol, still more preferably 75% by mol, and the lower limit is preferably 65% by mol, more preferably 68% by mol. The upper limit of U6 is preferably 35% by mol, more preferably 32% by mol, and the lower limit is preferably 21% by mol, more preferably 22% by mol, still more preferably 25% by mol (with the proviso that the total amount of U5 and U6 is 100% by mol).

A polymer composition containing the copolymer (B1) containing the constituent units in the above amounts is more excellent in flexibility. Because of excellent flexibility, impact resistance of a hollow molded product obtained from the composition tends to be enhanced, and for example, the hollow molded product rarely suffers cracks or breakage when it falls down. A film obtained from the composition is also preferable because it has more excellent flexibility.

As preferred examples of the α-olefins of 2 to 4 carbon atoms contained in the copolymer (B2), ethylene, propylene and 1-butene can be given.

Of these, propylene is preferably used from the viewpoint of copolymerizability.

These α-olefins of 2 to 4 carbon atoms can be used singly or in combination of two or more kinds.

The copolymer (B2) may contain structural units derived from other polymerizable compounds within limits not detrimental to the object of the present invention. As such other polymerizable compounds, the same compounds as mentioned in the description of the aforesaid (co)polymer (A) may be included, and the proportion of the structural units is in the same range.

Requirement (B2-b)

The intrinsic viscosity [η] of the 4-methyl-1-pentene copolymer (B2) in the present invention, as measured in decalin at 135° C., is usually 0.5 to 5.0 dl/g, preferably 1.0 to 4.0 dl/g, more preferably 1.2 to 3.5 dl/g.

The value of the intrinsic viscosity [η] can be controlled by the amount of hydrogen added during polymerization in the production of the copolymer (B2).

The copolymer (B2) having an intrinsic viscosity [η] value of the above range exhibits good fluidity in the production of a resin composition or in various molding processes, and a polymer composition obtained by combining it with the aforesaid (co)polymer (A) exhibits excellent elongation and toughness and tends to have excellent transparency. Further, a hollow molded product and a film are also preferable because they are excellent not only in transparency but also in molding property.

Requirement (B2-c)

The melting point ($T_m$) of the 4-methyl-1-pentene copolymer (B2) in the present invention, as measured by DSC, is usually less than 110° C., or the melting point is not observed. When the copolymer (B2) has a melting point ($T_m$), the upper limit of the melting point is preferably 100° C., more preferably 99° C., still more preferably 95° C., and in a particularly preferred embodiment, the melting point is not observed. Although the lower limit is not specifically restricted, it is usually 80° C.

The value of the melting point ($T_m$) is a value that varies depending upon stereoregularity of the polymer and an amount of the α-olefin copolymerized, and the melting point can be controlled by the use of the later-described olefin polymerization catalyst according to the desired composition.

The copolymer (B2) having a melting point ($T_m$) of the above range is preferable from the viewpoints of transparency, moldability, flexibility and impact resistance, and therefore, a molded product obtained from a polymer composition containing the copolymer is also excellent in transparency and tends to have excellent molding property. Further, a hollow molded product tends to be able to be imparted with flexibility.

When the copolymer is combined with the aforesaid copolymer (B1), heat resistance tends to be enhanced without impairing moldability and mechanical properties because the copolymer (B1) has high heat resistance and good compatibility, so that such a combination is preferable.

When the copolymer is combined with the later-described α-olefin copolymer (C), moldability, particularly stretchability or blow moldability, is enhanced without markedly lowering heat resistance, and moreover, electrical properties tend to become good, so that such a combination is preferable.

Requirement (B2-d)

In the present invention, the molecular weight distribution (Mw/Mn) that is a ratio of the weight-average molecular weight (Mw) of the 4-methyl-1-pentene copolymer (B2), as measured by gel permeation chromatography (GPC), to the number-average molecular weight (Mn) thereof, as measured by the same, is usually 1.0 to 3.5, preferably 1.0 to 3.0, more preferably 1.5 to 2.5.

The value of the molecular weight distribution (Mw/Mn) can be controlled by the type of the later-described olefin polymerization catalyst.

The copolymer (B2) having a molecular weight distribution (Mw/Mn) of the above range is preferable from the viewpoints of transparency and mechanical properties, and therefore, a molded product obtained from a polymer composition containing the copolymer tends to also have more excellent transparency. When the copolymer is combined with the aforesaid (co)polymer (A), moldability tends to be enhanced because the molecular weight distribution of (A) is wide, and this leads to enhancement of productivity, so that such a combination is preferable.

Requirement (B2-e)

The density of the 4-methyl-1-pentene copolymer (B2) in the present invention is usually 830 to 860 kg/m$^3$, preferably 830 to 855 kg/m$^3$, more preferably 830 to 850 kg/m$^3$, still more preferably 830 to 845 kg/m$^3$.

The density value can be controlled by selecting the type or the amount of another α-olefin copolymerized with 4-methyl-1-pentene The copolymer (B2) having a density of the above range is preferable from the viewpoints of transparency and flexibility, and therefore, a molded product obtained from a polymer composition containing the copolymer tends to have more excellent transparency and flexibility.

<Production Process for 4-Methyl-1-Pentene Copolymer (B)>

The 4-methyl-1-pentene copolymer (B) in the present invention can be obtained by polymerizing 4-methyl-1-pentene, the aforesaid specific α-olefin and if necessary the aforesaid other polymerizable compounds in the presence of the same olefin polymerization catalyst as described in the aforesaid production process for the (co)polymer (A).

Of the aforesaid olefin polymerization catalysts, a metallocene catalyst can be mentioned as an embodiment of a preferred catalyst in the production of the 4-methyl-1-pentene copolymer (B).

As a preferred metallocene catalyst, a metallocene catalyst described in WO 01/53369, WO 01/27124, Japanese Patent Laid-Open Publication No. 1991-193796, Japanese Patent Laid-Open Publication No. 1990-41303 or WO 06/025540 can be mentioned.

When the 4-methyl-1-pentene copolymer (B) is prepared by the use of 4-methyl-1-pentene and a specific α-olefin in the presence of a metallocene catalyst in the present invention, the olefin tends to be introduced into a molecule relatively at random. In such a case, the melting point of the copolymer (B) is lowered by the use of a small amount of the olefin, but on the other hand, the 4-methyl-1-pentene unit chain is lengthened, so that the copolymer (B) is thought to have good compatibility with the (co)polymer (A). Further, when the copolymer (B) is combined with the (co)polymer (A), excellent transparency that is thought to be derived from good compatibility is obtained, and in addition, an excellent balance between rigidity and a melting point is obtained. Moreover, elongation that is thought to be derived from the aforesaid good compatibility is enhanced, and the balance between rigidity and elongation tends to become good, so that such a combination is preferable. This property is presumed to be brought about by that the (co)polymer (A) and the copolymer (B) have excellent compatibility with each other but they are not completely compatibilized with each other. It is thought that in a composition in such a compatibilized state, the properties of the components are compatible with each other on a high level without being spoiled.

The metallocene catalyst preferably used for the production of the 4-methyl-1-pentene copolymer (B) in the present invention is described below.

In the production of the copolymer (B), preferably used is a metallocene catalyst constituted of:

(α) a metallocene compound represented by the following general formula (1) or (2), (β) at least one compound selected from
(β-1) an organometallic compound,
(β-2) an organoaluminum oxy compound, and
(β-3) a compound which reacts with the metallocene compound (α) to form an ion pair, and if necessary, (γ) a fine particle carrier.

[(α) Metallocene Compound]

As an example of the metallocene compound capable of being used in the production of the 4-methyl-1-pentene copolymer (B), a compound represented by the following general formula (1) or (2) can be given.

[Chem. 1]

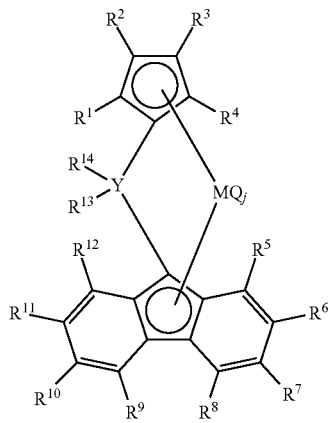

(1)

[Chem. 2]

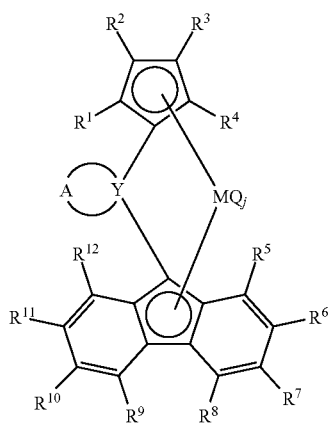

(2)

In the general formulas (1) and (2), substituents represented by $R^1$ to $R^{14}$ are each selected from a hydrogen atom, a hydrocarbon group and a silicon-containing hydrocarbon group and may be the same or different, neighboring substituents of $R^1$ to $R^4$ may be bonded to each other to form a ring, neighboring substituents of $R^5$ to $R^{12}$ may be bonded to each other to form a ring, A is a divalent hydrocarbon group of 2 to 20 carbon atoms which may partially contain an unsaturated bond and/or an aromatic ring, A may contain two or more cyclic structures including a ring formed with Y, M is a metal selected from the periodic table Group 4, Y is carbon or silicon, Q is a halogen, a hydrocarbon group, an anionic ligand or a neutral ligand capable of being coordinated by a lone pair of electrons and plural Q may be the same or different, and j is an integer of 1 to 4.

The hydrocarbon group of $R^1$ to $R^{14}$ in the general formulas (1) and (2) is preferably an alkyl group of 1 to 20 carbon atoms, an arylalkyl group of 7 to 20 carbon atoms, an aryl group of 6 to 20 carbon atoms or an alkylaryl group of 7 to 20 carbon atoms, and may contain one or more cyclic structures. A part or all of the hydrocarbon groups may be substituted by functional groups, such as a hydroxyl group, an amino group, a halogen group and a fluorine-containing hydrocarbon group. Specific examples of such hydrocarbon groups include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3- trimethylbutyl, neopentyl, cyclohexylmethyl, cyclohexyl, 1-methyl-1-cyclohexyl, 1-adamantyl, 2-adamantyl, 2-methyl-2-adamantyl, menthyl, norbornyl, benzyl, 2-phenylethyl, 1-tetrahydronaphthyl, 1-methyl-1-tetrahydronaphthyl, phenyl, biphenyl, naphthyl, tolyl, chlorophenyl, chlorobiphenyl and chloronaphthyl.

The silicon-containing hydrocarbon group of $R^1$ to $R^{14}$ in the general formulas (1) and (2) is preferably an alkylsilyl group and an arylsilyl group, which contain 1 to 4 silicon atoms and 3 to 20 carbon atoms, and specific examples thereof include trimethylsilyl, tert-butyldimethylsilyl and triphenylsilyl.

Neighboring substituents of $R^5$ to $R^{12}$ on the fluorene ring may be bonded to each other to form a ring. Examples of such substituted fluorenyl groups include benzofluorenyl, dibenzofluorenyl, octahydrodibenzofluorenyl and octamethyloctahydrodibenzofluorenyl.

The substituents of $R^5$ to $R^{12}$ on the fluorene ring may be preferably bilaterally symmetric from the viewpoint of ease of synthesis, that is, preferable are $R^5=R^{12}$, $R^6=R^{11}$, $R^7=R^{10}$ and $R^8=R^9$, and more preferable is unsubstituted fluorene, 3,6-disubstituted fluorene, 2,7-substituted fluorene or 2,3,6,7-tetrasubstituted fluorene. Here, the 3-position, the 6-position, the 2-position and the 7-position on the fluorene ring correspond to $R^7$, $R^{10}$, $R^6$ and $R^{11}$, respectively.

$R^{13}$ and $R^{14}$ in the general formula (1) are each selected from a hydrogen atom and a hydrocarbon group and may be the same or different. Specific examples of preferred hydrocarbon groups include the same groups as described for the above $R^1$ to $R^{14}$.

Y is a carbon atom or a silicon atom. In the case of the general formula (1), $R^{13}$ and $R^{14}$ are bonded to Y and constitute a substituted methylene group or a substituted silylene group as a crosslinked site. Preferred examples thereof include methylene, dimethylmethylene, diisopropylmethylene, methyl-tert-butylmethylene, dicyclohexylmethylene, methylcyclohexylmethylene, methylphenylmethylene, fluoromethylphenylmethylene, chloromethylphenylmethylene, diphenylmethylene, dichlorophenylmethylene, difluorophenylmethylene, methylnaphthylmethylene, dibiphenylmethylene, di-p-methylphenylmethylene, methyl-p-methylphenylmethylene, ethyl-p-methylphenylmethylene, dinaphthylmethylene, dimethylsilylene, diisopropylsilylene, methyl-tert-butylsilylene, dicyclohexylsilylene, methylcyclohexylsilylene, methylphenylsilylene, fluoromethylphenylsilylene, chloromethylphenylsilylene, diphenylsilylene, di-p-methylphenylsilylene, methyl-p-methylphenylsilylene, ethyl-p-methylphenylsilylene, methylnaphthylsilylene and dinaphthylsilylene.

In the case of the general formula (2), Y is bonded to a divalent hydrocarbon group A of 2 to 20 carbon atoms which may partially contain an unsaturated bond and/or an aromatic ring and constitutes a cycloalkylidene group, a cyclomethylenesilylene group or the like. Preferred examples thereof include cyclopropylidene, cyclobutylidene, cyclopentylidene, cyclohexylidene, cycloheptylidene, bicycle[3.3.1]nonylidene, norbornylidene, adamantylidene, tetrahydronaphthylidene, dihydroindanylidene, cyclodimethylenesilylene, cyclotrimethylenesilylene, cyclotetramethylenesilylene, cyclopentamethylenesilylene, cyclohexamethylenesilylene and cycloheptamethylenesilylene.

M in the general formulas (1) and (2) is a metal selected from the periodic table Group 4, and M is titanium, zirconium or hafnium.

Q is a halogen, a hydrocarbon group of 1 to 20 carbon atoms, an anionic ligand or a neutral ligand capable of being coordinated by a lone pair of electrons, and plural Q may be the same or different. Specific examples of halogens include fluorine, chlorine, bromine and iodine. Specific examples of the hydrocarbon groups include the same groups as previously described. Specific examples of the anionic ligands include alkoxy groups, such as methoxy, tert-butoxy and phenoxy, carboxylate groups, such as acetate and benzoate, and sulfonate groups, such as mesylate and tosylate. Specific examples of the neutral ligands capable of being coordinated by a lone pair of electrons include organophosphorus compounds, such as trimethylphosphine, triethylphosphine, triphenylphosphine and diphenylmethylphosphine, and ethers, such as tetrahydrofuran, diethyl ether, dioxane and 1,2-dimethoxyethane. A combination of plural Q may be a combination of the same or different groups or ligands among them, but at least one is preferably a halogen or an alkyl group.

As specific examples of the metallocene compounds in the present invention, compounds given as examples in, for example, WO 01/27124, WO 2006/025540 or WO 2007/308607 can be preferably mentioned, but the scope of the present invention is not specifically limited by them.

[Compound (β)]

The compound (β) comprises at least one compound selected from an organoaluminum compound (β-1), an organoaluminum oxy-compound (β-2) and a compound (β-3) which reacts with the above metallocene compound (α) to form an ion pair.

The components are specifically described below.

(β-1) Organometallic Compound

As the organometallic compounds (β-1) used in the present invention when needed, organometallic compounds of the periodic table Group 1, Group 2, Group 12 and Group 13 can be specifically mentioned, and for example, the below-described (β-1a), (β-1b) and (β-1c) can be mentioned. In the present invention, the later-described organoaluminum oxy-compounds (β-2) are not included in the organometallic compounds (β-1).

(β-1a) An organoaluminum compound represented by the general formula $R^a{}_m Al(OR^b)_n H_p X_q$ (wherein $R^a$ and $R^b$ may be the same as or different from each other and are each a hydrocarbon group of 1 to 15 carbon atoms, preferably 1 to 4 carbon atoms, X represents a halogen atom, m is a number of $0<m\leq3$, n is a number of $0\leq n<3$, p is a number of $0\leq p<3$, q is a number of $0\leq q<3$, and m+n+p+q=3).

(β-1b) A complex alkylated compound of a periodic table Group 1 metal and aluminum, which is represented by the general formula $M^2 AlR^a{}_4$ (wherein $M^2$ is Li, Na or K, and $R^a$ is a hydrocarbon group of 1 to 15 carbon atoms, preferably 1 to 4 carbon atoms).

(β-1c) A dialkyl compound of a periodic table Group 2 or Group 12 metal, which is represented by the general formula $R^a R^b M^3$ (wherein $R^a$ and $R^b$ may be the same as or different from each other and are each a hydrocarbon group of 1 to 15 carbon atoms, preferably 1 to 4 carbon atoms, and $M^3$ is Mg, Zn or Cd).

Examples of the organoaluminum compounds belonging to the above (β-1a) include such compounds as described below.

An organoaluminum compound represented by the general formula $R^a{}_m Al(OR^b)_{3-m}$ (wherein $R^a$ and $R^b$ may be the same as or different from each other and are each a hydrocarbon group of 1 to 15 carbon atoms, preferably 1 to 4 carbon atoms, and m is preferably a number of 1.53), an organoaluminum compound represented by the general formula $R^a{}_m AlX_{3-m}$ (wherein $R^a$ is a hydrocarbon group of 1 to 15 carbon atoms, preferably 1 to 4 carbon atoms, X is a halogen atom, and m is preferably a number of 0<m<3), an organoaluminum compound represented by the general formula $R^a{}_m AlH_{3-m}$ (wherein $R^a$ is a hydrocarbon group of 1 to 15 carbon atoms, preferably 1 to 4 carbon atoms, and m is preferably a number of 2≤m≤3), and an organoaluminum compound represented by the general formula $R^a{}_m Al(OR^b)_n X_q$ (wherein $R^a$ and $R^b$ may be the same as or different from each other and are each a hydrocarbon group of 1 to 15 carbon atoms, preferably 1 to 4 carbon atoms, X is a halogen atom, m is a number of 0<m≤3, n is a number of 0≤n<3, q is a number of 0≤q<3, and m+n+q=3).

More specific examples of the organoaluminum compounds belonging to (β-1a) include tri(n-alkyl)aluminums, such as trimethylaluminum, triethylaluminum, tri(n-butyl) aluminum, tripropylaluminum, tripentylaluminum, trihexylaluminum, trioctylaluminum and tridecylaluminum; tri branched chain-alkylaluminums, such as triisopropylaluminum, triisobutylaluminum, tri(sec-butyl)aluminum, tri(tert-butyl)aluminum, tri(2-methylbutyl)aluminum, tri(3-methylbutyl)aluminum, tri(2-methylpentyl)aluminum, tri(3-methylpentyl)aluminum, tri(4-methylpentyl)aluminum, tri (2-methylhexyl)aluminum, tri(3-methylhexyl)aluminum and tri(2-ethylhexyl)aluminum; tricycloalkylaluminums, such as tricyclohexylaluminum and tricyclooctylaluminum; triarylaluminums, such as triphenylaluminum and tritolylaluminum; dialkylaluminum hydrides, such as diethylaluminum hydride and diisobutylaluminum hydride; alkenylaluminums represented by $(iC_4H_9)_x Al_y (C_5H_{10})_z$, (wherein x, y and z are each a positive number, z≥2x, and $iC_4H_9$ represents an isobutyl group), such as isoprenylaluminum; alkylaluminum alkoxides, such as isobutylaluminum methoxide, isobutylaluminum ethoxide and isobutylaluminum isopropoxide; dialkylaluminum alkoxides, such as dimethylaluminum methoxide, diethylaluminum ethoxide and dibutylaluminum butoxide; alkylaluminum sesquialkoxides, such as ethylaluminum sesquiethoxide and butylaluminum sesquibutoxide; partially alkoxylated alkylaluminums having average composition represented by $R^a{}_{2.5}Al(OR^b)_{0.5}$ (wherein $R^a$ and $R^b$ may be the same as or different from each other and are each a hydrocarbon group of 1 to 15 carbon atoms, preferably 1 to 4 carbon atoms) or the like; dialkylaluminum aryloxides, such as diethylaluminum phenoxide, diethylaluminum (2,6-di-tert-butyl-4-methylphenoxide), ethylaluminum bis(2,6-di-tert-butyl-4-methylphenoxide), diisobutylalumium (2,6-di-tert-butyl-4-methylphenoxide) and isobutylaluminum bis(2,6-di-tert-butyl-4-methylphenoxide); dialkylaluminum halides, such as dimethylaluminum chloride, diethylaluminum chloride, dibutylaluminum chloride, diethylaluminum bromide and diisobutylaluminum chloride; alkylaluminum sesquihalides, such as ethylaluminum sesquichloride, butylaluminum sesquichloride and ethylaluminum sesquibromide; partially halogenated alkylaluminums, e.g., alkylaluminum dihalides, such as ethylaluminum dichloride, propylaluminum dichloride and butylaluminum dibromide; dialkylaluminum hydrides, such as diethylaluminum hydride and dibutylaluminum hydride; otherpartiallyhydrogenatedalkylaluminums, e.g., alkylaluminum dihydrides, such as ethylaluminum dihydride and propylaluminum dihydride; partially alkoxylated and halogenated alkylaluminums, such as ethylaluminum ethoxychloride, butylaluminum butoxychloride and ethylaluminum ethoxybromide.

Further, a compound analogous to (β-1a) can be also used, and for example, an organoaluminum compound wherein two or more aluminum compounds are bonded through a nitrogen atom can be mentioned. A specific example of such a compound is $(C_2H_5)_2 AlN(C_2H_5)Al(C_2H_5)_2$.

Examples of the compounds belonging to (β-1b) include $LiAl(C_2H_5)_4$ and $LiAl(C_7H_{15})_4$.

Examples of the compounds belonging to (β-1c) include dimethylmagnesium, diethylmagnesium, dibutylmagnesium and butylethylmagnesium.

As the organometallic compounds (β-1) other than (β-1a) to (β-1c), methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, etc. can be also used.

Further, a combination of compounds that forms the organoaluminum compound in a polymerization reaction system, such as a combination of aluminum halide and alkyllithium or a combination of aluminum halide and alkylmagnesium, can be also used.

Of the organometallic compounds (β-1), an organoaluminum compound is preferable. Such organometallic compounds (β-1) as above can be used singly or in combination of two or more kinds.

(β-2) Organoaluminum Oxy-Compound

The organoaluminumoxy-compound (β-2) that is used in the present invention when needed may be hitherto publicly known aluminoxane or may be such a benzene-insoluble organoaluminum oxy-compound as given as an example in Japanese Patent Laid-Open Publication No. 1990-78687.

The hitherto publicly known aluminoxane can be prepared by, for example, the following processes, and is usually obtained as a solution of a hydrocarbon solvent. (1) A process wherein to a hydrocarbon medium suspension of a compound containing adsorbed water or a salt containing water of crystallization, such as magnesium chloride hydrate, copper sulfate hydrate, aluminum sulfate hydrate, nickel sulfate hydrate or cerous chloride hydrate, an organoaluminum compound such as trialkylaluminum is added to allow the adsorbed water or the water of crystallization to react with the organoaluminum compound. (2) A process wherein in a medium such as benzene, toluene, ethyl ether or tetrahydrofuran, water, ice or water vapor is allowed to directly act on an organoaluminum compound such as trialkylaluminum. (3) A process wherein in a medium such as decane, benzene or toluene, an organotin oxide such as dimethyltin oxide or dibutyltin oxide is allowed to react with an organoaluminum compound such as trialkylaluminum.

The aluminoxane may contain a small amount of an organometallic component. It is also possible that from the solution of aluminoxane recovered, the solvent or an unreacted organoaluminum compound is removed by distillation, and then the residue is redissolved in a solvent or suspended in a poor solvent for aluminoxane.

Examples of the organoaluminum compounds used for preparing aluminoxane include the same compounds as given as examples of the organoaluminum compounds belonging to the aforesaid (β-1a).

Of these, trialkylaluminums and tricycloalkylaluminums are preferable, and trimethylaluminum is particularly preferable.

Such organoaluminum compounds as above are used singly or in combination of two or more kinds.

Examples of the solvents used for preparing aluminoxane include hydrocarbon solvents, e.g. aromatic hydrocarbons, such as benzene, toluene, xylene, cumene and cymene, aliphatic hydrocarbons, such as pentane, hexane, heptane, octane, decane, dodecane, hexadecane and octadecane, alicyclic hydrocarbons, such as cyclopentane, cyclohexane, cyclooctane and methylcyclopentane, petroleum fractions, such as gasoline, kerosine and gas oil, and halides of the above aromatic hydrocarbons, aliphatic hydrocarbons and alicyclic hydrocarbons, particularly chlorides and bromides thereof. Further, ethers, such as ethyl ether and tetrahydrofuran, are also employable. Of these solvents, aromatic hydrocarbons or aliphatic hydrocarbons are particularly preferable.

The benzene-insoluble organoaluminum oxy-compound for use in the present invention is preferably a compound containing an Al component that is soluble in benzene at 60° C. usually in an amount of not more than 10%, preferably not more than 5%, particularly preferably not more than 2%, in terms of Al atom, namely, a compound that is insoluble or slightly soluble in benzene.

As an example of the organoaluminum oxy-compound for use in the present invention, an organoaluminum oxy-compound containing boron, which is represented by the following general formula (i), can be also mentioned.

[Chem. 3]

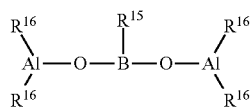
(i)

In the formula (i), $R^{15}$ represents a hydrocarbon group of 1 to 10 carbon atoms. Plural $R^{16}$ may be the same as or different from one another and are each a hydrogen atom, a halogen atom or a hydrocarbon group of 1 to 10 carbon atoms.

The organoaluminum oxy-compound containing boron, which is represented by the general formula (i), can be prepared by allowing an alkylboronic acid represented by the following general formula (ii) to react with an organoaluminum compound in an inert solvent in an inert gas atmosphere at a temperature of −80° C. to room temperature for 1 minute to 24 hours.

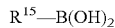  (ii)

In the formula (ii), $R^{15}$ is a group selected from the same groups as in the above formula (i).

Specific examples of the alkylboronic acids represented by the general formula (ii) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluorophenylboronic acid, pentafluorophenylboronic acid and 3,5-bis(trifluoromethyl)phenylboronic acid. Of these, methylboronic acid, n-butylboronic acid, isobutylboronic acid, 3,5-difluorophenylboronic acid and pentafluorophenylboronic acid are preferable.

These are used singly or in combination of two or more kinds.

Specific examples of the organoaluminum compounds allowed to react with such alkylboronic acids include the same organoaluminum compounds as given as examples of the organoaluminum compounds belonging to the aforesaid (β-1a). Of these, trialkylaluminums and tricycloalkylaluminums are preferable, and trimethylaluminum, triethylaluminum and triisobutylaluminum are particularly preferable. These are used singly or in combination of two or more kinds.

Such organoaluminum oxy-compounds (β-2) as above are used singly or in combination of two or more kinds.

(β-3) Compound which Reacts with the Metallocene Compound to Form an Ion Pair

The compound (β-3) which reacts with the metallocene compound (α) to form an ion pair and which is used in the present invention when needed is a compound which reacts with the metallocene compound (α) to form an ion pair. Therefore, at least a compound which is brought into contact with the metallocene compound (α) to form an ion pair is included in such compounds.

Examples of such compounds include Lewis acid, an ionic compound, a borane compound and a carborane compound which are described in Japanese Patent Laid-Open Publication No. 1989-501950, Japanese Patent Laid-Open Publication No. 1989-502036, Japanese Patent Laid-Open Publication No. 1991-179005, Japanese Patent Laid-Open Publication No. 1991-179006, Japanese Patent Laid-Open Publication No. 1991-207703, Japanese Patent Laid-Open Publication No. 1991-207704, U.S. Pat. No. 5,321,106, etc. Further, a heteropoly compound and an isopoly compound can be also mentioned.

The Lewis acid is specifically a compound represented by $BR_3$ (R is a phenyl group which may have a substituent such as fluorine, methyl group or trifluoromethyl group, or fluorine), and examples thereof include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

The ionic compound is, for example, a compound represented by the following general formula (iii).

[Chem. 4]

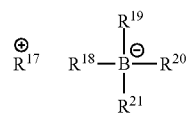
(iii)

In the formula (iii), $R^{17+}$ is $H^+$, carbonium cation, oxonium cation, ammonium cation, phosphonium cation, cycloheptyltrienyl cation, ferrocenium cation having a transition metal, or the like.

$R^{18}$ to $R^{21}$ may be the same as or different from one another and are each an organic group, preferably an aryl group or a substituted aryl group.

Specific examples of the carbonium cations include tri-substituted carbonium cations, such as triphenylcarbonium cation, tri(methylphenyl)carbonium cation and tri(dimethylphenyl) carbonium cation.

Specific examples of the ammonium cations include trialkylammonium cations, such as trimethylammonium cation, triethylammonium cation, tri(n-propyl)ammonium cation and tri(n-butyl)ammonium cation; N,N-dialkylanilinium cations, such as N,N-dimethylanilinium cation, N,N-diethylanilinium cation and N,N,2,4,6-pentamethylanilinium cation; and dialkylammonium cations, such as di(isopropyl)ammonium cation and dicyclohexylammonium cation.

Specific examples of the phosphonium cations include triarylphosphonium cations, such as triphenylphosphonium cation, tri(methylphenyl)phosphonium cation and tri(dimethylphenyl)phosphonium cation.

As $R^{17+}$, carbonium cation, ammonium cation or the like is preferable, and triphenylcarbonium cation, N,N-dimethylanilinium cation or N,N-diethylanilinium cation is particularly preferable.

As the ionic compounds, trialkyl-substituted ammonium salts, N,N-dialkylanilinium salts, dialkylammonium salts, triarylphosphonium salts, etc. can be also mentioned.

Specific examples of the trialkyl-substituted ammonium salts include triethylammonium tetraphenylborate, tri(n-propyl)ammonium tetraphenylborate, tri(n-butyl)ammonium tetraphenylborate, trimethylammonium tetra(p-tolyl)borate, trimethylammonium tetra(o-tolyl)borate, tri(n-butyl)ammonium tetra(pentafluorophenyl)borate, tri(n-propyl)ammonium tetra(o,p-dimethylphenyl)borate, tri(n-butyl)ammonium tetra(m,m-dimethylphenyl)borate, tri(n-butyl)ammonium tetra(p-trifluoromethylphenyl)borate, tri(n-butyl)ammonium tetra(3,5-ditrifluoromethylphenyl)borate and tri(n-butyl)ammonium tetra(o-tolyl)borate.

Specific examples of the N,N-dialkylanilinium salts include N,N-dimethylanilinium tetraphenylborate, N,N-diethylanilinium tetraphenylborate and N,N,2,4,6-pentamethylanilinium tetraphenylborate.

Specific examples of the dialkylammonium salts include di(n-propyl)ammonium tetra(pentafluorophenyl)borate and dicyclohexylammonium tetraphenylborate.

As the ionic compounds, further, triphenylcarbenium tetrakis(pentafluorophenyl)borate, N,N-dimethylanilinium tetrakis(pentafluorophenyl)borate, ferrocenium tetra(pentafluorophenyl)borate, triphenylcarbenium pentaphenylcyclopentadienyl complex, N,N-diethylanilinium pentaphenylcyclopentadienyl complex, a boron compound represented by the following formula (iv) or (v), etc. can be also mentioned.

[Chem. 5]

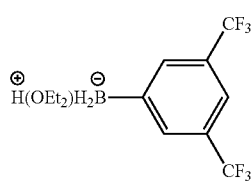

(iv)

In the formula (iv), Et represents an ethyl group.

[Chem. 6]

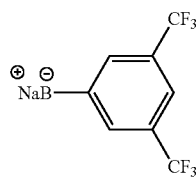

(v)

Specific examples of the borane compounds include decaborane (14); salts of anions, such as bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorodecaborate and bis[tri(n-butyl)ammonium]dodecachlorododecaborate; and salts of metallic borane anions, such as tri(n-butyl)ammonium bis(dodecahydride dodecaborate)cobaltate(III) and bis[tri(n-butyl)ammonium]bis(dodecahydride dodecaborate)nickelate(III).

Specific examples of the carborane compounds include 4-carbanonaborane (14), 1,3-dicarbanonaborane (13), 6,9-dicarbadecaborane (14), dodecahydride-1-phenyl-1,3-dicarbanonaborane, dodecahydride-1-methyl-1,3-dicarbanonaborane, undecahydride-1,3-dimethyl-1,3-dicarbanonaborane, 7,8-dicarbaundecaborane (13), 2,7-dicarbaundecaborane (13), undecahydride-7,8-dimethyl-7,8-dicarbaundecaborane, dodecahydride-11-methyl-2,7-dicarbaundecaborane; salts of anions, such as tri(n-butyl)ammonium 1-carbadecaborate, tri(n-butyl)ammonium 1-carbaundecaborate, tri(n-butyl)ammonium 1-carbadodecaborate, tri(n-butyl)ammonium 1-trimethylsilyl-1-carbadecaborate, tri(n-butyl)ammonium bromo-1-carbadodecaborate, tri(n-butyl)ammonium 6-carbadecaborate (14), tri(n-butyl) ammonium 6-carbadecaborate (12), tri(n-butyl)ammonium 7-carbaundecaborate (13), tri(n-butyl)ammonium 7,8-dicarbaundecaborate (12), tri(n-butyl)ammonium 2,9-dicarbaundecaborate (12), tri(n-butyl)ammonium dodecahydride-8-methyl-7,9-dicarbaundecaborate, tri(n-butyl)ammonium undecahydride-8-ethyl-7,9-dicarbaundecaborate, tri(n-butyl)ammonium undecahydride-8-butyl-7,9-dicarbaundecaborate, tri(n-butyl)ammonium undecahydride-8-allyl-7,9-dicarbaundecaborate, tri(n-butyl)ammonium undecahydride-9-trimethylsilyl-7,8-dicarbaundecaborate and tri(n-butyl)ammonium undecahydride-4,6-dibromo-7-carbaundecaborate; and salts of metallic carborane anions, such as tri(n-butyl)ammonium bis(nonahydride-1,3-dicarbanonaborate)cobaltate(III), tri(n-butyl)ammonium bis(undecahydride-7,8-dicarbaundecaborate)ferrate(III), tri(n-butyl)ammonium bis(undecahydride-7,8-dicarbaundecaborate)cobaltate(III), tri(n-butyl)ammonium bis(undecahydride-7,8-dicarbaundecaborate)nickelate(III), tri(n-butyl)ammonium bis(undecahydride-7,8-dicarbaundecaborate)cuprate(III), tri(n-butyl)ammonium bis(undecahydride-7,8-dicarbaundecaborate)aurate(III), tri(n-butyl)ammonium bis(nonahydride-7,8-dimethyl-7,8-dicarbaundecaborate)ferrate(III), tri(n-butyl)ammonium bis(nonahydride-7,8-dimethyl-7,8-dicarbaundecaborate) chromate(III), tri(n-butyl)ammonium bis(tribromooctahydride-7,8-dicarbaundecaborate)cobaltate (III), tris[tri(n-butyl)ammonium]bis(undecahydride-7-carbaundecaborate) chromate(III), bis[tri(n-butyl)ammonium]bis(undecahydride-7-carbaundecaborate) manganate(IV), bis[tri(n-butyl)ammonium]bis(undecahydride-7-carbaundecaborate)cobaltate(III) and bis[tri(n-butyl)ammonium]bis(undecahydride-7-carbaundecaborate)nickelate(IV).

The heteropoly compound is composed of an atom of silicon, phosphorus, titanium, germanium, arsenic or tin and one or more atoms selected from vanadium, niobium, molybdenum and tungsten. Specifically, phosphovanadic acid, germanovanadic acid, arsenovanadic acid, phosphoniobic acid, germanoniobic acid, siliconomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotungstovanadic acid, phosphomolybdotungstovanadic acid, germanomolybdotungstovanadic acid, phosphomolybdotungstic acid, phosphomolybdoniobic acid, salts of these acids, e.g., salts of these acids and periodic table Group 1 or Group 2 metals, such as lithium, sodium, potassium, rubidium, cesium, beryllium, magnesium, calcium, strontium and barium, organic salts such as triphenylethyl salt, and isopoly compounds can be used, without limiting thereto.

As the heteropoly compound and the isopoly compound, not only one of the above compounds but also two or more of them can be used.

Such compounds (β-3) as above, which react with the metallocene compound (α) to form an ion pair, are used singly or in combination of two or more kinds.

[(γ) Fine Particle Carrier]

The metallocene catalyst preferably used for the production of the 4-methyl-1-pentene copolymer (B) in the present invention may contain a fine particle carrier (γ) when needed.

In the production process for the copolymer (B), the above olefin polymerization catalyst may be used by allowing the fine particle carrier (γ) to support the catalyst thereon. Particularly in bulk polymerization using the later-described supported catalyst, a catalyst in the supported form on the fine particle carrier (γ) is preferably utilized.

The fine particle carrier (γ) is an inorganic or organic compound and is a granular or finely particulate solid.

As the inorganic compounds, a porous oxide, an inorganic halide, clay, clay mineral or an ion-exchange layered compound are preferable. As the porous oxides, $SiO_2$, $Al_2O_3$, MgO, ZrO, $TiO_2$, $B_2O_3$, CaO, ZnO, BaO, $ThO_2$, and composites or mixtures containing them, such as natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$MgO, can be specifically used. Of these, compounds containing $SiO_2$ and/or $Al_2O_3$ as a main component are preferable.

The inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

As the inorganic halides, $MgCl_2$, $MgBr_2$, $MnCl_2$, $MnBr_2$, etc. are used. The inorganic halide may be used as it is, or may be used after pulverized by a ball mill or an oscillation mill. Further, a fine particle precipitate obtained by dissolving the inorganic halide in a solvent such as an alcohol and then precipitating fine particles by the use of a precipitant can be also used.

Clay usually comprises clay mineral as a main component. The ion-exchange layered compound is a compound having a crystal structure in which planes constituted of ionic bonds or the like are laid one upon another in parallel by weak bonding power, and the ions contained are exchangeable. Most of clay minerals are ion-exchange layered compounds. As these clay, clay mineral and ion-exchange layered compound, not only natural ones but also artificial synthetic products can be used.

Examples of clay, clay minerals or the ion-exchange layered compounds include clay, clay minerals and crystalline ionic compounds having layered crystal structures, such as hexagonal closest packing type, antimony type, $CdCl_2$ type and $CdI_2$ type.

Specific examples of such clay and clay minerals include kaolin, bentonite, Kibushi clay, gairome clay, allophane, hisingerite, pyrophyllite, mica group, montmorillonite group, vermiculite, chlorite group, palygorskite, kaolinite, nacrite, dickite and halloysite. Specific examples of the ion-exchange layered compounds include crystalline acid salts of polyvalent metals, such as α-Zr(HAsO$_4$)$_2$·H$_2$O, α-Zr(HPO$_4$)$_2$, α-Zr(KPO$_4$)$_2$·3H$_2$O, α-Ti(HPO$_4$)$_2$, α-Ti(HAsO$_4$)$_2$H$_2$O, α-Sn(HPO$_4$)$_2$·H$_2$O, γ-Zr(HPO$_4$)$_2$, γ-Ti(HPO$_4$)$_2$ and γ-Ti(NH$_4$PO$_4$)$_2$·H$_2$O.

Such clay, clay minerals and ion-exchange layered compounds as above preferably have a volume of pores having a radius of not less than 20 Å, as measured by a mercury intrusion method, of not less than 0.1 cc/g, particularly preferably 0.3 to 5 cc/g. Here, the pore volume is measured by a mercury intrusion method using a mercury porosimeter in the pore radius range of 20 to $3 \times 10^4$ Å.

If an inorganic compound in which the volume of pores having a radius of not less than 20 Å is less than 0.1 cc/g is used as a carrier, high polymerization activity tends to be rarely obtained.

It is also preferable to subject clay and clay mineral to chemical treatment.

As the chemical treatment, any of treatments, such as a surface treatment to remove impurities adhering to the surface and a treatment exerting influence on the crystal structure of clay, can be used. Specific examples of the chemical treatments include acid treatment, alkali treatment, salt treatment and organic substance treatment. In the acid treatment, impurities on the surface are removed, and moreover, cations in the crystal structure, such as Al, Fe and Mg, are eluted to increase the surface area. In the alkali treatment, the crystal structure of clay is broken to bring about a change of the structure of clay.

In the salt treatment or the organic substance treatment, an ionic composite, a molecular composite, an organic derivate or the like is formed, whereby the surface area or the interlaminar distance can be changed.

The ion-exchange layered compound may be a layered compound in which the interlaminar distance has been increased by exchanging exchangeable ions present between layers with other large and bulky ions utilizing ion-exchange property.

Such a bulky ion plays a pillar-like role for supporting a layered structure and is usually called a "pillar". Introduction of another substance between layers of the layered compound is referred to as "intercalation". Examples of guest compounds to be intercalated include cationic inorganic compounds, such as $TiCl_4$ and $ZrCl_4$, metallic alkoxides, such as $Ti(OR)_4$, $Zr(OR)_4$, $PO(OR)_3$ and $B(OR)_3$ (R is a hydrocarbon group or the like), and metallic hydroxide ions, such as $[Al_{13}O_4(OH)_{24}]^{7+}$, $[Zr_4(OH)_{14}]^{2+}$ and $[Fe_3O(OCOCH_3)_6]^+$. These compounds are used singly or in combination of two or more kinds. When these compounds are intercalated, a polymerization product obtained by hydrolyzing a metal alkoxide, such as $Si(OR)_4$, $Al(OR)_3$ or $Ge(OR)_4$ (R is a hydrocarbon group of the like), a colloidal inorganic compound such as $SiO_2$, or the like, can be allowed to coexist. As the pillars, an oxide formed by intercalating the above metallic hydroxide ion between layers and then performing thermal dehydration, etc. can be mentioned.

The clay, the clay mineral and the ion-exchange layered compound may be used as they are, or may be used after a treatment of ball milling, sieving or the like is carried out. They may be used after water is added and adsorbed or after a thermal dehydration treatment is carried out. They may be used singly or in combination of two or more kinds.

When ion-exchange layered silicate is used, it functions as a carrier, and in addition, by utilizing the ion-exchange property and the layered structure, the amount of the organoaluminum oxy-compound added, such as alkylaluminoxane, can be reduced. Naturally, the ion-exchange layered silicate is mainly produced as a main component of clay mineral, but it is not specifically limited to natural one, and it may be an artificial synthetic product. Specific examples of the clay, the clay minerals and the ion-exchange layered silicates include kaolinite, montmorillonite, hectorite, bentonite, smectite, vermiculite, taeniolite, synthetic mica and synthetic hectorite.

As the organic compound, a granular or finely particulate solid having a particle diameter of 5 to 300 μm can be mentioned. Specific examples thereof include (co)polymers formed by using, as a main component, an α-olefin of 2 to 14 carbon atoms, such as ethylene, propylene, 1-butene or 4-methyl-1-pentene, (co)polymers formed by using, as a main component, vinylcyclohexane or styrene, and polymers or modified products having a polar functional group which are obtained by copolymerizing or graft polymerizing the above copolymers or polymers with a polar monomer, such as acrylic acid, acrylic acid ester or maleic anhydride. These particle carriers can be used singly or in combination of two or more kinds.

[Polymerization Conditions]

In the present invention, polymerization of 4-methyl-1-pentene and a specific α-olefin to obtain the copolymer (B) can be carried out by any of a liquid phase polymerization process such as solution polymerization or suspension polymerization and a gas phase polymerization process. In the liquid phase polymerization process, an inert hydrocarbon solvent may be used, and examples thereof include aliphatic hydrocarbons, such as propane, butane, pentane, hexane, heptane, octane, decane, dodecane and kerosine; alicyclic hydrocarbons, such as cyclopentane, cyclohexane, methylcyclopentane and methylcyclohexane; aromatic hydrocarbons, such as benzene, toluene and xylene; halogenated hydrocarbons, such as ethylene chloride, chlorobenzene, dichloromethane, trichloromethane and tetrachloromethane; and mixtures of these hydrocarbons. Further, bulk polymerization using 4-methyl-1-pentene-containing olefins themselves as solvents can be carried out.

So-called multi-step polymerization wherein the polymerization conditions are stepwise changed to produce a polymer can be carried out. For example, by stepwise carrying out polymerization under two kinds of conditions different in the amount of hydrogen used or the ratio between 4-methyl-1-pentene and an α-olefin, it is also possible to obtain the copolymer (B) having a desired wide molecular weight distribution or a wide composition distribution. Further, by stepwise carrying out homopolymerization of 4-methyl-1-pentene and copolymerization of 4-methyl-1-pentene and another olefin, it is also possible to obtain the copolymer (B) having a controlled composition distribution.

In the polymerization, the component ($\alpha$) is used usually in an amount of $10^{-8}$ to $10^{-2}$ mol, preferably $10^{-7}$ to $10^{-3}$ mol, in terms of a periodic table Group 4 metal atom, based on 1 liter of the reaction volume.

When the component ($\beta$) is used, the component ($\beta$-1) is used in such an amount that the molar ratio $[(\beta\text{-}1)/M]$ of the component ($\beta$-1) to the transition metal atom (M) in the component ($\alpha$) becomes usually 0.01 to 100000, preferably 0.05 to 50000.

The component ($\beta$-2) is used in such an amount that the molar ratio $[(\beta\text{-}2)/M]$ of aluminum atom in the component ($\beta$-2) to the transition metal atom (M) in the component ($\alpha$) becomes usually 10 to 500000, preferably 20 to 100000.

The component ($\beta$-3) is used in such an amount that the molar ratio $[(\beta\text{-}3)/M]$ of the component ($\beta$-3) to the transition metal atom (M) in the component ($\alpha$) becomes usually 1 to 10, preferably 1 to 5.

The polymerization temperature is usually in the range of −50 to 200° C., preferably 0 to 100° C., more preferably 20 to 100° C. A too low polymerization temperature tends to be industrially disadvantageous from the viewpoints of polymerization activity per unit catalyst, heat recovery efficiency, etc.

The polymerization pressure is in the range of usually normal pressure to 10 MPa gauge pressure, preferably normal pressure to 5 MPa gauge pressure, and the polymerization reaction can be carried out by any of a batch process, a semi-continuous process and a continuous process. It is also possible to carry out the polymerization in two or more steps different in reaction conditions.

In the polymerization, hydrogen can be added for the purpose of controlling a molecular weight of the resulting polymer or polymerization activity, and the amount of hydrogen is suitably about 0.001 to 100 NL based on 1 kg of an olefin.

<Production Process for 4-Methyl-1-Pentene (Co)Polymer Composition>

The production process for the 4-methyl-1-pentene (co)polymer of the present invention is described.

The (co)polymer composition can be obtained by blending the aforesaid components (A) and (B) in specific amounts and if necessary adding/mixing the later-described additives and α-olefin polymer (C).

For mixing the components, publicly known various methods, such as a multi-step polymerization method, a method of mixing them by a Plastomill, a Henschel mixer, a V-blender, a ribbon blender, a tumbler, a blender, a Kneader-Ruder or the like, and a method comprising mixing them, then melt kneading the mixture by a single screw extruder, a twin-screw extruder, a kneader, a Banbury mixer or the like and then performing granulation or pulverization, can be adopted. By such a method, the (co)polymer composition of high quality in which the components and the additives are homogeneously dispersed and mixed can be obtained.

[Additives]

To the (co)polymer composition of the present invention, a nucleating agent that is a specific arbitrary component may be added in order to further improve moldability, that is, in order to raise the crystallization temperature to thereby increase a crystallization rate. In this case, the nucleating agent is, for example, a dibenzylidene sorbitol-based nucleating agent, a phosphoric acid ester salt-based nucleating agent, a rosin-based nucleating agent, a benzoic acid metal salt-based nucleating agent, fluorinated polyethylene, sodium 2,2-methylenebis(4,6-di-t-butylpheyl)phosphate, pimelic acid or its salt, 2,6-naphthalenedicarboxylic acid dicyclohexyl amide, or the like. Although the amount of the nucleating agent added is not specifically restricted, it is preferably about 0.1 to 1 part by weight based on 100 parts by weight of the (co)polymer composition. The timing of addition is not specifically restricted, and it is possible to add the nucleating agent during polymerization, after polymerization or during molding.

To the (co)polymer composition of the present invention, secondary antioxidant, heat stabilizer, weathering stabilizer, antistatic agent, slip agent, anti-blocking agent, anti-fogging agent, lubricant, dye, pigment, natural oil, synthetic oil, wax, filler, hydrochloric acid absorbent, other olefin polymers, etc. can be further added when needed, within limits not detrimental to the object of the present invention. Although the amount of the additives added is not specifically restricted, it is usually 0 to 50 parts by weight, preferably 0 to 30 parts by weight, more preferably 0 to 10 parts by weight, particularly preferably 0 to 1 part by weight, based on 100 parts by weight of the (co)polymer composition.

As the antioxidant, a publicly known antioxidant is employable. Specifically, a hindered phenol compound, a sulfur-based antioxidant, a lactone-based antioxidant, an organic phosphite compound, an organic phosphonate compound or a combination or several kinds of them can be used.

Examples of the lubricants include sodium, calcium or magnesium salts of saturated or unsaturated fatty acids such as lauric acid, palmitic acid, oleic acid and stearic acid. These lubricants can be used singly or in combination of two or more kinds. The amount of the lubricant added is desired to be usually 0.1 to 3 parts by weight, preferably about 0.1 to 2 parts by weight, based on 100 parts by weight of the (co)polymer composition.

As the slip agent, an amide of a saturated or unsaturated fatty acid such as lauric acid, palmitic acid, oleic acid, stearic acid, erucic acid or behenic acid (docosanoic acid), or a bisamide of the saturated or unsaturated fatty acid is preferably used. Of these, erucic acid amide and ethylenebisstearamide are particularly preferable. It is preferable to add the fatty acid amide usually in an amount of 0.01 to 5 parts by weight based on 100 parts by weight of the polymer composition of the present invention.

Examples of the anti-blocking agents include finely powdered silica, finely powdered aluminum oxide, finely powdered clay, a powdered or liquid silicon resin, a tetrafluoroethylene resin, and a finely powdered crosslinked resin such as a crosslinked acrylic or methacrylic resin powder. Of these, finely powdered silica and a crosslinked acrylic or methacrylic resin powder are preferable.

Examples of other olefin polymers include publicly known ethylene-based polymers, propylene-based polymers, butene-based polymers and cyclic olefin copolymers, which are different from the (co)polymer (A), the copolymer (B) and the α-olefin polymer (C) in the present invention. In the ethylene-based polymers, copolymers such as an ethylene/propylene copolymer, an ethylene/butene copolymer, an ethylene/hexene copolymer and an ethylene/octene copolymer are included. In the propylene-based polymers, copolymers such as a propylene/ethylene copolymer, a propylene/butene copolymer and a propylene/butene/ethylene copolymer are included. In the butene-based polymers, copolymers such as a butene/propylene copolymer and a butene/ethylene copolymer are included.

[Preferred Embodiments of 4-Methyl-1-Pentene (Co)Polymer Composition]

A preferred embodiment of the 4-methyl-1-pentene (co)polymer composition is a 4-methyl-1-pentene (co)polymer composition (X) described below, and more preferred embodiments thereof are 4-methyl-1-pentene (co)polymer compositions (X1) to (X6).

The characteristics of the compositions are described below in detail. Each of the compositions can be obtained in accordance with the aforesaid production process for a 4-methyl-1-pentene (co)polymer composition.

4-Methyl-1-Pentene (Co)Polymer Composition (X)

In the present invention, the 4-methyl-1-pentene (co)polymer composition (X) comprises two or more different 4-methyl-1-pentene (co)polymers, and more specifically, it comprises the 4-methyl-1-pentene (co)polymer (A) in an amount of 1 to 99 parts by weight, preferably 5 to 90 parts by weight, more preferably 10 to 90 parts by weight, still more preferably 20 to 80 parts by weight, and the 4-methyl-1-pentene copolymer (B) in an amount of 99 to 1 part by weight, preferably 95 to 10 parts by weight, more preferably 90 to 10 parts by weight, still more preferably 80 to 20 parts by weight (with the proviso that the total amount of (A) and (B) is 100 parts by weight).

In the composition (X), UX-1 is preferably 99% by mol to 65% by mol, more preferably 95 to 70% by mol, and UX-2 is preferably 1% by mol to 35% by mol, more preferably 5 to 30% by mol.

In the (co)polymer composition (X), the 4-methyl-1-pentene copolymer (B1) and/or the 4-methyl-1-pentene copolymer (B2) is preferably contained, and the mixing ratio ((B1)/(B2)) of B1 to B2 is 100/0 to 0/100. This mixing ratio can be arbitrarily changed in order to obtain desired properties of the (co)polymer composition (X). The composition containing the components in amounts of such ranges is excellent in heat resistance, moldability, mechanical properties, transparency and a balance between elongation and toughness. Therefore, a molded product composed of the composition inherits such excellent effects, and it tends to be excellent in heat resistance and transparency and tends to be uniformly stretched, so that such a molded product is preferable.

From the viewpoints of transparency, heat resistance and elongation, UX-1 is preferably 95 to 72% by mol, more preferably 93 to 75% by mol, and UX-2 is preferably 5 to 28% by mol, more preferably 7 to 25% by mol (with the proviso that the total amount of UX-1 and UX-2 is 100% by mol).

4-Methyl-1-Pentene (Co)Polymer Composition (X1)

In the present invention, the 4-methyl-1-pentene (co)polymer composition (X1) comprises the 4-methyl-1-pentene (co)polymer (A) in an amount of 10 to 90 parts by weight, preferably 15 to 85 parts by weight, more preferably 20 to 80 parts by weight, and the 4-methyl-1-pentene copolymer (B1) as the 4-methyl-1-pentene copolymer (B) in an amount of 90 to 10 parts by weight, preferably 85 to 15 parts by weight, more preferably 80 to 20 parts by weight (with the proviso that the total amount of (A) and (B1) is 100 parts by weight).

In the composition (X1), the total amount (UX1-1) of constituent units derived from 4-methyl-1-pentene derived from all the (co)polymers contained in the composition is preferably 95 to 70% by mol, and the total amount (UX1-2) of constituent units derived from α-olefins of 2 to 20 carbon atoms (except 4-methyl-1-pentene) derived from all the (co)polymers contained in the composition is preferably 5 to 30% by mol (with the proviso that the total amount of UX1-1 and UX1-2 is 100% by mol).

The composition containing the copolymer (B1) satisfying, as the requirement (B1-a), U3 of 99 to 93% by mol and U4 of 1 to 17% by mol (with the proviso that the total amount of U3 and U4 is 100% by mol) is more excellent in transparency, elongation and toughness and is excellent particularly in heat resistance, so that such a composition is preferable.

Since the composition (X1) is excellent particularly in transparency and heat resistance, a molded product composed of the composition inherits such excellent effects, and it tends to be excellent in heat resistance, transparency and uniform stretchability, so that such a molded product is preferable.

From the viewpoints of transparency and heat resistance, UX1-1 is preferably 95 to 80% by mol, more preferably 95 to 82% by mol, still more preferably 95 to 85% by mol, and UX1-2 is preferably 5 to 20% by mol, more preferably 5 to 18% by mol, still more preferably 5 to 15% by mol (with the proviso that the total amount of UX1-1 and UX1-2 is 100% by mol).

4-Methyl-1-Pentene (Co)Polymer Composition (X2)

The 4-methyl-1-pentene (co)polymer composition (X2) comprises the 4-methyl-1-pentene (co)polymer (A) in an amount of 10 to 90 parts by weight, preferably 50 to 90 parts by weight, more preferably 60 to 85 parts by weight, and the 4-methyl-1-pentene copolymer (B2) as the 4-methyl-1-pentene copolymer (B) in an amount of 90 to 10 part by weight, preferably 50 to 10 parts by weight, more preferably 40 to 15 parts by weight (with the proviso that the total amount of (A) and (B2) is 100 parts by weight).

In the composition (X2), the total amount (UX2-1) of constituent units derived from 4-methyl-1-pentene derived from all the (co)polymers contained in the composition is 95 to 70% by mol, preferably 95 to 75% by mol, more preferably 93 to 75% by mol, and the total amount (UX2-2 of constituent units derived from α-olefins of 2 to 20 carbon atoms (except 4-methyl-1-pentene) derived from all the (co)polymers contained in the composition is 5 to 30% by mol, preferably 5 to 25% by mol, more preferably 7 to 25% by mol (with the proviso that the total amount of UX2-1 and UX2-2 is 100% by mol).

The composition (X2) is excellent in elongation, flexibility and impact resistance because (B2) that is particularly flexible is dispersed in (A) without impairing transparency. Therefore, a molded product composed of the composition inherits such excellent effects and tends to be excellent in flexibility and impact resistance, so that such a molded product is preferable.

4-Methyl-1-Pentene (Co)Polymer Composition (X3)

In the present invention, the 4-methyl-1-pentene (co)polymer composition (X3) comprises the 4-methyl-1-pentene (co)polymer (A) in an amount of 10 to 90 parts by weight, and as the 4-methyl-1-pentene copolymer (B), the 4-methyl-1-pentene copolymer (B1) and the 4-methyl-1-pentene copolymer (B2) in the total amount of 90 to 10 part by weight (with the proviso that the total amount of (A) and (B) is 100 parts by weight, and the mixing ratio ((B1)/(B2)) of (B1) to (B2) is 99/1 to 1/99).

In the composition (X3), the total amount (UX3-1) of constituent units derived from 4-methyl-1-pentene derived from all the (co)polymers contained in the composition is preferably 95 to 70% by mol, and the total amount (UX3-2) of constituent units derived from α-olefins of 2 to 20 carbon atoms (except 4-methyl-1-pentene) derived from all the (co)polymers contained in the composition is preferably 30 to 5% by mol (with the proviso that the total amount of UX3-1 and UX3-2 is 100% by mol).

The amount of the (co)polymer (A) is preferably 15 to 90 parts by weight, more preferably 20 to 90 parts by weight, still more preferably 30 to 85 parts by weight, and the amount of the copolymer (B) is preferably 85 to 10 parts by weight, more preferably 80 to 10 parts by weight, still more preferably 70 to 15 parts by weight (with the proviso that the total amount of (A) and (B) is 100 parts by weight).

In a preferred embodiment of the composition (X3), the amount of the (co)polymer (A) is 50 to 90 parts by weight, preferably 55 to 85 parts by weight, and the amount of the copolymer (B) is 50 to 10 parts by weight, preferably 45 to 15 parts by weight (with the proviso that the total amount of (A) and (B) is 100 parts by weight).

When the mixing ratio ((B1)/(B2)) of the copolymer (B1) to the copolymer (B2) is preferably 90/10 to 10/90, more preferably 70/30 to 15/85, still more preferably 60/40 to 15/85, particularly preferably 50/50 to 15/85, a molded product having excellent stretchability and blow molding property tends to be obtained, so that such a mixing ratio is preferable.

When the mixing ratio ((B1)/(B2)) of the copolymer (B1) to the copolymer (B2) is preferably 90/10 to 10/90, more preferably 85/15 to 30/70, still more preferably 85/15 to 40/60, particularly preferably 85/15 to 50/50, a molded product having excellent heat resistance tends to be obtained, so that such a mixing ratio is preferable.

UX3-1 is preferably 95 to 75% by mol, more preferably 93 to 75% by mol, and UX3-2 is preferably 5 to 25% by mol, more preferably 7 to 25% by mol (with the proviso that the total amount of UX3-1 and UX3-2 is 100% by mol).

The composition (X3) is preferable because it is imparted with transparency and heat resistance that are properties of (B1) and is imparted with flexibility, elongation and impact resistance that are properties of (B2). A hollow molded product composed of the composition inherits such excellent effects and has excellent heat resistance, high transparency and excellent dimensional stability, so that such a hollow molded product is preferable. A film inherits such excellent effects and has excellent heat resistance, high transparency and excellent molding property, so that such a film is preferable.

4-Methyl-1-Pentene (Co)Polymer Compositions (X4) to (X6)

In the present invention, each of the 4-methyl-1-pentene (co)polymer compositions (X4) to (X6) comprises the 4-methyl-1-pentene (co)polymer (A), the 4-methyl-1-pentene copolymer (B) and the later-described α-olefin polymer (C).

The copolymer (B) comprises at least one copolymer selected from the copolymer (B1) and the copolymer (B2), and the mixing ratio can be arbitrarily changed, as shown in the description of the aforesaid 4-methyl-1-pentene copolymer (B).

(Composition (X4))

A preferred embodiment of the 4-methyl-1-pentene (co)polymer composition (X4) comprises the (co)polymer (A) in an amount of 10 to 85 parts by weight, preferably 15 to 80 parts by weight, the copolymer (B) in an amount of 85 to 10 parts by weight, preferably 80 to 15 parts by weight, and the α-olefin polymer (C) in an amount of 3 to 30 parts by weight, preferably 3 to 25 parts by weight (with the proviso that the total amount of (A), (B) and (C) is 100 parts by weight). The composition (X4) contains, as the polymer (B), both of the copolymer (B1) and the copolymer (B2), and the amount of the copolymer (B) is the total amount of (B1) and (B2). With regard to the mixing ratio ((B1)/(B2)), the description of the aforesaid composition (X3) can be referred to.

For the reason that the copolymer composition (X4) can be imparted with flexibility and ductility of the α-olefin polymer (C) because the composition contains the copolymers (B1) and (B2) and further contains the polymer (C), good stretchability and toughness are obtained, so that such a composition is preferable.

The composition (X4) is an embodiment containing the composition (X3) and the α-olefin polymer (C), so that the effects of the composition (X3) are also included.

In the polymer composition (X4), the total amount (UX4-1) of constituent units derived from 4-methyl-1-pentene derived from all the (co)polymers contained in the composition is preferably 95 to 65% by mol, and the total amount (UX4-2) of constituent units derived from α-olefins of 2 to 20 carbon atoms (except 4-methyl-1-pentene) derived from all the (co)polymers contained in the composition is preferably 5 to 35% by mol (with the proviso that the total amount of UX4-1 and UX4-2 is 100% by mol).

(Composition (X5))

A preferred embodiment of the 4-methyl-1-pentene (co)polymer composition (X5) comprises the (co)polymer (A) in an amount of 7 to 90 parts by weight, preferably 10 to 85 parts by weight, the copolymer (B) in an amount of 90 to 7 parts by weight, preferably 85 to 10 parts by weight, and the α-olefin polymer (C) in an amount of 0.9 to 30 parts by weight, preferably 1 to 25 parts by weight (with the proviso that the total amount of (A), (B) and (C) is 100 parts by weight). The composition (X5) contains the copolymer (B1) as the copolymer (B).

For the reason that the copolymer composition (X5) can be imparted with flexibility and ductility of the α-olefin polymer (C) even if it does not contain the copolymer (B2) because the composition contains the polymer (C), good stretchability and toughness are obtained, so that such a composition is preferable.

The composition (X5) is an embodiment containing the composition (X1) and the α-olefin polymer (C), so that the effects of the composition (X1) are also included.

In the composition (X5), the total amount (UX5-1) of constituent units derived from 4-methyl-1-pentene derived from all the (co)polymers contained in the composition is preferably 95 to 65% by mol, and the total amount (UX5-2) of constituent units derived from α-olefins of 2 to 20 carbon atoms (except 4-methyl-1-pentene) derived from all the (co)polymers contained in the composition is preferably 35 to 5% by mol (with the proviso that the total amount of UX5-1 and UX5-2 is 100% by mol).

As another preferred embodiment of the 4-methyl-1-pentene (co)polymer composition (X4) or (X5), a composition containing 100 parts by weight of the composition (X1) or the composition (X3) and 1 to 40 parts by weight of the α-olefin polymer (C) can be mentioned. The embodiment wherein the α-olefin polymer (C) is contained in the composition (X1) corresponds to a composition containing the (co)polymer (A), the copolymer (B1) and the α-olefin polymer (C), and the embodiment wherein the α-olefin polymer (C) is contained in the composition (X3) corresponds to a composition containing the (co)polymer (A), the copolymer (B1), the copolymer (B2) and the α-olefin polymer (C). Also in these embodiments, the aforesaid total amount of the constituent units derived from 4-methyl-1-pentene and the aforesaid total amount of the constituent units derived from α-olefins of 2 to 20 carbon atoms (except 4-methyl-1-pentene) are satisfied.

(Composition (X6))

A preferred embodiment of the 4-methyl-1-pentene (co) polymer composition (X6) comprises the (co)polymer (A) in an amount of 7 to 90 parts by weight, preferably 10 to 85 parts by weight, the copolymer (B) in an amount of 90 to 7 parts by weight, preferably 85 to 10 parts by weight, and the α-olefin polymer (C) in an amount of 0.9 to 30 parts by weight, preferably 5 to 25 parts by weight, more preferably 10 to 25 parts by weight (with the proviso that the total amount of (A), (B) and (C) is 100 parts by weight). The composition (X6) contains the copolymer (B2) as the polymer (B).

For the reason that the copolymer composition (X6) can be imparted with flexibility and ductility of the α-olefin polymer (C) even if it does not contain the copolymer (B1) because the composition contains the polymer (C), good stretchability and toughness are obtained, so that such a composition is preferable.

The composition (X6) is an embodiment wherein the α-olefin polymer (C) is contained in the composition (X2), preferably an embodiment wherein the α-olefin polymer (C) having the later-described specific melting point is contained in the composition (X2), and the effects of the composition (X2) are also included.

In the composition (X6), the total amount (UX6-1) of constituent units derived from 4-methyl-1-pentene derived from all the (co)polymers contained in the composition is preferably 95 to 65% by mol, and the total amount (UX6-2) of constituent units derived from α-olefins of 2 to 20 carbon atoms (except 4-methyl-1-pentene) derived from all the (co)polymers contained in the composition is preferably 5 to 35% by mol (with the proviso that the total amount of UX6-1 and UX6-2 is 100% by mol).

In the polymer compositions (X4) to (X6), the total amount (UX4-1, UX5-1 or UX6-1) of the constituent units derived from 4-methyl-1-pentene derived from all the (co) polymers contained in the composition is preferably 90 to 68% by mol, more preferably 88 to 70% by mol, and the total amount (UX4-2, UX5-2 or UX6-2) of the constituent units derived from α-olefins of 2 to 20 carbon atoms (except 4-methyl-1-pentene) derived from all the (co)polymers contained in the composition is preferably 10 to 32% by mol, more preferably 12 to 30% by mol (with the proviso that the total amount of UX4-1 and UX4-2 is 100% by mol, or the total amount of UX5-1 and UX5-2 is 100% by mol, or the total amount of UX6-1 and UX6-2 is 100% by mol).

In the present invention, another embodiment of the 4-methyl-1-pentene (co)polymer composition comprises the 4-methyl-1-pentene (co)polymer (A) in an amount of 5 to 90 parts by weight, the 4-methyl-1-pentene copolymer (B) in an amount of 90 to 10 parts by weight, and the later-described α-olefin polymer (C) in an amount of 1 to 40 parts by weight (with the proviso that the total amount of (A), (B) and (C) is 100 parts by weight).

(α-Olefin Polymer (C))

The α-olefin polymer (C) is a polymer of one or more olefins selected from α-olefins of 2 to 20 carbon atoms, differently from the (co)polymer (A), the copolymers (B1) and (B2), and is, for example, a homopolymer of an olefin or a bipolymer or higher order polymer. In the case of, for example, a bipolymer, it is enough that the amount of constituent units of one olefin is 50 to 99% by mol and the amount of constituent units of the other olefin is 1 to 50% by mol (the total amount of the constituent units is 100% by mol). However, the amount of the constituent units of each olefin is not specifically restricted. In the case of a terpolymer or higher order polymer, the constitutional ratio of the olefins is arbitrarily determined.

Examples of straight-chain α-olefins of 2 to 20 carbon atoms include α-olefins, such as ethylene, propylene, 1-butene, 1-pentene, 1-hexene, 1-octene, 1-decene, 1-undecene, 1-dodecene, 1-tetradecene, 1-hexadecene, 1-octadecne and 1-eicosene. Preferable are straight-chain α-olefins of 2 to 15 carbon atoms, and more preferable are those of 2 to 10 carbon atoms. Particularly preferable are ethylene, propylene, 1-butene, 1-pentene, 1-hexene and 1-octene.

Examples of branched α-olefins of 4 to 20 carbon atoms include α-olefins, such as isobutene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene and 3-ethyl-1-hexene. Preferable are branched α-olefins of 4 to 15 carbon atoms, and more preferable are those of 4 to 10 carbon atoms.

As the constituent units of olefins to constitute the α-olefin polymer (C) used in the polymer composition (X4), constituent units of at least one kind selected from ethylene, propylene and 1-butene are contained preferably in an amount of 50 to 100% by weight, more preferably 55 to 100% by weight, and constituent units selected from ethylene and an α-olefin of 3 to 20 carbon atoms (except the same olefin as the above olefin) are contained preferably in an amount of 0 to 50% by weight, more preferably 0 to 45% by weight (the total amount of the constituent units is 100% by weight). Here, the expression "constituent units in an amount of 100% by weight" means a homopolymer.

MFR of the α-olefin polymer (C), as measured at 190° C. or 230° C. under a load of 2.16 kg in accordance with JIS K-6721, is preferably in the range of 0.01 to 100 g/10 min, and the density thereof is in the range of 830 to 930 kg/m$^3$.

The intrinsic viscosity [η] of the α-olefin polymer (C), as measured in decalin at 135° C., is usually 0.1 to 10 dL/g, more preferably 0.5 to 5 dL/g.

The melting point of the α-olefin polymer (C) is not specifically restricted, but for the reasons of heat resistance and strength, it is preferably not less than 100° C., more preferably 110 to 170° C. Especially when the α-olefin polymer (C) having this melting point is contained in the composition (X6), heat resistance and strength are more improved, so that such a melting point is preferable.

The α-olefin polymer (C) may contain, in addition to the aforesaid constituent units, units derived from other polymerizable monomers within limits not detrimental to the object of the present invention.

Examples of such other polymerizable monomers include vinyl compounds, such as styrene, vinylcyclopentene, vinylcyclohexane and vinylnorbornane; vinyl esters, such as vinyl acetate; unsaturated organic acids or derivatives thereof, such as maleic anhydride; conjugated dienes, such as butadiene, isoprene, pentadiene and 2,3-dimethylbutadiene; and non-conjugated polyenes, such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene and 2-propenyl-2,2-norbornadiene.

The α-olefin polymer (C) may contain units derived from such other polymerizable monomers in an amount of not more than 10% by mol, preferably not more than 5% by mol, more preferably not more than 3% by mol, based on 100% by mol of all the constituent units for constituting the polymer (C).

Specific examples of the α-olefin polymers (C) include low-density polyethylene, high-density polyethylene, polypropylene, polybutene, an ethylene/propylene random copolymer, an ethylene/1-butene random copolymer, an ethylene/propylene/1-butene random copolymer, an ethylene/1-hexene random copolymer, an ethylene/1-octene random copolymer, an ethylene/propylene/ethylidenenorbornene random copolymer, an ethylene/propylene/vinylidenenorbornene random copolymer, an ethylene/1-butene/ethylidenenorbornene random copolymer, an ethylene/1-butene/1-octene random copolymer, a propylene/1-butene random copolymer, a propylene/1-hexene random copolymer, a propylene/1-octene random copolymer, a butene/1-hexene random copolymer, a butene/1-octene random copolymer and a 4-methyl-1-pentene/hexene copolymer. Of these, polypropylene, polybutene, an ethylene/propylene random copolymer, an ethylene/1-butene random copolymer, an ethylene/propylene/1-butene random copolymer, an ethylene/1-butene/1-octene random copolymer, an ethylene/1-hexene random copolymer, an ethylene/1-octene random copolymer, a propylene/1-butene random copolymer, a propylene/1-octene random copolymer, a 4-methyl-1-pentene/hexane copolymer, etc. are particularly preferably used. Only one kind of these copolymers may be used, or a combination of two or more kinds thereof may be used.

By the use of the α-olefin polymer (C), a balance between impact resistance and cold temperature resistance is particularly improved.

The α-olefin polymer (C) can be prepared by a hitherto publicly known process using a vanadium-based catalyst, a titanium-based catalyst, a metallocene-based catalyst or the like. As the α-olefin polymer (C), a commercial product may be used, and for example, "Toughmer™" (trade name, available from Mitsui Chemicals, Inc.) may be used.

[Modified Product of 4-Methyl-1-Pentene (Co)Polymer Composition]

When the 4-methyl-1-pentene (co)polymer composition of the present invention is mixed or laminated with a polar resin or when the (co)polymer composition is laminated or bonded to a metal, the (co)polymer (A), the copolymer (B) or at least apart of the components contained in the (co)polymer composition, such as (co)polymers, are preferably graft modified with a polar compound. In this case, the concept of a modified product of the (co)polymer composition includes not only a product obtained by directly modifying the (co)polymer composition but also a product having a graft modified product of the (co)polymer (A) or the copolymer (B) as a constituent of the polymer composition. In the following description, the expression "the (co)polymer composition" also includes a modified product.

Examples of the polar compounds used for graft modification include a hydroxyl group-containing ethylenically unsaturated compound, an amino group-containing ethylenically unsaturated compound, an epoxy group-containing ethylenically unsaturated compound, an aromatic vinyl compound, an unsaturated carboxylic acid or its derivative, a vinyl ester compound, vinyl chloride, a vinyl group-containing organosilicon compound and a carbodiimide compound. Of these, an unsaturated carboxylic acid or its derivative and a vinyl group-containing organosilicon compound are particularly preferable.

Examples of the unsaturated carboxylic acids and their derivatives include an unsaturated compound having one or more carboxylic acid groups, an ester of a compound having a carboxylic acid group and an alkyl alcohol, and an unsaturated compound having one or more carboxylic anhydride groups. Examples of unsaturated groups include a vinyl group, a vinylene group and an unsaturated cyclichydrocarbon group. As these compounds, hitherto publicly known compounds can be used, and there is no specific limitation on the compounds. However, specific examples thereof include unsaturated carboxylic acids, such as acrylic acid, maleic acid, fumaric acid, tetrahydrophthalic acid, itaconic acid, citraconic acid, crotonic acid, isocrotonic acid, Nadic acid [trademark] (endocis-bicyclo[2.2.1]hept-5-ene-2,3-dicarboxylic acid); and their derivatives, such as acid halides, amides, imides, anhydrides and esters. Specific examples of the derivatives include malenyl chloride, maleimide, maleic anhydride, citraconic anhydride, monomethyl maleate, dimethyl maleate and glycidyl maleate. These unsaturated carboxylic acids and/or their derivatives can be used singly or in combination of two or more kinds. Of these, unsaturated dicarboxylic acids or acid anhydrides thereof are preferable, and in particular, maleic acid, Nadic acid [trademark] or an acid anhydride thereof is preferably used.

As the vinyl group-containing organosilicon compound, a hitherto publicly known compound can be used, and there is no specific limitation on the compound, but specifically, vinyltriethoxysilane, vinyltrimethoxysilane, vinyltris(β- methoxyethoxysilane), γ-glycidoxypropyltrimethoxysilane, γ-aminopropyltriethoxysilane, γ-methacryloxypropyltrimethoxysilane, 2-(3,4-epoxycyclohexyl)ethyltrimethoxysilane, 3-glycidoxypropyltrimethoxysilane, 3-glycidoxypropylmethylethoxysilane, p-styryltrimethoxysilane, 3-methacryloxypropylmethyldimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopriopyltrimethoxysilane, N-2-(aminoethyl)-3-aminopropyltriethoxysilane, 3-aminopropyltrimethoxysilane, 3-triethoxysilyl-N-(1,3-dimethylbutylidene)propylamine, N-phenyl-3-aminopropyltrimethoxysilane, 3-ureidopropyltriethoxysilane, 3-isocyanatopropyltriethoxysilane, etc. can be used. Preferable are γ-glycidoxypropyltrimethoxysilane, γ-aminopropyltriethoxysilane, γ-methacryloxypropyltrimethoxysilane, vinyltriethoxysilane, vinyltrimethoxysilane and 3-acryloxypropyltrimethoxysilane, and more preferable are vinyltriethoxysilane, vinyltrimethoxysilane and 3-acryloxypropyltrimethoxysilane which have small steric hindrance and high graft modification efficiency.

In the present invention, the modified product of the 4-methyl-1-pentene (co)polymer composition can be obtained by graft reaction of 100 parts by weight of the (co)polymer (A), the copolymer (B) or the (co)polymer composition with usually 1 to 100 parts by weight, preferably 5 to 80 parts by weight, of the polar compound. This graft reaction is carried out usually in the presence of a radical initiator.

As the radical initiator used for the graft polymerization, an organic peroxide or an azo compound can be mentioned. The radical initiator can be used by mixing it as it is with the (co)polymer (A), the copolymer (B) or the (co)polymer composition and the polar compound, but the radical initiator can be also used after it is dissolved in a small amount of an organic solvent. As the organic solvents, those capable of dissolving a radical initiator can be used without any restriction.

In the graft reaction of the (co)polymer (A), the copolymer (B) or the (co)polymer composition with the polar compound, a reducing substance may be used. When the reducing substance is used, the quantity of the polar compound grafted can be sometimes increased.

The graft modification reaction of the (co)polymer (A), the copolymer (B) or the (co)polymer composition with the polar compound can be carried out by a hitherto publicly known method. For example, the (co)polymer (A), the copolymer (B) or the (co)polymer composition is dissolved in an organic solvent, then the polar compound and the radical initiator are added to the solution, and they are allowed to react with each other usually at a temperature of 70 to 200° C., preferably 80 to 190° C., usually for 0.5 to 15 hours, preferably 1 to 10 hours.

The (co)polymer (A), the copolymer (B) or the (co)polymer composition can be allowed to react with the polar compound in the absence of a solvent by the use of an extruder or the like. This reaction is desirably carried out at a temperature of not lower than the melting point of the 4-methyl-1-pentene polymer, specifically at a temperature of 160 to 290° C., usually for 0.5 to 10 minutes.

The modification ratio (quantity of grafted polar compound) of the thus obtained modified product of the (co) polymer composition is usually 0.1 to 50% by weight, preferably 0.2 to 30% by weight, more preferably 0.2 to 10% by weight.

[Molded Product Comprising 4-Methyl-1-Pentene (Co) Polymer Composition]

A molded product comprising the 4-methyl-1-pentene (co)polymer composition of the present invention or a molded product comprising a modified product obtained by using the composition is obtained by a publicly known thermal molding or forming method, such as extrusion molding, injection molding, inflation method, blow molding, extrusion blow molding, injection blow molding, press molding, stamping, vacuum forming, calendering, filament molding, foam molding or powder slush molding. The molded product of the present invention can be also produced by properly combining the (co)polymer, the (co)polymer composition and the modified product of the present invention.

In the (co)polymer composition of the present invention, two or more 4-methyl-1-pentene (co)polymers are well compatibilized with each other, so that control of melt properties of the composition is easy, and the composition exhibits excellent moldability. For example, the degree of freedom in control of the crystallization rate that is mainly derived from the (co)polymer (A) is increased, and the composition is advantageous in obtaining a film of a large width, a blow molded product of a large size and a stretched film.

The molded product of the present invention is also preferably a molded product obtained by subjecting a molded product, which has been obtained by primary molding such as extrusion molding, injection molding or solution casting, to further processing such as blow molding or stretching. For example, when the desired molded product is a film or a sheet, the film or the sheet is preferably one obtained by subjecting a molded product, which has been obtained in the form of a sheet by T-die extrusion molding or the like, to further uniaxial orientation or biaxial orientation. As a specific use of such a stretched film, a film for a capacitor can be mentioned. It has been hitherto known that a 4-methyl-1-pentene (co)polymer has a high crystallization rate, and it has been hitherto known that the (co) polymer tends to have a low degree of freedom in molding. However, it is thought that by virtue of increase in its control width, stretch conditions such as molding temperature, stretch ratio, etc. are controlled, whereby it becomes possible to control the crystallization rate and to roughen the surface.

Moreover, when the molded product is, for example, an extrusion molded product, it also exhibits excellent toughness, flexibility and molding property in addition to the characteristics of a commercially available conventional 4-methyl-1-pentene-based (co)polymer, such as heat resistance and electrical properties. Therefore, such molded products can be preferably used, as tubular molded products, for industrial materials, manufacturing industrial materials, building materials, medical parts and electrical parts, such as medical tube, cooling water pipe, hot water pipe, cosmetic tube, electrical wire covering material, millimeter wave signal cable covering, high-frequency signal cable covering, ecological electrical wire covering, liquid medicine tube, cosmetic tube, cable covering material for vehicles, and signal cable covering material.

A film and a hollow molded product, for which the 4-methyl-1-pentene (co)polymer composition is particularly preferably used, are described below in detail.

[Film Composed of 4-Methyl-1-Pentene (Co)Polymer Composition]

The film of the present invention can be obtained by melt extruding the aforesaid 4-methyl-1-pentene (co)polymer composition usually at a temperature of 180 to 300° C. Since the film of the present invention has a critical surface tension equivalent to that of a hitherto publicly known 4-methyl-1-pentene (co)polymer film, it is excellent in releasability, and it is excellent also in electrical properties such as dielectric breakdown voltage.

Specific examples of uses of the film include a release film and a packaging film.

The film of the present invention is also preferably a film obtained by subjecting a molded product, which has been obtained in the form of a film or a sheet by T-die extrusion molding or the like, to further uniaxial orientation or biaxial orientation. As a specific use of such a stretched film, a film for a capacitor can be mentioned. It has been hitherto known that a 4-methyl-1-pentene polymer has a high crystallization rate, and it has been hitherto known that the polymer tends to have a low degree of freedom in molding. However, it is thought that by controlling stretch conditions such as molding temperature, stretch ratio, etc., it becomes possible to control the crystallization rate and to roughen the surface, and the stretched film is excellent also in properties such as dielectric breakdown voltage.

In the (co)polymer composition of the present invention, two or more 4-methyl-1-pentene (co)polymers are well compatibilized with each other, so that control of melt properties of the composition is easy, and the composition exhibits excellent properties in modification of molding property, stretchability, surface gloss and heat sealing property of a film.

It is thought that the main cause of such excellent properties is that the properties of the (co)polymer (A) have been modified by the presence of the copolymer (B), as shown below.

For example, by compatibilizing the copolymer (B) with the (co)polymer (A) whose crystallization is difficult to control during molding because of a high crystallization rate and which has poor stability in the production of a molded product, a structure of the resulting crystal, such as spacing, is changed, whereby the crystallization rate can be decreased, and it becomes possible to increase the degree of freedom in control of the crystallization rate.

Further, by compatibilizing the copolymer (B) which has flexible characteristics with the (co)polymer (A) which is poor in mechanical properties such as flexibility and elongation because of high storage elastic modulus in the temperature region of not lower than the glass transition temperature (Tg), it becomes possible to lower the storage elastic modulus in the temperature region of not lower than the glass transition temperature (Tg), as compared with the case of using the (co)polymer (A) only.

Moreover, by compatibilizing the copolymer (B) which is low-crystalline or non-crystalline with the (co)polymer (A) which is high-crystalline and contains unevenly distributed crystalline components, the crystalline components are dispersed over the whole composition, and it becomes possible to obtain a homogeneous composition.

Furthermore, by compatibilizing the copolymer (B) having a lower melting point as compared with the (co)polymer (A) or having no melting point with the (co)polymer (A) having a high melting point (Tm), a distribution of melting points can be formed in the composition, and therefore, it becomes possible to control melt properties at a preheating temperature during stretching.

When a film is formed by the use of the (co)polymer composition of the present invention, the film can be uniformly stretched in the stretching process on the basis of the above reasons, etc. On that account, the film of the present invention is particularly advantageous in obtaining a stretched film or the like.

The film of the present invention exhibits excellent dimensional stability, particularly an excellent shrinkage ratio during heating.

It is thought that the main cause of such excellent properties is that the properties of the (co)polymer (A) have been modified by the presence of the copolymer (B), as shown below.

It is known that a polymer film obtained by extrusion molding is generally solidified in a flow-oriented state in the machine direction MD, and therefore, when the resulting film is heated to a temperature of not lower than the glass transition temperature (Tg) of the polymer, the film shrinks in the machine direction MD. A film composed of a commercially available conventional 4-methyl-1-pentene-based polymer (corresponding to the 4-methyl-1-pentene (co)polymer (A)) also shrinks in the machine direction (MD), so that it has a problem of dimensional stability.

On the other hand, it has become apparent that when an extruded film composed of the copolymer (B) is heated to a temperature of not lower than the glass transition temperature (Tg), it shows a behavior of expansion contrarily to a general polymer film. This is thought to be attributable to the height of stress absorption property of the copolymer (B). Even if the copolymer (B) is flow-oriented in the machine direction MD, it absorbs thermal energy generated by deformation of polymer molecules caused by the orientation, and therefore, the copolymer (B) is thermally stabilized in an oriented state. Hence, even if the extruded film is heated to a temperature of not lower than the glass transition temperature (Tg), shrinkage does not occur because there is no need to relax the orientation. As if a polymer in an unoriented state were heated to a temperature of not lower than the glass transition temperature (Tg), the molecular motion simply becomes brisk to bring about expansion of a film.

It is thought that by adding the copolymer (B) to the (co)polymer (A), the (co)polymer (A) can be imparted with proper thermal expansion property, and as a result of cancellation of shrinkage property and expansion property each other, the heat shrinkage ratio of a film obtained from the (co)polymer composition of the present invention becomes small.

Not only a single layer film obtained from the aforesaid (co)polymer composition but also a laminated film in which the (co)polymer composition is contained any one of the layers is a preferred embodiment of the film of the present invention. Although there is no specific limitation on the method for obtaining such a laminated film, there can be mentioned a method comprising obtaining a surface layer film in advance by T-die molding or inflation and laminating another layer thereon by a publicly known laminating method such as extrusion lamination or extrusion coating, a method comprising forming plural films independently and then laminating these films by dry lamination, etc. From the viewpoint of productivity, co-extrusion molding comprising feeding plural components to a multi-layer extruder to form a laminated film is preferable.

The film of the present invention is preferably utilized for a multi-layer surface protective film including the film of the present invention on a film surface layer and a multi-layer release film, which are preferred embodiments of the above laminated film.

[Uses of Film Composed of 4-Methyl-1-Pentene (Co)Polymer Composition]

The film composed of the 4-methyl-1-pentene (co)polymer composition of the present invention has properties of a conventional 4-methyl-1-pentene copolymer, such as heat resistance, mechanical properties, electrical properties and releasability, and in addition, it is excellent in flexibility, gloss, uniform stretchability, etc., so that the film can be preferably applied to such uses as shown below.

There can be mentioned:

packaging films, such as film for food packaging, stretched film, wrapping film, air-permeable film, shrink film and easy peel film, separators, such as buttery separator, separator for lithium ion buttery, electrolytic film for fuel cell and pressure-sensitive adhesive/adhesive material separator, stretched films, such as film for film condenser, capacitor film and capacitor film for fuel cell, semiconductor process films, such as dicing tape, back grind tape, die bonding film and film for polarizing plate, surface protective films, such as protective filmforpolarizing plate, protective film for liquid crystal panel, protective film for optical part, protective film for lens, protective film for electrical part/electrical appliance, protective film for cellular phone, protective film for personal computer, masking film and protective film for touch panel, films for electronic parts, such as diffusion film, reflecting film, radiation-resistant film, γ-ray-resistant film and porous film, and building material films, such as window film for building material, film for laminated glass, bulletproof material, film of bulletproof glass, heat insulation sheet and heat insulation film.

The film composed of the (co)polymer composition of the present invention is excellent in releasability, heat resistance, low outgassing and low stain on copper foil, and therefore, it rarely causes stain on wiring board and copper foil due to migration of low-molecular weight components in the production of a printed wiring board, particularly a flexible printed wiring board, said stain having been a problem in the past. Hence, the film is particularly preferably applied to the following uses as release films.

Examples of uses as release films include a release film for flexible printed board, a release film for ACM board, a release film for rigid flexible board, a release film for advanced composite material, a release film for carbon fiber composite material curing, a release film for glass fiber composite material curing, a release film for aramid fiber composite material curing, a release film for nano-composite material curing, a release film for filler curing, a release film for semiconductor sealing, a release film for polarizing plate, a release film for diffusion sheet, a release film for prism sheet, a release film for reflecting sheet, a cushion film for release film, a release film for fuel cell, a release film for various rubber sheets, a release film for urethane curing and a release film for epoxy curing (e.g., production process member for metal bat or golf club).

[Hollow Molded Product Composed of 4-Methyl-1-Pentene (Co)Polymer Composition]

The hollow molded product of the present invention can be obtained by melt extruding the aforesaid 4-methyl-1-pentene (co)polymer composition usually at 180 to 300° C.

In the (co)polymer composition, two or more 4-methyl-1-pentene (co)polymers are well compatibilized with each other, so that control of melt properties of the composition is easy, and the composition exhibits excellent moldability into a hollow molded product. For example, the degree of freedom in control of the crystallization rate mainly derived from the (co)polymer (A) is increased, and the composition is advantageous in obtaining a hollow molded product or the like.

Specifically, a blow molded product composed of the (co)polymer composition may have a structure of a single layer of the (co)polymer composition or may have a multi-layer structure containing at least one layer of the (co)polymer composition. The blow molded product of the present invention is preferably one having a multi-layer structure containing at least one layer of the (co)polymer composition.

Here, when the blow molded product composed of the (co)polymer composition has a multi-layer structure, specific examples of the structures include the following structures.

Multi-layer molded product consisting of layers of 4-methyl-1-pentene (co)polymer composition/function-imparted resin/4-methyl-1-pentene (co)polymer composition laminated in this order Multi-layer molded product consisting of layers of 4-methyl-1-pentene (co)polymer composition/adhesive layer/function-imparted resin/adhesive layer/4-methyl-1-pentene (co)polymer composition laminated in this order The function-imparted resin is, for example, a hitherto publicly known polyolefin resin (other than the polymers related to the present invention, the same shall apply hereinafter).

<Production Process for Blow Molded Product>

In the present invention, the blow molded product composed of the 4-methyl-1-pentene (co)polymer composition can be produced by a publicly known general blow molding method. Examples of the molding methods include a direct blow molding method comprising forming a parison from a molten resin, interposing the parison between molds and blowing a pressurized gas into the parison to produce a container, and an injection blow molding method comprising once forming a preform by injection molding or extrusion molding and subjecting the preform to blow molding.

As the injection blow molding method, further, there is a hot parison method wherein molding is carried out in one stage using a machine obtained by uniting an injection molding machine and a blow molding machine in a body, or a cold parison method wherein a preform obtained by injection molding is completely cooled, then reheated and subjected to blow molding.

Specifically, the (co)polymer composition is melted, and this resin is subjected to injection molding in a mold to form a preform. Subsequently, the preform in a molten state or a softened state or a cooled solidified state is reheated to a given temperature using an infrared heater or the like. After heating, a gas is forcibly introduced into the preform in a specific mold to biaxially orient it into a desired shape.

The melting and injection of the (co)polymer composition are usually carried out in the temperature range of 180 to 320° C. The blow stretching is usually carried out at a temperature of 100 to 250° C. in a length/width stretch ratio of 1.5 to 4.0 times.

In the blow molded product composed of the (co)polymer composition of the present invention, the (co)polymer composition among the components to constitute the molded product has only to be present in at least one layer. Specifically, for example, by carrying out injection molding to form a preform having two layers and then carrying out blow molding, a blow molded product having at least one layer composed of the (co)polymer composition can be obtained.

As a molding machine for the above, a publicly known general apparatus can be used.

[Uses of Hollow Molded Product Composed of 4-Methyl-1-Penetne (Co)Polymer Composition]

The hollow molded product composed of the 4-methyl-1-pentene (co)polymer composition of the present invention has properties of a conventional 4-methyl-1-pentene copolymer, such as heat resistance and mechanical properties, and in addition, it is excellent in flexibility, blow molding property, etc. Therefore, the hollow molded product is preferably used for hollow containers, bottles, cups, etc.

Specifically, the hollow molded product is preferably applied to the following uses, without limiting thereto.

There can be mentioned:

hollow containers, such as food container, seasoning container, retort container, refrigeration storage container, heat-resistant container for microwave oven, medical container, toner container, powder container, container for gasoline tank, container for kerosine, and experimental instrument (e.g., flask), bottles, such as cosmetic bottle, hairdressing bottle, drinking water bottle, carbonated drink bottle, bottle for alcohol, bottle for detergent, bottle for softener, bottle for bleaching agent, bottle for shampoo, bottle for hair conditioner, medicine bottle, bottle for adhesive, bottle for agricultural chemical, medical bottle, transfusion bottle, feeding bottle, medical bag, transfusion bag and blood storage bag, and cups, such as cup for food and cup for packaging.

EXAMPLES

The present invention is more specifically described with reference to the following examples, but it should be construed that the present invention is in no way limited to those examples. In the examples, properties were measured in the following manner.

<4-Methyl-1-Pentene (Co)Polymer (A), 4-Methyl-1-Pentene Copolymer (B), α-Olefin Polymer (C) and Resin Composition>

[Intrinsic Viscosity [η]]

The intrinsic viscosity is a value measured at 135° C. using a decalin solvent. That is to say, about 20 mg of a polymer powder, polymer pellets or a resin lump was dissolved in 15 ml of decalin, and a specific viscosity ηsp was measured in an oil bath at 135° C. To this decalin solution, 5 ml of a decalin solvent was added to dilute the solution, and then a specific viscosity ηsp was measured in the same manner. This dilution operation was further repeated twice, and a value of ηsp/C given when the concentration (C) was extrapolated to 0 was determined as an intrinsic viscosity (see the following formula).

$[\eta] = lim(\eta sp/C)(C \to 0)$

[MFR]

MFR of the 4-methyl-1-pentene (co)polymer (A) and MFR of the 4-methyl-1-pentene copolymer (B) were each measured at 260° C. under a load of 5 kg or at 230° C. under a load of 2.16 kg in accordance with JIS K7210. MFR of the α-olefin polymer (C) was measured under the conditions of 230° C. and a load of 2.16 kg.

[Number-Average Molecular Weight (Mn), Weight-average Molecular Weight (Mw), Molecular Weight Distribution (Mw/Mn)]

Number-average molecular weight (Mn), weight-average molecular weight (Mw) and molecular weight distribution (Mw/Mn) were measured in the following manner using a Water gel permeation chromatograph Alliance GPC-2000 model. As separation columns, two TSKgel GNH6-HT and two TSKgel GNH6-HTL were used. Each column had a size of a diameter of 7.5 mm and a length of 300 mm. The column temperature was 140° C. As a mobile phase, o-dichlorobenzene (Wako Pure Chemical Industries, Ltd.) was used, and as an antioxidant, 0.025% by weight of BHT (Takeda Pharmaceutical Company Limited) was used. The sample was moved at 1.0 ml/min, the sample concentration was 15 mg/10 ml, the amount of the sample poured was 500 microliters, and as a detector, a differential refractometer was used. As standard polystyrene of Mw<1000 and standard polystyrene of Mw>4×10$^6$, polystyrene available from Tosoh Corporation was used, and as standard polystyrene of 1000≤Mw≤4×10$^6$, polystyrene available from Pressure Chemical Company was used.

[4-Methyl-1-Pentene Content and α-Olefin Content in Polymer]

A 4-Methyl-1-pentene content and an α-olefin content in a polymer were determined from the results measured by $^{13}$C-NMR using the following apparatus and conditions. As for the measurement results, the 4-methyl-1-pentene content is not contained in the α-olefin content.

Using an ECP500 type nuclear magnetic resonance device manufactured by JEOL Ltd. and using an orthodichlorobenzene/deuterated benzene (80/20 vol %) mixed solvent as a solvent, measurement was carried out under the conditions of a sample concentration of 55 mg/0.6 mL, a measuring temperature of 120° C., an observational nucleus of $^{13}$C (125 MHz), a sequence of single pulse proton decoupling, a pulse width of 4.7μ sec (45° pulse), a repetition time of 5.5 seconds, a cumulative number of not less than 10000 and a chemical shift reference value of 27.50 ppm. From the resulting $^{13}$C-NMR spectrum, 4-methyl-1-pentene and α-olefin were quantitatively determined.

[Melting Point (Tm), Glass Transition Temperature (Tg), Crystallization Temperature (Tc)]

A DSC measuring device (DSC220C) manufactured by Seiko Instruments Inc. was used, and in a measuring aluminum pan, about 5 mg of a sample was placed. The sample was heated up to 290° C. at 100° C./min, maintained at 290° C. for 5 minutes and then cooled down to −100° C. at 10° C./min to obtain crystallization peaks, and from the highest peak of the crystallization peaks, a crystallization temperature (Tc) was determined. Subsequently, the sample was heated up to 290° C. from −100° C. at 10° C./min to obtain a calorimetric curve, and from an inflection point of the calorimetric curve, a glass transition temperature (Tg) was determined. Further, from the highest peak of crystal melting peaks, a melting point (Tm) was calculated.

<4-Methyl-1-Pentene (Co)Polymer (A), 4-Methyl-1-Pentene Copolymer (B), α-Olefin Polymer (C) and Compositions of Examples 1 to 7 and Comparative Examples 1 and 2>

[Preparation of Pressed Sheets for Various Measurements]
[Pelletization]

To 100 parts by weight of a composition obtained by mixing the 4-methyl-1-pentene (co)polymer (A), the 4-methyl-1-pentene copolymer (B) and the α-olefin polymer (C) in given amounts, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat stabilizer and 0.1 part by weight of calcium stearate as a hydrochloric acid absorbent were added. Thereafter, using a twin-screw extruder BT-30 (screw diameter: 30 mmø, L/D: 46) manufactured by Research Laboratory of Plastic Technology Co., Ltd., the composition was granulated under the conditions of a preset temperature of 270° C., a resin extrusion rate of 60 g/min and 200 rpm to obtain pellets for various measurements.

[Press Molding]

Using a hydraulic hot press (NS-50, manufactured by shito Metal Industries Corporation) preset at 230 to 290° C., the pellets obtained by the above process were subjected to sheet molding at a gauge pressure of 10 MPa. In the case of a sheet having a thickness of 1 to 2 mm (200×200×1-2 mm on a plate of 240×240×2-thickness mm (shape of spacer)), a test sample was prepared by preheating the pellets for about 5 to 7 minutes, applying a gauge pressure of 10 MPa to them for 1 to 2 minutes, then compressing them at a gauge pressure of 10 MPa using a different hydraulic hot press (manufactured by Shinto Metal Industries Corporation) preset at 20° C. and cooling the resulting sheet for about 5 minutes. As a hot plate, a brass plate having a thickness of 5 mm was used. The sample prepared by the above process was used for evaluation of various properties.

[Injection Molding]

Using an injection molding machine IS-55 manufactured by Toshiba Machine Co., Ltd., the pellets obtained above were treated under the conditions of a cylinder temperature of 250 to 290° C., an injection rate of 30 to 40%, a screw rotation speed of 60 rpm and a mold temperature of 40 to 60° C. to prepare an injection molded square plate having thickness of 2 mm and a specimen.

[Young's Modulus (Tensile Modulus) (YM), Tensile Elongation at Break (EL), Tensile Stress at Break (TS)]

Using, as a sample for evaluation, a specimen (ASTM D638-IV type specimen) prepared under the above injection molding conditions, Young's modulus (YM), tensile elongation at break (EL) and tensile stress at break (TS) that are tensile properties were evaluated at a tensile rate of 30 mm/min by the use of an Instron universal tensile tester 3380.

[Internal Haze (%)]

Using an injection molded square plate having a thickness of 2 mm as a specimen, internal haze was measured in benzyl alcohol by the use of a digital haze meter (NDH-20D) manufactured by Nippon Denshoku Industries Co., Ltd.

[Density]

Density measurement was carried out by cutting the pressed sheet having a thickness of 1 mm obtained by the above method into a specimen of 300 mm square and measuring a density of the specimen by a water replacement method using an electronic hydrometer in accordance with JIS K6268.

[Dynamic Viscoelasticity Measurement]

The sheet having a thickness of 2 mm formed by the above press molding was cut to an arbitrary size, and using an Anton Paar rheometer Physica MCR-301, a dependence of dynamic viscoelasticity on temperature was measured in a torsion mode loading under the conditions of a heating rate of 2° C./min (from −40° C. to 250° C.), a frequency of 10 rad/s and a strain of 0.1. A temperature given when the storage elastic modulus G' became $1.0 \times 10^6$ Pa was measured.

<Compositions and Films of Examples 8 to 24, Comparative Examples 3 to 10 and Reference Examples 1 to 3>

[Pelletization]

To 100 parts by weight of a composition obtained by mixing the 4-methyl-1-pentene (co)polymer (A), the 4-methyl-1-pentene copolymer (B) and the α-olefin polymer (C) in given amounts, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat stabilizer and 0.1 part by weight of calcium stearate as a hydrochloric acid absorbent were added. Thereafter, using a twin-screw extruder BT-30 (screw diameter: 30 mmø, L/D: 46) manufactured by Research Laboratory of Plastic Technology Co., Ltd., the composition was granulated under the conditions of a preset temperature of 270° C., a resin extrusion rate of 60 g/min and 200 rpm to obtain pellets for evaluation.

[Film Formation]

The pellets obtained above were subjected to melt cast molding using a single-screw sheet forming machine manufactured by Tanaka Iron Works Co., Ltd. to obtain films of the following thicknesses.

Thickness of 200 μm (for stretch test): cylinder temperature of 250° C., die temperature of 250° C., roll temperature of 80° C., take-off rate of 1 m/min (films of Table 5)

Thickness of 100 μm (for measurement of shrinkage ratio): conditions of cylinder temperature, die temperature, roll temperature and take-off rate are shown in Table 7.

Thickness of 50 μm (for measurement of various properties): cylinder temperature of 250° C., die temperature of 250° C., roll temperature of 80° C., take-off rate of 1 m/min, film forming temperature of 250° C. or 270° C. (films of Tables 5 and 6)

[Young's Modulus (Tensile Modulus) (YM), Tensile Elongation at Break (EL), Tensile Stress at Break (TS)]

Using, as a specimen, the film having a thickness of 50 μm obtained in the above film forming method, Young's modulus (YM), tensile elongation at break (EL) and tensile stress at break (TS) that are tensile properties were evaluated in accordance with JIS K6781 at a tensile rate of 200 mm/min by the use of an Instron universal tensile tester 3380.

[Internal Haze (%)]

Using the film having a thickness of 50 μm obtained in the above film forming method as a specimen, internal haze was measured in benzyl alcohol by the use of a digital haze meter (NDH-20D) manufactured by Nippon Denshoku Industries Co., Ltd.

[Gloss]

Using the film having a thickness of 50 μm obtained in the above film forming method as a specimen, gloss was measured in accordance with JIS K7105 at room temperature at a gloss angle of 20° by the use of a gloss meter.

[Dielectric Breakdown Voltage (BDV)]

Measurement of dielectric breakdown voltage (kV) was carried out in accordance with ASTM-D149 by the use of a dielectric breakdown voltage tester manufactured by Yamayo Tester Company. To the film having a thickness of 50 μm obtained by the above film forming method, a voltage was applied at a pressure rising rate of 500 V/sec to measure a breakdown withstand voltage, and withstand voltage properties are determined.

[Film Stretchability]

The film having a thickness of 200 μm obtained by the above film forming method was cut to a size of 60 mm×60 mm, and using a batch type biaxial orientation machine manufactured by Imoto Machinery Co., Ltd., the film was preheated at 50 to 200° C. for 1 minute and then subjected to simultaneous biaxial orientation at a stretch rate of 50 mm/min to obtain a biaxially oriented film. The biaxial orientation was carried out in a stretch ratio of 2.9 times×2.9 times (machine direction (MD): 3 times, transverse direction (TD): 3 times). From the film condition after stretching, stretchability was evaluated in the following manner.

○: The film was uniformly stretched.

Δ: The film was ununiformly stretched.

x: The film was broken.

[Analysis of Outgas from Film]

An amount of outgas released from a film was measured referring to test methods of Japanese Patent Laid-Open Publication No. 2011-88352, Japanese Patent Laid-Open Publication No. 2007-224311, etc. The film having a thickness of 50 μm obtained by the above film forming method was cut into strips of 20×2 mm. The strips of about 10 mg were precisely weighed and then heated at 180° C. for 30 minutes in a helium stream. A gas component generated during the heating was collected by a dynamic head space method, and the amount of the gas component was measured by a thermal adsorption GC/MS spectrum analyzing apparatus (Agilent Technologies HP6890/HP5975). From the MS spectrum result, a quantitative value was determined in terms of decane that is a standard sample, and the value was defined as an amount of outgas.

[Amount of Migrant to Copper Foil]

An amount ($1/\mu m^3$) of a migrant to a copper foil was determined referring to a test method described in Japanese Patent Laid-Open Publication No. 2008-94909. The film having a thickness of 50 μm obtained by the above film forming method was sandwiched between copper foils of the same size as that of the film and hot pressed, and then the copper foils were washed with chloroform. The chloroform solution thus obtained was heated to distill off chloroform, whereby a concentrate residue was obtained. The amount of the concentrate residue on a substrate was measured by the use of an OLYMPUS confocal laser microscope (OLS4000), and the amount of a migrant was calculated by analyzing the three-dimensional data.

[Shrinkage Ratio]

From the film having a thickness of 100 μm obtained by the above film forming method, strips each having a width of 2 cm and a length of 12 cm were cut out in the machine direction MD and the transverse direction TD, respectively, and on the surface of each film, two gages were put. The distance between the gages was measured by digital calipers and taken as LO (cm). Each of the strip films was hung in an oven preset at 160° C. and heated for 30 minutes. After heating, each film was taken out and cooled at room temperature for 30 minutes. Thereafter, the distance between the gages was measured and taken as L (cm). The shrinkage ratio was calculated from the following formula.

(Shrinkage ratio)=$\{(LO-L)/LO\}\times 100(\%)$

[Appearance of Film]

Appearance of a film was evaluated based on the following criteria.

○: Wrinkle, warpage, yellowing, etc. due to heating were not observed.

x: Changes due to heating, such as wrinkle, warpage and yellowing, were observed.

[Measurement of Dynamic Viscoelasticity]

The film having a thickness of 50 μm obtained by the above film forming method was cut to a size of 50 mm×50 mm, and using a T. A. Instrument rheometer RSA3, a dependence of storage elastic modulus E' on temperature was measured in a tensile mode under the conditions of a heating rate of 4° C./min (from −40° C. to 250° C.), a frequency of 1 Hz and a strain of 0.1%. A temperature given when the storage elastic modulus E' became $1.0\times 10^6$ Pa was measured.

<Compositions and Hollow Molded Products of Examples 25 to 36, Comparative Examples 11 to 13 and Reference Example 4>

[Young's Modulus (Tensile Modulus) (YM), Tensile Elongation at Break (EL), Tensile Stress at Break (TS), Standard Deviation Between Gages]

Using, as a sample for evaluation, a specimen (ASTM D638-IV type specimen) prepared under the injection molding conditions described in the measurement for the 4-methyl-1-pentene (co)polymer (A), the 4-methyl-1-pentene copolymer (B), the α-olefin polymer (C) and the compositions of Examples 1 to 7 and Comparative Examples 1 and 2, Young's modulus (YM), tensile elongation at break (EL) and tensile stress at break (TS) that are tensile properties were measured at a tensile rate of 200 mm/min by the use of an Instron universal tensile tester 3380. From the result measured in the above tensile test, a standard deviation of tensile elongation at break (EL) between gages was determined.

[Storage Elastic Modulus]

The pressed sheet having a thickness of 2 mm obtained in the pressed sheet forming method described in the measurement for the 4-methyl-1-pentene (co)polymer (A), the 4-methyl-1-pentene copolymer (B), the α-olefin polymer (C) and the compositions of Examples 1 to 7 and Comparative Examples 1 and 2 was cut to a size of 45 mm×10 mm×2 mm, and using an Anton Paar rheometer Physica MCR-301, a dependence of dynamic viscoelasticity on temperature was measured in a torsion mode loading under the conditions of a heating rate of 2° C./min (from −40° C. to 250° C.), a frequency of 10 rad/s and a strain of 0.1. A temperature given when the storage elastic modulus G' became $1.0\times 10^6$ Pa was measured. The storage elastic modulus G' at 100° C. (MPa) was also measured.

[Blow Molding Property]

To 100 parts by weight of a composition obtained by mixing the 4-methyl-1-pentene (co)polymer (A), the 4-methyl-1-pentene copolymer (B) and the α-olefin polymer (C) in given amounts, 0.1 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat stabilizer and 0.1 part by weight of calcium stearate as a hydrochloric acid absorbent were added. Thereafter, using a twin-screw extruder BT-30 (screw diameter: 30 mmø, L/D: 46) manufactured by Research Laboratory of Plastic Technology Co., Ltd.), the composition was granulated under the conditions of a preset temperature of 270° C., a resin extrusion rate of 60 g/min and 200 rpm to obtain pellets for various measurements. Using a one-step stretch blow molding machine ASB-12N/10 manufactured by Nissei ASB Machine Co., Ltd., the resulting pellets were subjected to injection molding under the conditions of an injection resin temperature of 240 to 290° C. and a mold cooling temperature of 18 to 60° C. to prepare a test tube-shaped preform having an outer diameter of 30 mm, a height of 45 mm and a weight of about 30 g. The resulting preform was placed in a heating pot, heated to a given temperature and then subjected to blow molding at a primary blow pressure of 0.4 MPa and a secondary blow pressure of 0.9 MPa so as to give a hollow molded container of about 240 cc.

The injection blow molding property was evaluated from the following viewpoints.

○: Case where an injection molded product could be produced without any break.

x: Case where an injection molded product was broken because stretching could not be achieved during blowing.

[Transparency of Bottle]

Using the blown bottle obtained above as a specimen, a total haze value was measured by a digital haze meter (NDH-20D) manufactured by Nippon Denshoku Industries Co., Ltd., and the transparency of bottle was evaluated by the total haze value.

Synthesis Example 1

Production of 4-Methyl-1-Pentene (Co)Polymer (A)

In accordance with the process of Comparative Example 7 or Comparative Example 9 of WO 2006/054613, 4-methyl-1-pentene polymers (A-1) to (A-3) having properties shown in Table 1 were obtained by changing the proportions of 4-methyl-1-pentene, 1-decene, 1-hexadecene, 1-octadecne and hydrogen.

Synthesis Example 2

Production of 4-Methyl-1-Pentene Copolymer (B1)

Synthesis Example 2-1

Production of 4-Methyl-1-Pentene Copolymer (B1-1)

In a SUS autoclave of 1.5 liter volume equipped with a stirring blade and having been thoroughly purged with nitrogen, 750 ml of 4-methyl-1-pentene was introduced at 23° C. In the autoclave, 0.75 ml of a 1.0 mmol/ml toluene solution of triisobutylaluminum (TIBAL) was introduced, and the stirrer was rotated.

Next, the autoclave was heated up to an internal temperature of 60° C. and pressurized with propylene so that the total pressure might become 0.15 MPa (gauge pressure). Subsequently, in the autoclave, 0.34 ml of a previously prepared toluene solution containing 1 mmol (in terms of Al) of methylaluminoxane and 0.005 mmol of diphenylmethylene(1-ethyl-3-t-butylcyclopentadienyl)(2,7-di-t-butylfluorenyl)zirconium dichloride was forcibly introduced with nitrogen, and polymerization was initiated. In the polymerization reaction, temperature control was carried out so that the autoclave internal temperature might become 60° C. 60 Minutes after initiation of the polymerization, in the autoclave was forcibly introduced 5 ml of methanol with nitrogen to terminate the polymerization, and the pressure in the autoclave was released to atmospheric pressure. Acetone was poured into the reaction solution with stirring.

The resulting powdery polymer containing a solvent was dried at 130° C. under reduced pressure for 12 hours. The amount of the resulting polymer was 45.9 g, the 4-methyl-1-pentene content in the polymer was 92% by mol, and the propylene content therein was 8% by mol. The melting point ($T_m$) of the polymer was 180° C., and the intrinsic viscosity [η] thereof was 1.7 dl/g. The results of the measurements of various properties are set forth in Table 1.

Synthesis Example 2-2

Production of 4-Methyl-1-Pentene Copolymer (B1-2)

In a SUS autoclave of 1.5 liter volume equipped with a stirring blade and having been thoroughly purged with nitrogen, 300 ml of normal hexane (having been dried on active alumina in dry nitrogen atmosphere) and 450 ml of 4-methyl-1-pentene were introduced at 23° C. In the autoclave, 0.75 ml of a 1.0 mmol/ml toluene solution of triisobutylaluminum (TIBAL) was introduced, and the stirrer was rotated.

Next, the autoclave was heated up to an internal temperature of 60° C. and pressurized with propylene so that the total pressure might become 0.19 MPa (gauge pressure). Subsequently, in the autoclave, 0.34 ml of a previously prepared toluene solution containing 1 mmol (in terms of Al) of methylaluminoxane and 0.01 mmol of diphenylmethylene(1-ethyl-3-t-butylcyclopentadienyl)(2,7-di-t-utylfluorenyl)zirconium dichloride was forcibly introduced with nitrogen, and polymerization was initiated. In the polymerization reaction, temperature control was carried out so that the autoclave internal temperature might become 60° C. 60 Minutes after initiation of the polymerization, in the autoclave was forcibly introduced 5 ml of methanol with nitrogen to terminate the polymerization, and the pressure in the autoclave was released to atmospheric pressure. Acetone was poured into the reaction solution with stirring.

The resulting powdery polymer containing a solvent was dried at 100° C. under reduced pressure for 12 hours. The amount of the resulting polymer was 44.0 g, the 4-methyl-1-pentene content in the polymer was 84% by mol, and the propylene content therein was 16% by mol. The melting point ($T_m$) of the polymer was 131° C., and the intrinsic viscosity [η] thereof was 1.4 dl/g. The results of the measurements of various properties are set forth in Table 1.

Synthesis Example 3

Production of 4-Methyl-1-Pentene Copolymer (B2)

In a SUS autoclave of 1.5 liter volume equipped with a stirring blade and having been thoroughly purged with nitrogen, 300 ml of normal hexane (having been dried on active alumina in dry nitrogen atmosphere) and 450 ml of 4-methyl-1-pentene were introduced at 23° C. In the autoclave, 0.75 ml of a 1.0 mmol/ml toluene solution of triisobutylaluminum (TIBAL) was introduced, and the stirrer was rotated.

Next, the autoclave was heated up to an internal temperature of 60° C. and pressurized with propylene so that the total pressure might become 0.40 MPa (gauge pressure). Subsequently, in the autoclave, 0.34 ml of a previously prepared toluene solution containing 1 mmol (in terms of Al) of methylaluminoxane and 0.01 mmol of diphenylmethylene (1-ethyl-3-t-butylcyclopentadienyl)(2,7-di-t-butylfluorenyl) zirconium dichloride was forcibly introduced with nitrogen, and polymerization was initiated. In the polymerization reaction, temperature control was carried out so that the autoclave internal temperature might become 60° C. 60 Minutes after initiation of the polymerization, in the autoclave was forcibly introduced 5 ml of methanol with nitrogen to terminate the polymerization, and the pressure in the autoclave was released to atmospheric pressure. Acetone was poured into the reaction solution with stirring.

The resulting powdery polymer containing a solvent was dried at 100° C. under reduced pressure for 12 hours. The amount of the resulting polymer was 36.9 g, the 4-methyl-1-pentene content in the polymer was 74% by mol, and the propylene content therein was 26% by mol. The intrinsic viscosity [η] thereof was 1.6 dl/g, and the polymer exhibited no melting point. The results of the measurements of various properties are set forth in Table 1.

Synthesis Example 4

Production/Preparation of α-Olefin Polymer (C)

Synthesis Example 4-1

Production of α-Olefin Copolymer (C-1)

An α-olefin copolymer (C-1) shown in Table 2 was obtained in accordance with the process of Example 8 of Japanese Patent Laid-Open Publication No. 2008-144155.

Synthesis Example 4-2

Production of α-Olefin Copolymer (C-2)

An α-olefin copolymer (C-2) shown in Table 2 was obtained in accordance with the process described in Comparative Example 1 of WO 2002/002659.

Synthesis Example 4-3

Preparation of α-Olefin Copolymer (C-3)

As an α-olefin copolymer (C-3), homopolypropylene (available from Prime Polymer Co., Ltd., product number: F123P, MFR: 3 g/10 min (230° C., load of 2.16 kg)) was used. The results of the measurements of various properties are set forth in Table 2.

Synthesis Example 4-4

Preparation of α-Olefin Copolymer (C-4)

As an α-olefin copolymer (C-4), homopolypropylene (available from Prime Polymer Co., Ltd., product number: F107, MFR: 7 g/10 min (230° C., load of 2.16 kg)) was used. The results of the measurements of various properties are set forth in Table 2.

TABLE 1

|  |  | 4-Methyl-1-pentene (co)polymer (A) | | | 4-Methyl-1-pentene copolymer (B) | | |
|---|---|---|---|---|---|---|---|
|  |  | (A-1) | (A-2) | (A-3) | (B1-1) | (B1-2) | (B2) |
| 4-Methyl-1-pentene content | mol % | 97 | 96 | 98 | 92 | 84 | 74 |
| α-Olefin species | — | 1-hexadecene 1-octadecene | 1-hexadecene 1-octadecene | 1-decene | propylene | propylene | propylene |
| α-Olefin content | mol % | 3 | 4 | 2 | 8 | 16 | 26 |
| [η] | dL/g | 2.1 | 2.2 | 2.4 | 1.7 | 1.4 | 1.6 |
| MFR 260° C., 5 kgf | g/10 min | 25 | 21 | 26 | 29 |  |  |
| 230° C., 2.16 kgf | g/10 min |  |  |  | 3.5 | 11 | 12 |
| Density | kg/m³ | 833 | 834 | 833 | 832 | 838 | 840 |
| Melting point (Tm) | ° C. | 228 | 224 | 232 | 180 | 131 | not observed |
| Crystallization temperature (Tc) | ° C. | 211 | 207 | 220 | 130 | 74 | — |
| Number-average molecular weight (Mn) | — |  |  |  | 186000 | 142000 | 167000 |
| Weight-average molecular weight (Mw) | — |  |  |  | 380000 | 294000 | 346000 |
| Molecular weight distribution (Mw/Mn) | — |  |  |  | 2.0 | 2.1 | 2.1 |
| Young's modulus (tensile modulus) (YM) | MPa | 1320 | 850 | 1760 | 1640 | 600 | 450 |

TABLE 2

|  |  | α-Olefin polymer (C) | | | |
|---|---|---|---|---|---|
|  |  | (C-1) | (C-2) | (C-3) | (C-4) |
| α-Olefin species (1) | — |  | 1-hexane | 1-butene | propylene | propylene |
| α-Olefin species (2) | — |  | 4-methyl-1-pentene |  |  |  |
| α-Olefin species composition ratio ((1)/(2)) | mol %/mol % |  | 55/45 | 100/0 | 100/0 | 100/0 |
| [η] | dL/g |  | 2.1 | 1.9 | 2.4 | 2.1 |
| MFR(230° C., 2.16 kgf) | g/10 min |  | 2.5 | 5.0 | 3 | 7 |
| Density | kg/m³ |  | 840 | 900 | 910 | 910 |
| Melting point (Tm) | ° C. |  | 160 | 120 | 165 | 163 |
| Glass transition temperature (Tg) | ° C. |  | -29 | -25 | -10 | -10 |
| Number-average molecular weight (Mn) | — |  | 56200 | 100000 | 100000 | 100000 |
| Weight-average molecular weight (Mw) | — |  | 724000 | 759000 | 450000 | 390000 |
| Molecular weight distribution (Mw/Mn) | — |  | 12.9 | 7.6 | 4.5 | 3.9 |
| Young's modulus (tensile modulus) (YM) | MPa |  | 500 | 1050 | 1500 | 1460 |

Example 1

20 Parts by weight of the copolymer (A-3) and 80 parts by weight of the copolymer (B1-2) obtained in Synthesis Example 2-2 were mixed, and to 100 parts by weight of the composition, 0.1 part by weight of tri(2,4-di-t-butylphenyl) phosphate as a secondary antioxidant, 0.1 part by weight of n-octadecyl-3-(4'-hydroxy-3',5'-di-t-butylphenyl)propionate as a heat stabilizer and 0.1 part by weight of calcium stearate as a hydrochloric acid absorbent were added. Thereafter, using a twin-screw extruder BT-30 (screw diameter: 30 mmø, L/D: 46) manufactured by Research Laboratory of Plastic Technology Co., Ltd., the composition was granulated under the conditions of a preset temperature of 280° C., a resin extrusion rate of 60 g/min and 200 rpm to obtain pellets for evaluation. The pellets were subjected to injection molding or press molding under the aforesaid conditions to obtain a molded product. Various properties of the molded product are set forth in Table 3. The molded product was found to be excellent in transparency, heat resistance and elongation.

Example 2

70 Parts by weight of the copolymer (A-2) and 30 parts by weight of the copolymer (B1-2) obtained in Synthesis Example 2-2 were mixed. To 100 parts by weight of the composition, the secondary antioxidant, the heat stabilizer and the hydrochloric acid absorbent were added in the same amounts as in Example 1, and extrusion granulation was carried out under the same conditions as in Example 1 to obtain pellets for evaluation. The pellets were subjected to injection molding or press molding under the aforesaid conditions to obtain a molded product. Various properties of the molded product are set forth in Table 3. The molded product was found to be excellent in transparency, heat resistance and elongation.

Example 3

40 Parts by weight of the copolymer (A-1) and 60 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 1, and extrusion granulation was carried out under the same conditions as in Example 1 to obtain pellets for evaluation. The pellets were subjected to injection molding or press molding under the aforesaid conditions to obtain a molded product. Various properties of the molded product are set forth in Table 3. The molded product was found to be excellent in transparency, heat resistance and elongation.

Example 4

85 Parts by weight of the copolymer (A-2) and 15 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 1, and extrusion granulation was carried out under the same conditions as in Example 1 to obtain pellets for evaluation. The pellets were subjected to injection molding or press molding under the aforesaid conditions to obtain a molded product. Various properties of the molded product are set forth in Table 3. The molded product was found to be excellent in transparency, heat resistance and elongation.

Example 5

60 Parts by weight of the copolymer (A-1), 10 parts by weight of the copolymer (B1-1) obtained in Synthesis Example 2-1 and 30 parts by weight of the copolymer (B2) obtained in Synthesis Example 3 were mixed. To 100 parts by weight of the composition, the secondary antioxidant, the heat stabilizer and the hydrochloric acid absorbent were added in the same amounts as in Example 1, and extrusion granulation was carried out under the same conditions as in Example 1 to obtain pellets for evaluation. The pellets were subjected to injection molding or press molding under the aforesaid conditions to obtain a molded product. Various properties of the molded product are set forth in Table 3. The molded product was found to be excellent in transparency, heat resistance and elongation.

Example 6

60 Parts by weight of the copolymer (A-2), 10 parts by weight of the copolymer (B1-1) obtained in Synthesis Example 2-1 and 30 parts by weight of the copolymer (B2) obtained in Synthesis Example 3 were mixed. To 100 parts by weight of the composition, the secondary antioxidant, the heat stabilizer and the hydrochloric acid absorbent were added in the same amounts as in Example 1, and extrusion granulation was carried out under the same conditions as in Example 1 to obtain pellets for evaluation. The pellets were subjected to injection molding or press molding under the aforesaid conditions to obtain a molded product. Various properties of the molded product are set forth in Table 3. The molded product was found to be excellent in transparency, heat resistance and elongation.

Example 7

70 Parts by weight of the copolymer (A-2), 15 parts by weight of the copolymer (B1-1) obtained in Synthesis Example 2-1 and 15 parts by weight of the α-olefin polymer (C-2) were mixed. To 100 parts by weight of the composition, the secondary antioxidant, the heat stabilizer and the hydrochloric acid absorbent were added in the same amounts as in Example 1, and extrusion granulation was carried out under the same conditions as in Example 1 to obtain pellets for evaluation. The pellets were subjected to injection molding or press molding under the aforesaid conditions to obtain a molded product. Various properties of the molded product are set forth in Table 3. The molded product was found to be excellent in heat resistance and elongation.

Comparative Example 1

The α-olefin polymer (C-4) was used, and pellets of the polymer were subjected to injection molding or press molding under the aforesaid conditions to obtain a molded product. Various properties of the molded product are set forth in Table 3. The molded product was found to be inferior to the molded products of the above examples in transparency and heat resistance.

Comparative Example 2

The copolymer (A-3) was used, and pellets of the copolymer were subjected to injection molding or press molding under the aforesaid conditions to obtain a molded product. Various properties of the molded product are set forth in Table 3. The molded product was found to be inferior to the molded products of the above examples in elongation.

and the hydrochloric acid absorbent were added in the same amounts as in Example 8, and extrusion granulation was carried out under the same conditions as in Example 8 to obtain pellets for evaluation. The pellets were molded under

TABLE 3

|  |  | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|---|
| 4-Methyl-1-pentene (co)polymer (A) |  | (A-3) | (A-2) | (A-1) | (A-2) | (A-1) | (A-2) | (A-2) | — | (A-3) |
| 4-Methyl-1-pentene copolymer (B1) |  | (B1-2) | (B1-2) | (B1-1) | (B1-1) | (B1-1) | (B1-1) | (B1-1) | — | — |
| 4-Methyl-1-pentene copolymer (B2) |  | — | — | — | — | (B2) | (B2) | — | — | — |
| α-Olefin polymer (C) |  | — | — | — | — | — | — | (C-2) | (C-4) | — |
| 4-Methyl-1-pentene (co)polymer (A) | wt % | 20 | 70 | 40 | 85 | 60 | 60 | 70 | 0 | 100 |
| 4-Methyl-1-pentene copolymer (B1) | wt % | 80 | 30 | 60 | 15 | 10 | 10 | 15 | 0 | 0 |
| 4-Methyl-1-pentene copolymer (B2) | wt % | 0 | 0 | 0 | 0 | 30 | 30 | 0 | 0 | 0 |
| α-Olefin polymer (C) | wt % | 0 | 0 | 0 | 0 | 0 | 0 | 15 | 100 | 0 |
| 4-Methyl-1-pentene content | mol % | 87 | 92 | 94 | 95 | 89 | 88 | 81 | 0 | 98 |
| α-Olefin content | mol % | 13 | 8 | 6 | 5 | 11 | 12 | 19 | 100 | 2 |
| Melting point (Tm) | °C. | 236 | 226 | 229 | 225 | 228 | 224 | 224 | 163 | 232 |
| Crystallization temperature (Tc) | °C. | 212 | 205 | 207 | 204 | 207 | 203 | 203 | 117 | 220 |
| Young's modulus (tensile modulus) (YM) | MPa | 1240 | 793 | 1550 | 1050 | 900 | 600 | 1100 | 1720 | 1760 |
| Tensile elongation at break (EL) | % | 250 | 265 | 80 | 135 | 310 | 350 | 290 | 20 | 16 |
| Tensile stress at break (TS) | MPa | 18 | 18 | 18 | 16 | 19 | 18 | 18 | 40 | 29 |
| Temperature to give storage elastic modulus (G') = $1.0 \times 10^6$ (Pa) | °C. | 165 | 200 | 209 | 212 | 200 | 190 | 195 | 159 | 230 |
| Internal haze | % | 1.1 | 0.5 | 0.6 | 0.6 | 0.7 | 0.8 | 2.5 | 87 | 1 |

Example 8

80 Parts by weight of the copolymer (A-2) and 20 parts by weight of the copolymer (B1-1) obtained in Synthesis Example 2-1 were mixed, and to 100 parts by weight of the composition, 0.1 part by weight of tri(2,4-di-t-butylphenyl) phosphate as a secondary antioxidant, 0.1 part by weight of n-octadecyl-3-(4'-hydroxy-3',5'-di-t-butylphenyl) propionate as a heat stabilizer and 0.1 part by weight of calcium stearate as a hydrochloric acid absorbent were added. Thereafter, using a twin-screw extruder BT-30 (screw diameter: 30 mmø, L/D: 46) manufactured by Research Laboratory of Plastic Technology Co., Ltd., the composition was granulated under the conditions of a preset temperature of 280° C., a resin extrusion rate of 60 g/min and 200 rpm to obtain pellets for evaluation. The pellets were molded under the aforesaid conditions to obtain a film. The results of various property measurements for the film are set forth in Table 4. The film was found to be excellent in transparency and heat resistance.

Example 9

40 Parts by weight of the copolymer (A-2) and 60 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 4. The film was found to be excellent in transparency and heat resistance.

Example 10

80 Parts by weight of the copolymer (A-2) and 20 parts by weight of the copolymer (B1-2) obtained in Synthesis Example 2-2 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 4. The film was found to be excellent in transparency and heat resistance.

Example 11

80 Parts by weight of the copolymer (A-1) and 20 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 4. The film was found to be excellent in transparency and heat resistance.

Example 12

40 Parts by weight of the copolymer (A-1) and 60 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 4. The film was found to be excellent in transparency and heat resistance.

Example 13

60 Parts by weight of the copolymer (A-1), 10 parts by weight of the copolymer (B1-1) obtained in Synthesis Example 2-1 and 30 parts by weight of the copolymer (B2) obtained in Synthesis Example 3 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 4. The film was found to be excellent in heat resistance and stretchability.

Example 14

60 Parts by weight of the copolymer (A-2), 10 parts by weight of the copolymer (B1-1) obtained in Synthesis Example 2-1 and 30 parts by weight of the copolymer (B2) obtained in Synthesis Example 3 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 4. The film was found to be excellent in heat resistance and stretchability.

Example 15

70 Parts by weight of the copolymer (A-2), 15 parts by weight of the copolymer (B1-1) obtained in Synthesis Example 2-1 and 15 parts by weight of the α-olefin polymer (C-2) were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 4. The film was found to be excellent in heat resistance and stretchability.

Example 16

60 Parts by weight of the copolymer (A-1), 10 parts by weight of the copolymer (B1-1) obtained in Synthesis Example 2-1 and 30 parts by weight of the α-olefin polymer (C-3) were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 4. The film was found to be excellent in electrical properties and stretchability.

Comparative Example 3

The α-olefin polymer (C-4) was used, and pellets of the polymer were molded under the aforesaid conditions to obtain a film. The results of various property measurements for the film are set forth in Table 5. The film was found to be inferior to the films of the above examples in transparency and heat resistance.

Comparative Example 4

The copolymer (A-1) was used, and pellets of the copolymer were molded under the aforesaid conditions to obtain a film. The results of various property measurements for the film are set forth in Table 5. The film was found to be inferior to the films of the above examples in film stretchability.

Comparative Example 5

The copolymer (A-2) was used, and pellets of the copolymer were molded under the aforesaid conditions to obtain a film. The results of various property measurements for the film are set forth in Table 5. The film was found to be inferior to the films of the above examples in film stretchability.

Reference Example 1

80 Parts by weight of the copolymer (A-2) and 20 parts by weight of the polymer (B2) obtained in Synthesis Example 3 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 5.

Reference Example 2

60 Parts by weight of the copolymer (A-2) and 40 parts by weight of the polymer (B2) obtained in Synthesis Example 3 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 5.

TABLE 4

| | | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| 4-Methyl-1-pentene (co)polymer (A) | | (A-2) | (A-2) | (A-2) | (A-1) | (A-1) | (A-1) | (A-2) | (A-2) | (A-1) |
| 4-Methyl-1-pentene copolymer (B1) | | (B1-1) | (B1-1) | (B1-2) | (B1-1) | (B1-1) | (B1-1) | (B1-1) | (B1-1) | (B1-1) |
| 4-Methyl-1-pentene copolymer (B2) | | — | — | — | — | — | (B2) | (B2) | — | — |
| α-Olefin polymer (C) | | — | — | — | — | — | — | — | (C-2) | (C-3) |
| 4-Methyl-1-pentene (co)polymer (A) | wt % | 80 | 40 | 80 | 80 | 40 | 60 | 60 | 70 | 60 |
| 4-Methyl-1-pentene copolymer (B1) | wt % | 20 | 60 | 20 | 20 | 60 | 10 | 10 | 15 | 10 |
| 4-Methyl-1-pentene copolymer (B2) | wt % | — | — | — | — | — | 30 | 30 | 0 | 0 |
| α-Olefin polymer (C) | wt % | — | — | — | — | — | 0 | 0 | 15 | 30 |
| 4-Methyl-1-pentene content | mol % | 95 | 94 | 94 | 96 | 94 | 89 | 88 | 81 | 67 |
| α-Olefin content | mol % | 5 | 6 | 6 | 4 | 6 | 11 | 12 | 19 | 33 |
| Composition | Melting point (Tm) | ° C. | 224 | 224 | 224 | 228 | 228 | 228 | 224 | 224 | 228 |
| | Crystallization temperature (Tc) | ° C. | 203 | 200 | 202 | 209 | 207 | 207 | 203 | 202 | 205 |

TABLE 4-continued

| | | | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|
| | Young's modulus (tensile modulus) (YM) | MPa | 1320 | 1480 | 1200 | 1650 | 1820 | 1570 | 1150 | 1450 | 1370 |
| | Tensile elongation at break (EL) | % | 220 | 230 | 230 | 260 | 280 | 220 | 210 | 220 | 300 |
| | Tensile stress at break (TS) | MPa | 32 | 34 | 32 | 36 | 40 | 40 | 38 | 37 | 40 |
| | Temperature to give storage elastic modulus (E') = $1.0 \times 10^6$ (Pa) | °C. | 210 | 195 | 203 | 212 | 209 | 210 | 190 | 205 | 200 |
| | Internal haze | % | 0.06 | 0.1 | 0.13 | 0.16 | 0.08 | 0.02 | 0.1 | 1.5 | 6 |
| Film | Gloss | — | 74 | 87 | 91 | 68 | 76 | 12 | 13 | 11 | 10 |
| | Dielectric breakdown voltage (BDV) | kV | 11 | 11 | 10 | 12 | 10 | 12 | 11 | 11 | 12 |
| | Film stretchability | — | ○ | ○ | ○ | ○ | ○ | ○ | ○ | ○ | ○ |

TABLE 5

| | | | Comp. Ex. 3 | Comp. Ex. 4 | Comp. Ex. 5 | Ref. Ex. 1 | Ref. Ex. 2 |
|---|---|---|---|---|---|---|---|
| 4-Methyl-1-pentene (co)polymer (A) | | | — | (A-1) | (A-2) | (A-2) | (A-2) |
| 4-Methyl-1-pentene copolymer (B1) | | | — | — | — | — | — |
| 4-Methyl-1-pentene copolymer (B2) | | | — | — | — | (B2) | (B2) |
| α-Olefin polymer (C) | | | (C-4) | — | — | — | — |
| 4-Methyl-1-pentene (co)polymer (A) | | wt % | 0 | 100 | 100 | 80 | 60 |
| 4-Methyl-1-pentene copolymer (B1) | | wt % | 0 | 0 | 0 | 0 | 0 |
| 4-Methyl-1-pentene copolymer (B2) | | wt % | 0 | 0 | 0 | 20 | 40 |
| α-Olefin polymer (C) | | wt % | 100 | 0 | 0 | 0 | 0 |
| 4-Methyl-1-pentene content | | mol % | 0 | 97 | 96 | 91 | 86 |
| α-Olefin content | | mol % | 100 | 3 | 4 | 9 | 14 |
| Composition | Melting point (Tm) | °C. | 163 | 228 | 224 | 224 | 226 |
| | Crystallization temperature (Tc) | °C. | 117 | 211 | 207 | 201 | 206 |
| | Young's modulus (tensile modulus) (YM) | MPa | 1300 | 1670 | 1100 | 560 | 340 |
| | Tensile elongation at break (EL) | % | 450 | 200 | 200 | 270 | 350 |
| | Tensile stress at break (TS) | MPa | 40 | 38 | 30 | 17 | 19 |
| | Temperature to give storage elastic modulus (E') = $1.0 \times 10^6$ (Pa) | °C. | 132 | 222 | 218 | 203 | 198 |
| | Internal haze | % | 5.6 | 0.07 | 0.15 | 0.12 | 0.15 |
| Film | Gloss | — | 156 | 64 | 53 | 84 | 63 |
| | Dielectric breakdown voltage (BDV) | kV | 10 | 10 | 10 | 10 | 11 |
| | Film stretchability | — | x | x | x | ○ | ○ |

Example 17

70 Parts by weight of the copolymer (A-3) and 30 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 6. It can be seen that the molding temperature could be lowered and the amount of the migrant to the copper foil was small.

Example 18

50 Parts by weight of the copolymer (A-3) and 50 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 6. It can be seen that the molding temperature could be lowered and the amount of the migrant to the copper foil was small.

Example 19

30 Parts by weight of the copolymer (A-3) and 70 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 6. It can be seen that the molding temperature could be lowered and the amount of the migrant to the copper foil was small.

Comparative Example 6

To 100 parts by weight of the copolymer (A-3), the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded under the aforesaid conditions to obtain a film. The results of various property measurements for the film are set forth in Table 6. It can be seen that the amount of the film outgas and the amount of the migrant to the copper foil were large.

Comparative Example 7

Using a release film composed of special polyester and having a thickness of 50 μm (RP-50 available from Sekisui Chemical Co., Ltd.), an amount of a migrant from the film to a copper foil was measured. As a solvent for concentrating the migrant to a copper foil, a chloroform/1,1,1,3,3,3-hexafluoro-2-propanol mixed solvent was used, and the measurement was carried out in the same manner. The measurement of the amount of the migrant from the film composed of the material to the copper film resulted in 690×10$^4$ (1/μm$^3$), and it can be seen that the amount of the migrant was markedly larger as compared with the films of the present invention of Examples 17 to 19.

Example 2-1 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded by the aforesaid film forming method to obtain a film. The results of various property measurements for the film are set forth in Table 7.

TABLE 6

|  |  | Ex. 17 | Ex. 18 | Ex. 19 | Comp. Ex. 6 | Comp. Ex. 7 |
| --- | --- | --- | --- | --- | --- | --- |
| 4-Methyl-1-pentene (co)polymer (A) |  | (A-3) | (A-3) | (A-3) | (A-3) | — |
| 4-Methyl-1-pentene copolymer (B1) |  | (B1-1) | (B1-1) | (B1-1) | — | — |
| 4-Methyl-1-pentene copolymer (B2) |  | — | — | — | — | — |
| α-Olefin polymer (C) |  | — | — | — | — | — |
| 4-Methyl-1-pentene (co)polymer (A) | wt % | 70 | 50 | 30 | 100 | — |
| 4-Methyl-1-pentene copolymer (B1) | wt % | 30 | 50 | 70 | 0 | — |
| 4-Methyl-1-pentene copolymer (B2) | wt % | 0 | 0 | 0 | 0 | — |
| α-Olefin polymer (C) | wt % | 0 | 0 | 0 | 0 | — |
| 4-Methyl-1-pentene content | mol % | 96 | 95 | 94 | 98 | — |
| α-Olefin content | mol % | 4 | 5 | 6 | 2 | — |
| Film forming temperature | ° C. | 250 | 250 | 250 | 270 | — |
| Amount of film outgas | ppm | 401 | 387 | 330 | 739 | — |
| Amount of migrant to copper foil | ×10$^4$/μm$^3$ | 53 | 58 | 55 | 146 | 690 |

Example 20

90 Parts by weight of the copolymer (A-1) and 10 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded by the aforesaid film forming method to obtain a film. The results of various property measurements for the film are set forth in Table 7.

Example 21

70 Parts by weight of the copolymer (A-1) and 30 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded by the aforesaid film forming method to obtain a film. The results of various property measurements for the film are set forth in Table 7.

Examples 22 and 23

A film was obtained in the same manner as in Example 21, except that the film forming conditions were changed to the conditions described in Table 7. The results of various property measurements for the film are set forth in Table 7.

Example 24

50 Parts by weight of the copolymer (A-1) and 50 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded by the aforesaid film forming method to obtain a film. The results of various property measurements for the film are set forth in Table 7.

Comparative Example 8

The results of various property measurements for a TPX (registered trademark) film "Opulent X44B" (film thickness: 100 μm) available from Mitsui Chemicals Tohcello, Inc. are set forth in Table 7. It can be seen that the shrinkage ratio of this film was higher as compared with the films of the present invention shown in Examples 20 to 24.

Comparative Example 9

A TPX (registered trademark) film "Opulent X44B" available from Mitsui Chemicals Tohcello, Inc. was heated in an oven at 180° C. for 1 hour. The results of various property measurements for the thus treated film are set forth in Table 7. Although the film was superior to Comparative Example 8 in that the shrinkage ratio was lowered, wrinkle and warpage were brought about by the heat treatment, and the appearance was extremely deteriorated.

Comparative Example 10

Using a polyethylene terephthalate film "Lumiler" (film thickness: 100 μm) available from Toray Industries Inc., measurement of shrinkage ratio and observation of film appearance after heating were carried out. It can be seen that the shrinkage ratio of this film was higher as compared with the films of the present invention shown in Examples 20 to 24.

Reference Example 3

70 Parts by weight of the copolymer (A-1) and 30 parts by weight of the copolymer (B2) obtained in Synthesis Example 3 were mixed. To 100 parts by weight of the composition, the secondary antioxidant, the heat stabilizer and the hydrochloric acid absorbent were added in the same amounts as in Example 8, and extrusion granulation was carried out under the same conditions as in Example 8 to obtain pellets for evaluation. The pellets were molded by the aforesaid film forming method to obtain a film. The results of various property measurements for the film are set forth in Table 7.

TABLE 7

|  |  | Ex. 20 | Ex. 21 | Ex. 22 | Ex. 23 | Ex. 24 | Comp. Ex. 8 | Comp. Ex. 9 | Comp. Ex. 10 | Ref. Ex. 3 |
|---|---|---|---|---|---|---|---|---|---|---|
| 4-Methyl-1-pentene (co)polymer (A) |  | (A-1) | (A-1) | (A-1) | (A-1) | (A-1) | TPX ® | TPX ® | — | (A-1) |
| 4-Methyl-1-pentene copolymer (B1) |  | (B1-1) | (B1-1) | (B1-1) | (B1-1) | (B1-1) | — | — | — | — |
| 4-Methyl-1-pentene copolymer (B2) |  | — | — | — | — | — | — | — | — | (B2) |
| 4-Methyl-1-pentene (co)polymer (A) | wt % | 90 | 70 | 70 | 70 | 50 | 100 | 100 | — | 70 |
| 4-Methyl-1-pentene copolymer (B1) | wt % | 10 | 30 | 30 | 30 | 50 | 0 | 0 | — | — |
| 4-Methyl-1-pentene copolymer (B2) | wt % | 0 | 0 | 0 | 0 | 0 | 0 | 0 | — | 30 |
| 4-Methyl-1-pentene content | mol % | 96.5 | 95.5 | 95.5 | 95.5 | 94.5 | 97 | 97 | — | 90 |
| α-Olefin content | mol % | 3.5 | 4.5 | 4.5 | 4.5 | 5.5 | 3 | 3 | — | 10 |
| Cylinder temperature | ° C. | 250 | 250 | 250 | 250 | 250 | 250 | 250 | — | 250 |
| Die temperature | ° C. | 250 | 250 | 250 | 250 | 250 | 250 | 250 | — | 250 |
| Roll temperature | ° C. | 80 | 60 | 60 | 60 | 40 | 40 | 40 | — | 40 |
| Take-off rate | m/min | 5 | 3 | 5 | 10 | 5 | 5 | 5 | — | 5 |
| Heat treatment (180° C., 1 hour) | yes/no | no | no | no | no | no | no | yes | no | no |
| Shrinkage ratio (after heating at 160° C. for 30 minutes) MD | % | 0.3 | 0.1 | 0.07 | 0.05 | 0.1 | 0.4 | 0.1 | 2.1 | 0.1 |
| Shrinkage ratio (after heating at 160° C. for 30 minutes) TD | % | 0.2 | 0.1 | 0.08 | 0.04 | 0.1 | 0.3 | 0.1 | 0.7 | 0.1 |
| Film appearance after heating | — | ○ | ○ | ○ | ○ | ○ | ○ | x | ○ | ○ |

Example 25

70 Parts by weight of the copolymer (A-2) and 30 parts by weight of the copolymer (B1-2) obtained in Synthesis Example 2-2 were mixed, and to 100 parts by weight of the composition, 0.1 part by weight of tri(2,4-di-t-butylphenyl) phosphate as a secondary antioxidant, 0.1 part by weight of n-octadecyl-3-(4'-hydroxy-3',5'-di-t-butylphenyl)propionate as a heat stabilizer and 0.1 part by weight of calcium stearate as a hydrochloric acid absorbent were added. Thereafter, using a twin-screw extruder BT-30 (screw diameter: 30 mmø, L/D: 46) manufactured by Research Laboratory of Plastic Technology Co., Ltd.), the composition was granulated under the conditions of a preset temperature of 280° C., a resin extrusion rate of 60 g/min and 200 rpm to obtain pellets for evaluation. The pellets were subjected to injection molding, press molding or injection blow molding under the aforesaid conditions to obtain a molded product. Various properties of the molded product are set forth in Table 8. The molded product was found to be excellent in blow molding property, transparency and heat resistance.

Example 26

40 Parts by weight of the copolymer (A-1) and 60 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 25, and extrusion granulation was carried out under the same conditions as in Example 25 to obtain pellets for evaluation. The pellets were subjected to injection molding, press molding or injection blow molding under the aforesaid conditions to obtain a molded product. Various properties of the molded product are set forth in Table 8. The molded product was found to be excellent in blow molding property, transparency and heat resistance.

Example 27

85 Parts by weight of the copolymer (A-2) and 15 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 25, and extrusion granulation was carried out under the same conditions as in Example 25 to obtain pellets for evaluation. The pellets were subjected to injection molding, press molding or injection blow molding under the aforesaid conditions to obtain a molded product. Various properties of the molded product are set forth in Table 8. The molded product was found to be excellent in blow molding property, transparency and heat resistance.

Example 28

30 Parts by weight of the copolymer (A-2) and 70 parts by weight of the copolymer (B1-1) obtained in Synthesis Example 2-1 were mixed. To 100 parts by weight of the composition, the secondary antioxidant, the heat stabilizer and the hydrochloric acid absorbent were added in the same amounts as in Example 25, and extrusion granulation was carried out under the same conditions as in Example 25 to obtain pellets for evaluation. The pellets were subjected to injection molding, press molding or injection blow molding under the aforesaid conditions to obtain a molded product. Various properties of the molded product are set forth in Table 8. The molded product was found to be excellent in blow molding property, transparency and heat resistance.

Example 29

70 Parts by weight of the copolymer (A-2), 15 parts by weight of the copolymer (B1-1) obtained in Synthesis Example 2-1 and 15 parts by weight of the copolymer (B2) obtained in Synthesis Example 3 were mixed. To 100 parts by weight of the composition, the secondary antioxidant, the heat stabilizer and the hydrochloric acid absorbent were added in the same amounts as in Example 25, and extrusion granulation was carried out under the same conditions as in Example 25 to obtain pellets for evaluation. The pellets were subjected to injection molding, press molding or injection blow molding under the aforesaid conditions to obtain a molded product. Various properties of the molded product are set forth in Table 8. The molded product was found to be excellent in blow molding property, transparency and heat resistance.

Example 30

18 Parts by weight of the copolymer (A-2), 42 parts by weight of the copolymer (B1-1) obtained in Synthesis Example 2-1 and 40 parts by weight of the copolymer (B2) obtained in Synthesis Example 3 were mixed. To 100 parts by weight of the composition, the secondary antioxidant, the heat stabilizer and the hydrochloric acid absorbent were added in the same amounts as in Example 25, and extrusion granulation was carried out under the same conditions as in Example 25 to obtain pellets for evaluation. The pellets were subjected to injection molding, press molding or injection blow molding under the aforesaid conditions to obtain a molded product. Various properties of the molded product are set forth in Table 8. The molded product was found to be excellent in blow molding property, transparency and heat resistance.

Example 31

56 Parts by weight of the copolymer (A-2), 24 parts by weight of the copolymer (B1-1) obtained in Synthesis Example 2-1 and 20 parts by weight of the copolymer (B2) obtained in Synthesis Example 3 were mixed. To 100 parts by weight of the composition, the secondary antioxidant, the heat stabilizer and the hydrochloric acid absorbent were added in the same amounts as in Example 25, and extrusion granulation was carried out under the same conditions as in Example 25 to obtain pellets for evaluation. The pellets were subjected to injection molding, press molding or injection blow molding under the aforesaid conditions to obtain a molded product. Various properties of the molded product are set forth in Table 8. The molded product was found to be excellent in blow molding property, transparency and heat resistance.

Example 32

42 Parts by weight of the copolymer (A-2), 18 parts by weight of the copolymer (B1-1) obtained in Synthesis Example 2-1 and 40 parts by weight of the copolymer (B2) obtained in Synthesis Example 3 were mixed. To 100 parts by weight of the composition, the secondary antioxidant, the heat stabilizer and the hydrochloric acid absorbent were added in the same amounts as in Example 25, and extrusion granulation was carried out under the same conditions as in Example 25 to obtain pellets for evaluation. The pellets were subjected to injection molding, press molding or injection blow molding under the aforesaid conditions to obtain a molded product. Various properties of the molded product are set forth in Table 8. The molded product was found to be excellent in blow molding property, transparency and heat resistance.

Example 33

24 Parts by weight of the copolymer (A-2), 56 parts by weight of the copolymer (B1-1) obtained in Synthesis Example 2-1 and 20 parts by weight of the α-olefin copolymer (C-1) were mixed. To 100 parts by weight of the composition, the secondary antioxidant, the heat stabilizer and the hydrochloric acid absorbent were added in the same amounts as in Example 25, and extrusion granulation was carried out under the same conditions as in Example 25 to obtain pellets for evaluation. The pellets were subjected to injection molding, press molding or injection blow molding under the aforesaid conditions to obtain a molded product. Various properties of the molded product are set forth in Table 9. The molded product was found to be excellent in blow molding property, transparency and heat resistance.

Example 34

24 Parts by weight of the copolymer (A-2), 57 parts by weight of the copolymer (B1-2) obtained in Synthesis Example 2-2, 14 parts by weight of the copolymer (B2) obtained in Synthesis Example 3 and 5 parts by weight of the α-olefin polymer (C-2) were mixed. To 100 parts by weight of the composition, the secondary antioxidant, the heat stabilizer and the hydrochloric acid absorbent were added in the same amounts as in Example 25, and extrusion granulation was carried out under the same conditions as in Example 25 to obtain pellets for evaluation. The pellets were subjected to injection molding, press molding or injection blow molding under the aforesaid conditions to obtain a molded product. Various properties of the molded product are set forth in Table 9. The molded product was found to be excellent in blow molding property and heat resistance.

Example 35

60 Parts by weight of the copolymer (A-2), 10 parts by weight of the copolymer (B1-1) obtained in Synthesis Example 2-1 and 30 parts by weight of the copolymer (B2) obtained in Synthesis Example 3 were mixed. To 100 parts by weight of the composition, the secondary antioxidant, the heat stabilizer and the hydrochloric acid absorbent were added in the same amounts as in Example 25, and extrusion granulation was carried out under the same conditions as in Example 25 to obtain pellets for evaluation. The pellets were subjected to injection molding, press molding or injection blow molding under the aforesaid conditions to obtain a molded product. Various properties of the molded product are set forth in Table 9. The molded product was found to be excellent in blow molding property, transparency and heat resistance.

Example 36

15 Parts by weight of the copolymer (A-3), 45 parts by weight of the copolymer (A-2), 10 parts by weight of the copolymer (B1-1) obtained in Synthesis Example 2-1 and 30 parts by weight of the copolymer (B2) obtained in Synthesis Example 3 were mixed. To 100 parts by weight of the composition, the secondary antioxidant, the heat stabilizer and the hydrochloric acid absorbent were added in the same amounts as in Example 25, and extrusion granulation was carried out under the same conditions as in Example 25 to obtain pellets for evaluation. The pellets were subjected to injection molding, press molding or injection blow molding under the aforesaid conditions to obtain a molded product. Various properties of the molded product are set forth in Table 9. The molded product was found to be excellent in blow molding property, transparency and heat resistance.

Comparative Example 11

The α-olefin polymer (C-4) was used, and pellets of the polymer were subjected to injection molding, press molding or injection blow molding under the aforesaid conditions to obtain a molded product. Various properties of the molded product are set forth in Table 9. The molded product was found to be inferior to the molded products of the above examples in transparency and heat resistance.

Comparative Example 12

The copolymer (A-3) was used, and pellets of the copolymer were subjected to injection molding, press molding or injection blow molding under the aforesaid conditions to obtain a molded product. Various properties of the molded product are set forth in Table 9. The molded product was found to be inferior to the molded products of the above examples in blow molding property.

Comparative Example 13

The copolymer (B1-1) obtained in Synthesis Example 2-1 was used, and pellets of the copolymer were subjected to injection molding, press molding or injection blow molding under the aforesaid conditions to obtain a molded product. Various properties of the molded product are set forth in Table 9. The molded product was found to be inferior to the molded products of the above examples in blow molding property.

Reference Example 4

60 Parts by weight of the copolymer (A-2) and 40 parts by weight of the copolymer (B2) obtained in Synthesis Example 3 were mixed. To 100 parts by weight of the composition, the secondary antioxidant, the heat stabilizer and the hydrochloric acid absorbent were added in the same amounts as in Example 25, and extrusion granulation was carried out under the same conditions as in Example 25 to obtain pellets for evaluation. The pellets were subjected to injection molding, press molding or injection blow molding under the aforesaid conditions to obtain a molded product. Various properties of the molded product are set forth in Table 9.

TABLE 8

| | | | Ex. 25 | Ex. 26 | Ex. 27 | Ex. 28 | Ex. 29 | Ex. 30 | Ex. 31 | Ex. 32 |
|---|---|---|---|---|---|---|---|---|---|---|
| 4-Methyl-1-pentene (co)polymer (A) | | | (A-2) | (A-1) | (A-2) | (A-2) | (A-2) | (A-2) | (A-2) | (A-2) |
| 4-Methyl-1-pentene copolymer (B1) | | | (B1-2) | (B1-1) | (B1-1) | (B1-1) | (B1-1) | (B1-1) | (B1-1) | (B1-1) |
| 4-Methyl-1-pentene copolymer (B2) | | | — | — | — | — | (B2) | (B2) | (B2) | (B2) |
| α-Olefin polymer (C) | | | — | — | — | — | — | — | — | — |
| 4-Methyl-1-pentene (co)polymer (A) | | wt % | 70 | 40 | 85 | 30 | 70 | 18 | 56 | 42 |
| 4-Methyl-1-pentene copolymer (B1) | | wt % | 30 | 60 | 15 | 70 | 15 | 42 | 24 | 18 |
| 4-Methyl-1-pentene copolymer (B2) | | wt % | 0 | 0 | 0 | 0 | 15 | 40 | 20 | 40 |
| α-Olefin polymer (C) | | wt % | 0 | 0 | 0 | 0 | 0 | 0 | 0 | 0 |
| 4-Methyl-1-pentene content | | mol % | 92 | 94 | 95 | 93 | 88 | 85 | 90 | 86 |
| α-Olefin content | | mol % | 8 | 6 | 5 | 7 | 12 | 15 | 10 | 15 |
| Composition | Melting point (Tm) | °C. | 226 | 229 | 225 | 181 | 226 | 181 | 225 | 225 |
| | Crystallization temperature (Tc) | °C. | 205 | 207 | 204 | 158 | 205 | 157 | 203 | 205 |
| | Young's modulus (tensile modulus) (YM) | MPa | 793 | 1550 | 1050 | 1501 | 540 | 699 | 849 | 392 |
| | Tensile elongation at break (EL) | % | 265 | 80 | 135 | 136 | 302 | 296 | 150 | 351 |
| | Tensile stress at break (TS) | MPa | 18 | 18 | 16 | 19 | 19 | 20 | 18 | 20 |
| | Temperature to give storage elastic modulus (G') = 1.0 × 10$^6$ (Pa) | °C. | 200 | 209 | 212 | 192 | 194 | 194 | 202 | 174 |
| | Storage elastic modulus G' at T = 100° C. | MPa | 20.2 | 50.8 | 64.5 | 47.7 | 11.3 | 23.4 | 27.7 | 5.5 |
| Hollow molded product | Standard deviation of elongation between gages | % | 24 | 22 | 28 | 18 | 26 | 19 | 25 | 17 |
| | Blow molding property | — | ○ | ○ | ○ | ○ | ○ | ○ | ○ | ○ |
| | Transparency of bottle (total haze) | % | 3.8 | 3.4 | 4.8 | 3.2 | 10.8 | 5.2 | 7.9 | 12.1 |

TABLE 9

| | | | Ex. 33 | Ex. 34 | Ex. 35 | Ex. 36 |
|---|---|---|---|---|---|---|
| 4-Methyl-1-pentene (co)polymer (A) | | | (A-2) | (A-2) | (A-2) | (A-3)/(A-2) |
| 4-Methyl-1-pentene copolymer (B1) | | | (B1-1) | (B1-2) | (B1-1) | (B1-1) |
| 4-Methyl-1-pentene copolymer (B2) | | | — | (B2) | (B2) | (B2) |
| α-Olefin polymer (C) | | | (C-1) | (C-2) | — | — |
| 4-Methyl-1-pentene (co)polymer (A) | | wt % | 24 | 24 | 60 | 15/45 |
| 4-Methyl-1-pentene copolymer (B1) | | wt % | 56 | 57 | 10 | 10 |
| 4-Methyl-1-pentene copolymer (B2) | | wt % | 0 | 14 | 30 | 30 |
| α-Olefin polymer (C) | | wt % | 20 | 5 | — | — |
| 4-Methyl-1-pentene content | | mol % | 82 | 72 | 88 | 89 |
| α-Olefin content | | mol % | 18 | 28 | 12 | 11 |
| Composition | Melting point (Tm) | °C. | 180 | 181 | 224 | 230 |
| | Crystallization temperature (Tc) | °C. | 156 | 159 | 203 | 209 |
| | Young's modulus (tensile modulus) (YM) | MPa | 950 | 1050 | 600 | 1200 |
| | Tensile elongation at break (EL) | % | 210 | 280 | 350 | 210 |
| | Tensile stress at break (TS) | MPa | 19 | 21 | 18 | 20 |
| | Temperature to give storage elastic modulus (G') = 1.0 × 10$^6$ (Pa) | °C. | 194 | 191 | 190 | 215 |
| | Storage elastic modulus G' at T = 100° C. | MPa | 49.3 | 31.8 | 45.2 | 67.3 |
| Hollow molded product | Standard deviation of elongation between gages | % | 15 | 18 | 16 | 17 |
| | Blow molding property | — | ○ | ○ | ○ | ○ |
| | Transparency of bottle (total haze) | % | 4.5 | 28.3 | 2 | 2.1 |

TABLE 9-continued

|  |  |  | Comp. Ex. 11 | Comp. Ex. 12 | Comp. Ex. 13 | Ref. Ex. 4 |
|---|---|---|---|---|---|---|
| 4-Methyl-1-pentene (co)polymer (A) |  |  | — | (A-3) | — | (A-2) |
| 4-Methyl-1-pentene copolymer (B1) |  |  | — | — | (B1-1) | — |
| 4-Methyl-1-pentene copolymer (B2) |  |  | — | — | — | (B2) |
| α-Olefin polymer (C) |  |  | (C-4) | — | — | — |
| 4-Methyl-1-pentene (co)polymer (A) |  | wt % | — | 100 | — | 60 |
| 4-Methyl-1-pentene copolymer (B1) |  | wt % | — | — | 100 | 0 |
| 4-Methyl-1-pentene copolymer (B2) |  | wt % | — | — | — | 40 |
| α-Olefin polymer (C) |  | wt % | 100 | — | — | — |
| 4-Methyl-1-pentene content |  | mol % | 0 | 98 | 92 | 86 |
| α-Olefin content |  | mol % | 100 | 2 | 8 | 14 |
| Composition | Melting point (Tm) | ° C. | 163 | 232 | 180 | 226 |
|  | Crystallization temperature (Tc) | ° C. | 117 | 220 | 130 | 206 |
|  | Young's modulus (tensile modulus) (YM) | MPa | 1720 | 1760 | 1640 | 339 |
|  | Tensile elongation at break (EL) | % | 20 | 16 | 40 | 335 |
|  | Tensile stress at break (TS) | MPa | 40 | 29 | 19 | 18 |
|  | Temperature to give storage elastic modulus (G') = 1.0 × 10$^6$ (Pa) | ° C. | 159 | 230 | 172 | 198 |
|  | Storage elastic modulus G' at T = 100° C. | MPa | 50 | 141 | 30.6 | 12.2 |
| Hollow molded product | Standard deviation of elongation between gages | % | — | 171 | 25 | 32 |
|  | Blow molding property |  | — | ○ | x | x | ○ |
|  | Transparency of bottle (total haze) | % | 45 | — | — | 15 |

The invention claimed is:

1. A 4-methyl-1-pentene (co)polymer composition which is:

(X1) a composition comprising a 4-methyl-1-pentene (co)polymer (A) satisfying the following requirements (A-a) to (A-e) in an amount of 10 to 90 parts by weight and a 4-methyl-1-pentene copolymer (B1) satisfying the following requirements (B1-a) to (B1-e) in an amount of 90 to 10 parts by weight (with the proviso that the total amount of (A) and (B1) is 100 parts by weight), or (X3) a composition comprising the 4-methyl-1-pentene (co)polymer (A) in an amount of 10 to 90 parts by weight, and the 4-methyl-1-pentene copolymer (B1) and a 4-methyl-1-pentene copolymer (B2) satisfying the following requirements (B2-a) to (B2-e) in the total amount of 90 to 10 parts by weight (with the proviso that the total amount of (A), (B1) and (B2) is 100 parts by weight, and the mixing ratio ((B1)/(B2)) of (B1) to (B2) is 99/1 to 1/99);

4-methyl-1-pentene (co)polymer (A):

(A-a) the amount (U1) of constituent units derived from 4-methyl-1-pentene is 100 to 90% by mol, and the total amount (U2) of constituent units derived from α-olefins of 2 to 20 carbon atoms (except 4-methyl-1-pentene) is 0 to 10% by mol (with the proviso that the total amount of U1 and U2 is 100% by mol), (A-b) the intrinsic viscosity [η], as measured in decalin at 135° C., is 0.5 to 5.0 dl/g, (A-c) the melting point (T$_m$), as measured by DSC, is in the range of 200 to 250° C., (A-d) the crystallization temperature (T$_c$), as measured by DSC, is in the range of 150 to 225° C., and (A-e) the density is 820 to 850 kg/m$^3$;

4-methyl-1-pentene copolymer (B1):

(B1-a) the amount (U3) of constituent units derived from 4-methyl-1-pentene is 99 to 80% by mol, and the total amount (U4) of constituent units derived from α-olefins of 2 to 20 carbon atoms (except 4-methyl-1-pentene) is 1 to 20% by mol (with the proviso that the total amount of U3 and U4 is 100% by mol), (B1-b) the intrinsic viscosity [η], as measured in decalin at 135° C., is 0.5 to 5.0 dl/g, (B1-c) the molecular weight distribution (Mw/Mn) that is a ratio of the weight-average molecular weight (Mw), as measured by gel permeation chromatography (GPC), to the number-average molecular weight (Mn), as measured by the same, is 1.0 to 3.5, (B1-d) the density is 825 to 860 kg/m$^3$, and (B1-e) the melting point (T$_m$), as measured by DSC, is not less than 110° C. but less than 200° C.;

4-methyl-1-pentene (co)polymer (B2):

(B2-a) the amount (U5) of constituent units derived from 4-methyl-1-pentene is less than 80% by mol but not less than 60% by mol, and the total amount (U6) of constituent units derived from α-olefins of 2 to 4 carbon atoms (except 4-methyl-1-pentene) is more than 20% by mol but not more than 40% by mol (with the proviso that the total amount of U5 and U6 is 100% by mol), (B2-b) the intrinsic viscosity [η], as measured in decalin at 135° C., is 0.5 to 5.0 dl/g, (B2-c) the melting point (T$_m$), as measured by DSC, is less than 110° C., or the melting point is not observed, (B2-d) the molecular weight distribution (Mw/Mn) that is a ratio of the weight-average molecular weight (Mw), as measured by gel permeation chromatography (GPC), to the number-average molecular weight (Mn), as measured by the same, is 1.0 to 3.5, and (B2-e) the density is 830 to 860 kg/m$^3$.

2. The 4-methyl-1-pentene (co)polymer composition as claimed in claim 1, wherein in the 4-methyl-1-pentene (co)polymer composition (X1), U3 in (B1-a) is 99 to 83% by mol, and U4 is 1 to 17% by mol (the total amount of U3 and U4 is 100% by mol).

3. The 4-methyl-1-pentene (co)polymer composition (X3) as claimed in claim 1, wherein the composition further comprises:

an α-olefin polymer (C) (said polymer (C) being different from the (co)polymer (A), the copolymer (B1) and the copolymer (B2)), so that the composition comprises:

the (co)polymer (A) in an amount of 10 to 85 parts by weight, the copolymer (B1) and the copolymer (B2) in the amount of 85 to 10 parts by weight (with the proviso that the mixing ratio ((B1)/(B2)) of (B1) to (B2) is 99/1 to 1/99), and the α-olefin polymer (C) in an amount of 3 to 30 parts by weight (with the proviso that the total amount of (A), (B1), (B2) and (C) is 100 parts by weight).

4. The 4-methyl-1-pentene (co)polymer composition (X1) as claimed in claim 1,
wherein the composition further comprises:
an α-olefin polymer (C) (said polymer (C) being different from the (co)polymer (A), the copolymer (B1) and the copolymer (B2)), so that the composition comprises:
the (co)polymer (A) in an amount of 7 to 90 parts by weight, the copolymer (B1) in an amount of 90 to 7 parts by weight, and the α-olefin polymer (C) in an amount of 0.9 to 30 parts by weight (with the proviso that the total amount of (A), (B1) and (C) is 100 parts by weight).

5. The 4-methyl-1-pentene (co)polymer composition as claimed in claim 1, wherein the melting point ($T_m$) in (B1-e), as measured by DSC, is 125 to 190° C.

6. A 4-methyl-1-pentene (co)polymer composition (X6) comprising a 4-methyl-1-pentene (co)polymer (A) satisfying the following requirements (A-a) to (A-e) in an amount of 7 to 90 parts by weight, a 4-methyl-1-pentene copolymer (B2) satisfying the following requirements (B2-a) to (B2-e) in an amount of 90 to 7 parts by weight, and an α-olefin polymer (C) (said polymer (C) being different from the (co)polymer (A), a 4-methyl-1-pentene copolymer (B1) satisfying the following requirements (B1-a) to (B1-e) and the copolymer (B2)) in an amount of 0.9 to 30 parts by weight (with the proviso that the total amount of (A), (B2) and (C) is 100 parts by weight);

4-methyl-1-pentene (co)polymer (A):
(A-a) the amount (U1) of constituent units derived from 4-methyl-1-pentene is 100 to 90% by mol, and the total amount (U2) of constituent units derived from α-olefins of 2 to 20 carbon atoms (except 4-methyl-1-pentene) is 0 to 10% by mol (with the proviso that the total amount of U1 and U2 is 100% by mol),
(A-b) the intrinsic viscosity [η], as measured in decalin at 135° C., is 0.5 to 5.0 dl/g,
(A-c) the melting point ($T_m$), as measured by DSC, is in the range of 200 to 250° C.,
(A-d) the crystallization temperature ($T_c$), as measured by DSC, is in the range of 150 to 225° C., and
(A-e) the density is 820 to 850 kg/m³;

4-methyl-1-pentene (co)polymer (B1):
(B1-a) the amount (U3) of constituent units derived from 4-methyl-1-pentene is 99 to 80% by mol, and the total amount (U4) of constituent units derived from α-olefins of 2 to 20 carbon atoms (except 4-methyl-1-pentene) is 1 to 20% by mol (with the proviso that the total amount of U3 and U4 is 100% by mol), (B1-b) the intrinsic viscosity [η], as measured in decalin at 135° C., is 0.5 to 5.0 dl/g,
(B1-c) the molecular weight distribution (Mw/Mn) that is a ratio of the weight-average molecular weight (Mw), as measured by gel permeation chromatography (GPC), to the number-average molecular weight (Mn), as measured by the same, is 1.0 to 3.5,
(B1-d) the density is 825 to 860 kg/m³, and
(B1-e) the melting point ($T_m$), as measured by DSC, is not less than 110° C. but less than 200° C.;

4-methyl-1-pentene (co)polymer (B2):
(B2-a) the amount (U5) of constituent units derived from 4-methyl-1-pentene is less than 80% by mol but not less than 60% by mol, and the total amount (U6) of constituent units derived from α-olefins of 2 to 4 carbon atoms (except 4-methyl-1-pentene) is more than 20% by mol but not more than 40% by mol (with the proviso that the total amount of U5 and U6 is 100% by mol),
(B2-b) the intrinsic viscosity [η], as measured in decalin at 135° C., is 0.5 to 5.0 dl/g,
(B2-c) the melting point ($T_m$), as measured by DSC, is less than 110° C., or the melting point is not observed,
(B2-d) the molecular weight distribution (Mw/Mn) that is a ratio of the weight-average molecular weight (Mw), as measured by gel permeation chromatography (GPC), to the number-average molecular weight (Mn), as measured by the same, is 1.0 to 3.5, and
(B2-e) the density is 830 to 860 kg/m³.

7. A film comprising the 4-methyl-1-pentene (co)polymer composition as claimed in claim 1.

8. A release film comprising the film as claimed in claim 7.

9. A hollow molded product comprising the 4-methyl-1-pentene (co)polymer composition as claimed in claim 1.

10. A hollow molded product comprising at least one layer of the 4-methyl-1-pentene (co)polymer composition as claimed in claim 1.

11. The hollow molded product as claimed in claim 10, which is obtained by an injection blow molding method.

12. A film comprising the 4-methyl-1-pentene (co)polymer composition as claimed in claim 6.

13. A release film comprising the film as claimed in claim 12.

14. A hollow molded product comprising the 4-methyl-1-pentene (co)polymer composition as claimed in claim 6.

15. A hollow molded product comprising at least one layer of the 4-methyl-1-pentene (co)polymer composition as claimed in claim 6.

16. The hollow molded product as claimed in claim 15, which is obtained by an injection blow molding method.

* * * * *